United States Patent
Fukawatase

(10) Patent No.: US 9,238,425 B2
(45) Date of Patent: Jan. 19, 2016

(54) VEHICLE SEAT

(71) Applicant: TOYOTA JIDOSHA KABUSHIKI KAISHA, Toyota-shi, Aichi-ken (JP)

(72) Inventor: Osamu Fukawatase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/354,907

(22) PCT Filed: Dec. 25, 2012

(86) PCT No.: PCT/JP2012/083535
§ 371 (c)(1),
(2) Date: Apr. 28, 2014

(87) PCT Pub. No.: WO2013/099888
PCT Pub. Date: Jul. 4, 2013

(65) Prior Publication Data
US 2014/0300088 A1 Oct. 9, 2014

(30) Foreign Application Priority Data

Dec. 28, 2011 (JP) .................................. 2011-290099

(51) Int. Cl.
| | |
|---|---|
| *B60N 2/427* | (2006.01) |
| *B60R 21/207* | (2006.01) |
| *B60R 21/13* | (2006.01) |
| *B60N 2/42* | (2006.01) |
| *B60R 21/18* | (2006.01) |
| *B60R 21/231* | (2011.01) |
| *B60R 21/013* | (2006.01) |

(Continued)

(52) U.S. Cl.
CPC .............. *B60N 2/427* (2013.01); *B60N 2/4235* (2013.01); *B60R 21/013* (2013.01); *B60R 21/08* (2013.01); *B60R 21/13* (2013.01); *B60R 21/18* (2013.01); *B60R 21/207* (2013.01); *B60R 21/231* (2013.01); *B60R 2021/0273* (2013.01); *B60R 2021/135* (2013.01); *B60R 2021/23107* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,172,702 | A | * | 3/1965 | Rose .............................. 297/397 |
| 4,592,523 | A | * | 6/1986 | Herndon ................ 244/122 AG |
| 5,415,366 | A | * | 5/1995 | Mastrolia ............... 244/122 AG |

(Continued)

FOREIGN PATENT DOCUMENTS

| | | |
|---|---|---|
| JP | A-10-504784 | 5/1998 |
| JP | A-2003-220921 | 8/2003 |

(Continued)

*Primary Examiner* — Nicole Verley
(74) *Attorney, Agent, or Firm* — Oliff PLC

(57) ABSTRACT

A vehicle seat that can effectively restrain a passenger from moving outward in a vehicle width direction in the event of a collision of a vehicle is obtained. The vehicle seat disclosed is equipped with a pop-up bar that is supported displaceably upward, an MGG that is operated to displace the pop-up bar upward, a tension cloth that is connected on an upper end side thereof to the pop-up bar and on a lower end side thereof to a front end side of a seat cushion, and a lateral collision ECU that operates the MGG in a case where a lateral collision of the vehicle is detected or predicted. The tension cloth is deployed such that a tensile force is applied between a connection portion thereof to the pop-up bar and a connection portion thereof to the seat cushion as the pop-up bar is displaced to a popped-up position.

19 Claims, 30 Drawing Sheets

(51) Int. Cl.
 *B60R 21/08* (2006.01)
 *B60R 21/02* (2006.01)

(56) References Cited

U.S. PATENT DOCUMENTS

| | | | |
|---|---|---|---|
| 5,474,329 A * | 12/1995 | Wade et al. | 280/749 |
| 5,806,923 A * | 9/1998 | Tschaschke et al. | 297/216.13 |
| 5,833,312 A * | 11/1998 | Lenz | 297/216.13 |
| 6,315,245 B1 * | 11/2001 | Ruff | 244/122 AG |
| 8,016,350 B2 * | 9/2011 | Dellanno | 297/216.12 |
| 8,485,551 B2 * | 7/2013 | Dainese et al. | 280/730.2 |
| 8,690,187 B2 * | 4/2014 | Fukawatase | 280/730.2 |
| 8,899,619 B2 * | 12/2014 | Fukawatase | 280/749 |
| 2003/0184061 A1 * | 10/2003 | Honda et al. | 280/730.2 |
| 2004/0075254 A1 * | 4/2004 | Honda | 280/730.2 |
| 2004/0245813 A1 * | 12/2004 | Steffens, Jr. | 297/216.1 |
| 2006/0119082 A1 * | 6/2006 | Peng et al. | 280/730.2 |
| 2006/0289220 A1 * | 12/2006 | Oota et al. | 180/274 |
| 2007/0018442 A1 * | 1/2007 | Kwok | 280/749 |
| 2012/0126518 A1 | 5/2012 | Fukawatase | |
| 2014/0015233 A1 * | 1/2014 | Fukawatase | 280/730.1 |
| 2014/0042733 A1 * | 2/2014 | Fukawatase | 280/730.2 |

FOREIGN PATENT DOCUMENTS

| | | |
|---|---|---|
| JP | A-2007-8194 | 1/2007 |
| JP | A-2009-29182 | 2/2009 |
| JP | 2009-234537 A | 10/2009 |
| JP | A-2009-280089 | 12/2009 |
| JP | 2010-137762 A | 6/2010 |
| WO | WO 2011/016107 A1 | 2/2011 |

* cited by examiner

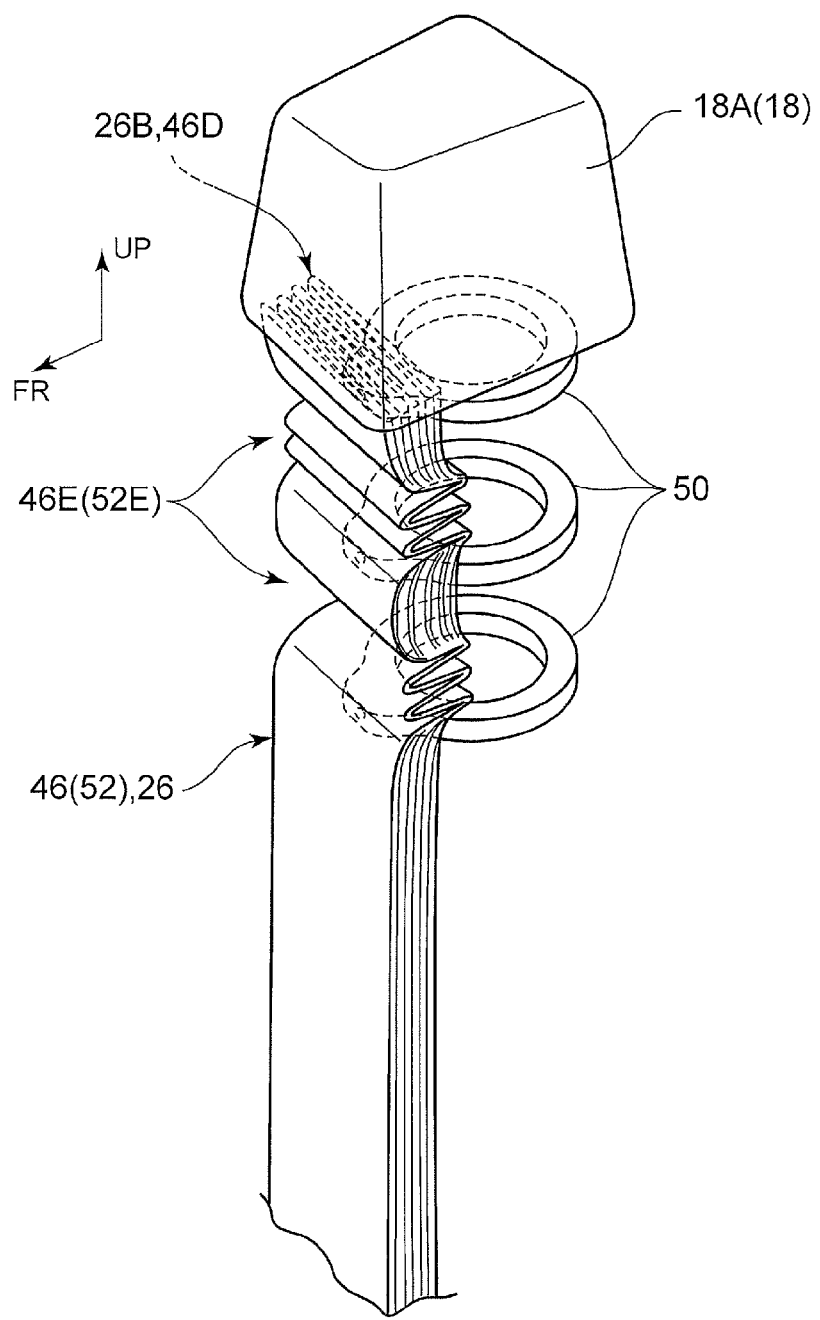

VEHICLE SEAT

TECHNICAL FIELD

The invention relates to a vehicle seat.

BACKGROUND ART

There is known an art of stretching a belt from a shoulder of a seat back to a front end of a seat cushion upon prediction of a lateral collision, so as to prevent a seated passenger from moving laterally of a vehicle (e.g., see Japanese Patent Application Publication No. 2007-8194 (JP-2007-8194 A)). Besides, there is known an art of preventing a side airbag from moving outward in a vehicle width direction with the aid of a belt that is stretched from an upper end of a seat back to a front end of a seat cushion in the event of a lateral collision (e.g., see Japanese Patent Application Publication No. 2009-29182 (JP-2009-29182 A)).

SUMMARY OF THE INVENTION

Problem to be Solved by the Invention

In each of the aforementioned arts, the upper end of the seat back imposes restrictions on the position where an upper end of the belt is supported. Therefore, there is a room for improvement from the standpoint of effectively preventing the passenger or the airbag from moving.

It is an object of the invention to obtain a vehicle seat that can effectively restrain a passenger from moving outward in a vehicle width direction in the event of a collision of a vehicle.

Means for Solving the Problem

A vehicle seat according to a first aspect of the invention is equipped with a movable support body that is supported displaceably upward with regard to a vehicle with respect to a seat back, an actuator that is operated to displace the movable support body upward with regard to the vehicle with respect to the seat back, a lateral deployment member that is connected on an upper end side thereof to the movable support body and on a lower end side thereof to a front end side of a seat cushion, is accommodated from a lateral portion of the seat cushion to a lateral portion of the seat back, and is deployed such that a tensile force is applied between a connection portion thereof to the movable support body and a connection portion thereof to the seat cushion as the movable support body is displaced upward with regard to the vehicle with respect to the seat back, and a control device that operates the actuator in a case where a collision of the vehicle is detected or predicted.

According to the aforementioned aspect of the invention, the actuator is operated by the control device when a collision of the vehicle is detected or predicted. Then, the movable support body is displaced upward with respect to the seat back, and the lateral deployment member that is connected at the upper end thereof to the movable support body is deployed (provided in a tensioned state) between upper and lower connection points while being pulled out from the seat back and the seat cushion. Thus, a line (a tension line) that links the upper and lower connection points of the lateral deployment member with each other is located more forward with regard to the vehicle than in a configuration in which the upper end of the lateral deployment member is located at the upper end of the seat back, and an upper part of the seated passenger can be effectively restrained.

In this manner, in the vehicle seat according to the aforementioned aspect of the invention, the passenger can be effectively restrained from moving outward in the vehicle width direction in the event of a collision of the vehicle.

In the aforementioned aspect of the invention, the lateral deployment member may be constituted by a planar cloth material or a mesh material that is connected, on a rear end side thereof with regard to the vehicle, to a frame of the seat back.

According to the aforementioned aspect of the invention, the seated passenger can be prevented from moving laterally over a wide range including that region of the lateral deployment member which is formed by the aforementioned tension line and a region behind the tension line and assumes a generally triangular shape in a lateral view.

In the aforementioned aspect of the invention, the vehicle seat may be configured to be further equipped with a side airbag device that includes a side airbag that is accommodated in the seat back and is expanded and deployed between the lateral deployment member and at least a breast and a shoulder of a seated passenger in a case where a collision of the vehicle is detected or predicted.

According to the aforementioned aspect of the invention, the side airbag is expanded and deployed between the lateral deployment member and the breast and shoulder of the seated passenger in the event of a lateral collision. The side airbag is prevented from being displaced in the vehicle width direction by the lateral deployment member. Besides, since the side airbag is expanded and deployed along the lateral deployment member, the direction of deployment of the side airbag in the early phase of deployment is stabilized. Furthermore, since the shoulder (a shoulder center) of the seated passenger is restrained by the side airbag, the passenger is effectively restrained from moving in the vehicle width direction.

In the aforementioned aspect of the invention, the side airbag may have a head protection chamber that restrains a head of the seated passenger.

According to the aforementioned aspect of the invention, the head of the passenger can be laterally protected by the head protection chamber.

In the aforementioned aspect of the invention, the head protection chamber may be connected to the movable support body in a state of being accommodated in the seat back.

According to the aforementioned aspect of the invention, the side airbag that includes the head protection chamber is also pulled out from the seat back as the movable support body is displaced upward with respect to the seat back. This side airbag continues to be expanded and deployed forward. At this time, since the movable support body supports a deployment reactive force of the head protection chamber, the head protection chamber can be stably expanded and deployed in a short time.

In the aforementioned aspect of the invention, the vehicle seat may be configured such that the side airbag has a lower portion that is connected to the frame of the seat back, and an upper portion that includes that region of the head protection chamber which is connected to the movable support body, the lower portion and the upper portion being folded in a longitudinal direction with regard to the vehicle, and a region between the upper portion and the lower portion being folded in a vertical direction with regard to the vehicle, and that that region of the side airbag which is folded in the vertical direction with regard to the vehicle is provided with a ring-shaped member through which at least one of the frame and the movable support member is inserted and which prevents the frame and the movable support body from being displaced relatively to each other in the longitudinal direction while allowing the frame and the movable support body to be displaced relatively to each other in the vertical direction.

According to the aforementioned aspect of the invention, in the configuration in which the support region of the side airbag includes the movable support body, the side airbag can be supported from behind on the frame or the movable support body via the ring-shaped member, while being caused to follow the displacement of the movable support body.

In the aforementioned aspect of the invention, the vehicle seat may be configured such that the lateral deployment member has an overhang portion that overhangs forward with regard to the vehicle from a line that links the connection portion to the movable support body and the connection portion to the seat cushion with each other, in a deployed state, and that that region of the head protection chamber which is located on a front end side in an expanded and deployed state is connected to the overhang portion.

According to the aforementioned aspect of the invention, when the side airbag is pulled out from the seat back as the lateral deployment member is deployed, the head protection chamber that is connected to the overhang portion is urged to be pulled out forward. Besides, in the expanded and deployed state of the head protection chamber, the overhang portion of the lateral deployment member can also prevent the passenger from moving laterally. That is, the range in which the seated passenger is prevented from moving laterally is widened.

In the aforementioned aspect of the invention, that region of the head protection chamber which is located on the front end side in the expanded and deployed state and the overhang portion may be connected to each other in such a manner as to be separated from each other upon completion of expansion and deployment of the head protection chamber.

According to the aforementioned aspect of the invention, the head protection chamber and the lateral deployment member are separated from each other upon the completion (immediately before the completion) of expansion and deployment of the head protection chamber. Thus, the shape of deployment of the lateral deployment member is restrained from being restricted by the shape of expansion and deployment of the head protection chamber.

In the aforementioned aspect of the invention, that region of the head protection chamber which is located on the front end side in the expanded and deployed state and the overhang portion may be connected to each other by a tear seam.

According to the aforementioned aspect of the invention, if the tear seam is ruptured in the process to the completion of expansion and deployment of the head protection chamber, the head protection chamber and the lateral deployment member are separated from each other. Thus, the shape of deployment of the lateral deployment member is restrained from being restricted by the shape of expansion and deployment of the head protection chamber.

In the aforementioned aspect of the invention, the vehicle seat may be configured such that lateral deployment members and side airbags as mentioned in the aforementioned aspect of the invention are provided on both sides in a vehicle width direction respectively, that the side airbag that is arranged on an outer side in the vehicle width direction has a lumbar protection chamber that restrains a lumbar of the seated passenger, and that the side airbag that is arranged on an inner side in the vehicle width direction has an abdomen protection chamber that restrains an abdomen of the seated passenger.

According to the aforementioned aspect of the invention, on the outer side of the seated passenger in the vehicle width direction, the seated passenger is well protected from a collision by the main body (the breast and shoulder) of the side airbag, the head protection chamber, and the lumbar protection chamber. On the other hand, on the inner side of the seated passenger in the vehicle width direction, the seated passenger is well protected from an interference with an adjacent passenger by the main body (the breast and shoulder) of the side airbag, the head protection chamber, and the abdomen protection chamber.

In the aforementioned aspect of the invention, at least one of the lumbar protection chamber and the abdomen protection chamber may be connected to a lower portion of the lateral deployment member that is arranged on a same side as at least one of the lumbar protection chamber and the abdomen protection chamber in the vehicle width direction, in the vertical direction with regard to the vehicle.

According to the aforementioned aspect of the invention, when the side airbag is pulled out from the seat back as the lateral deployment member is deployed, at least one of the lumbar protection chamber and the abdomen protection chamber that are connected to the lateral deployment member is urged to be pulled out forward.

In the aforementioned aspect of the invention, the vehicle seat may be configured to be further equipped with a restraint device that is operated to restrain the seated passenger in such a manner as to restrain the seated passenger from moving forward with regard to the vehicle, and a control device that operates the restraint device, the actuator on a collision side, and the side airbag device on the collision side, in a sequence of the restraint device, the actuator on the collision side, and the side airbag device on the collision side, in a case where a minute lap collision of the vehicle is detected.

According to the aforementioned aspect of the invention, in the event of a minute lap collision, the restraint device, the actuator on the collision side, and the side airbag device on the collision side are operated in this sequence by the control device. It should be noted herein that the seated passenger moves forward with regard to the vehicle in the early stage of the minute lap collision. After this movement is restrained by the restraint device, the seated passenger is laterally (from the collision side) restrained by the lateral deployment member and the side airbag. Thus, the passenger seated in the vehicle seat can be effectively restrained in response to (protected from) the minute lap collision.

In the aforementioned aspect of the invention, the vehicle seat may be configured to be further equipped with a restraint device that is operated to restrain the seated passenger in such a manner as to restrain the seated passenger from moving forward with regard to the vehicle, and a control device that operates the restraint device, the actuator on a collision side, and the side airbag device on the collision side, in a sequence of the actuator on the collision side, the side airbag device on the collision side, and the restraint device in a case where an oblique collision of the vehicle is detected.

According to the aforementioned aspect of the invention, in the event of an oblique collision, the actuator on the collision side, the side airbag device on the collision side, and the restraint device are operated in this sequence by the control device. It should be noted herein that the seated passenger moves forward with regard to the vehicle while moving laterally of the vehicle on the collision side, in the early phase of the oblique collision. This seated passenger is restrained (is restrained from laterally moving) by the lateral deployment member and the side airbag, and then is restrained from ahead by the restraint device. Thus, the passenger seated in the vehicle seat can be effectively restrained in response to (protected from) the oblique collision.

In the aforementioned aspect of the invention, the vehicle seat is configured such that the restraint device is configured to include a movable body that can assume a storage position at which the movable body is stored along a lateral edge portion of the seat cushion or the seat back, and an in-use position at which the movable body is arranged along the vehicle width direction while being spaced apart from the abdomen of the seated passenger forward with regard to the vehicle, a frontal collision airbag device that is provided on the movable body and deploys a frontal collision airbag between an upper body of the seated passenger and a vehicle structure located in front of the seated passenger upon being supplied with gas, a lap belt that is retained by the movable body and is removed from the movable body toward the lumbar side of the seated passenger in an event of reception of a tensile force equal to or larger than a predetermined value, and a pretensioner that pulls the lap belt in while applying the tensile force equal to or larger than the predetermined value to the lap belt, and that the control device operates the pretensioner and the frontal collision airbag device in a sequence of the pretensioner and the frontal collision airbag device, in a state where the movable body is located at the in-use position, in operating the restraint device.

According to the aforementioned aspect of the invention, at a timing when the restraint device is operated in the case where a minute lap collision or an oblique collision is detected, the control device operates the pretensioner and the frontal collision airbag device in this sequence, on the condition that the movable body be located at the in-use position. Then, in response to a forward moving (inertial) force resulting from the collision, the lumbar of the seated passenger is first restrained from moving forward by the lap belt, and then the upper body of the seated passenger is restrained from moving forward by the frontal collision airbag. Thus, the passenger seated in the vehicle seat can be more effectively restrained in response to (protected from) the minute lap collision or the oblique collision.

In the aforementioned aspect of the invention, the vehicle seat may be configured to be further equipped with a movable body that can assume a storage position at which the movable body is stored along a lateral edge portion of the seat cushion or the seat back, and an in-use position at which the movable body is arranged along the vehicle width direction while being spaced apart from the abdomen of the seated passenger forward with regard to the vehicle, a frontal collision airbag device that is provided on the movable body and deploys a frontal collision airbag between an upper body of the seated passenger and a vehicle structure located in front of the seated passenger upon being supplied with gas, a lap belt that is retained by the movable body and is removed from the movable body toward the lumbar side of the seated passenger in an event of reception of a tensile force equal to or larger than a predetermined value, a pretensioner that pulls the lap belt in while applying the tensile force equal to or larger than the predetermined value to the lap belt, and a control device that operates the pretensioner and the actuator on a collision side in a case where either a minute lap collision or an oblique collision of the vehicle is predicted, and operates the frontal collision airbag device and the side airbag device on the collision side in a case where either a minute lap collision or an oblique collision of the vehicle is detected.

According to the aforementioned aspect of the invention, in the case where a minute lap collision or an oblique collision is predicted, the pretensioner and the actuator are operated. Thus, prior to the collision, the lumbar of the seated passenger is restrained by the lap belt, and the lateral deployment member is deployed laterally of the seated passenger on the collision side. Incidentally, it is preferable that the pretensioner be operated prior to the actuator in the event of the minute lap collision, and that the actuator be operated prior to the pretensioner in the event of the oblique collision.

Then, in the case where the minute lap collision or the oblique collision is detected, the control device operates the frontal collision airbag device and the side airbag device. Thus, the seated passenger is restrained from moving forward and laterally on the collision side by the frontal collision airbag and the side airbag. The passenger has been restrained (made ready) by the lap belt and the lateral deployment member prior to the deployment of this frontal collision airbag and this side airbag. Therefore, the passenger seated in the vehicle seat can be effectively restrained in response to (protected from) the minute lap collision or the oblique collision. Incidentally, it is preferable that the frontal collision airbag be operated prior to the side airbag in the case of the minute lap collision, and that the side airbag be operated prior to the frontal collision airbag in the case of the oblique collision.

In the aforementioned aspect of the invention, the actuator may be configured to displace the movable support body upward with regard to the vehicle, with respect to an upper end of a head rest that is provided on the seat back.

According to the aforementioned aspect of the invention, the upper end of the lateral deployment member is located above the head rest, namely, the position of the head of the seated passenger. Therefore, the line (the tension line) that links the upper and lower connection points of the lateral deployment member with each other is located more forward with regard to the vehicle. Thus, the performance of restraining the seated passenger can be improved.

In the aforementioned aspect of the invention, the actuator may be configured to displace a connection portion of the movable support body to at least the lateral deployment member upward with regard to the vehicle, with respect to an upper end of a head rest that is provided on the seat back.

According to the aforementioned aspect of the invention, the connection region of the lateral deployment member to the movable support member is located above the head rest, namely, the position of the head of the seated passenger. Therefore, the line (the tension line) that links the upper and lower connection points of the lateral deployment member with each other is located more forward with regard to the vehicle. Thus, the performance of restraining the seated passenger can be improved.

In the aforementioned aspect of the invention, the vehicle seat may be configured such that the movable support body has a guided portion that assumes a shape of a circular arc that is convex backward with regard to the vehicle in a lateral view, and that the seat back is provided with a guide portion that guides the movable support body in the guided portion.

According to the aforementioned aspect of the invention, as the movable support body is displaced upward, the amount of backward displacement decreases in comparison with a configuration in which the movable support body is rectilinearly displaced diagonally upward and backward, or forward displacement is caused (a forward displacement component is generated). Thus, the movable support body is restrained from moving away from the head of the seated passenger after displacement, and the performance of restraining the seated passenger can be improved.

In the aforementioned aspect of the invention, the guide portion and the guided portion may be configured such that the movable support body is located more forward with regard to the vehicle after being displaced upward by the actuator than before being displaced upward by the actuator.

According to the aforementioned aspect of the invention, the movable support body is displaced forward as well while being displaced upward. Thus, the movable support body approaches the head of the seated passenger after displacement, and the performance of restraining the seated passenger is improved.

Effect of the Invention

As described above, the vehicle seat according to the invention has an excellent effect of making it possible to effectively restrain the passenger from moving outward in the vehicle width direction in the event of a collision of the vehicle.

BRIEF DESCRIPTION OF THE DRAWINGS

FIG. 10 is a perspective view showing on an enlarged scale a folded state of upper portions of one of the tension cloths and one of the side airbags in the vehicle seat according to the second embodiment of the invention.

MODES FOR CARRYING OUT THE INVENTION

A vehicle seat 10 according to the first embodiment of the invention will be described on the basis of FIGS. 1 to 5. Incidentally, arrows FR, UP and OUT, which are shown in the respective drawings as appropriate, denote a forward direction (a traveling direction), an upward direction, and an outer side in a vehicle width direction of an automobile to which the vehicle seat 10 is applied, respectively. In the case where the following description will be given simply using a longitudinal direction and a vertical direction, the longitudinal direction with regard to the vehicle and the vertical direction with regard to the vehicle are meant respectively, unless otherwise specified.

Figure 1:
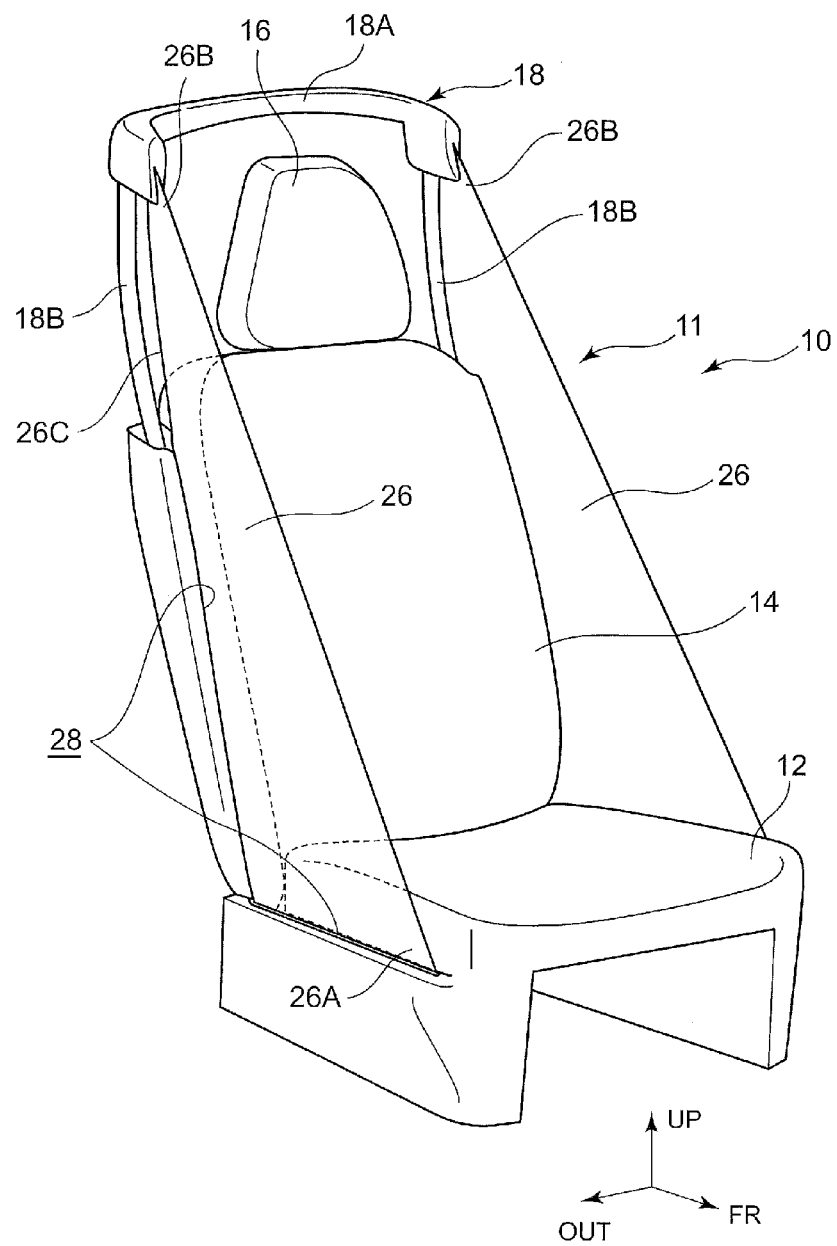
FIG. 1 is a perspective view as viewed from a diagonally front area, showing a deployed state of tension cloths in a vehicle seat according to a first embodiment of the invention.
Figure 2:
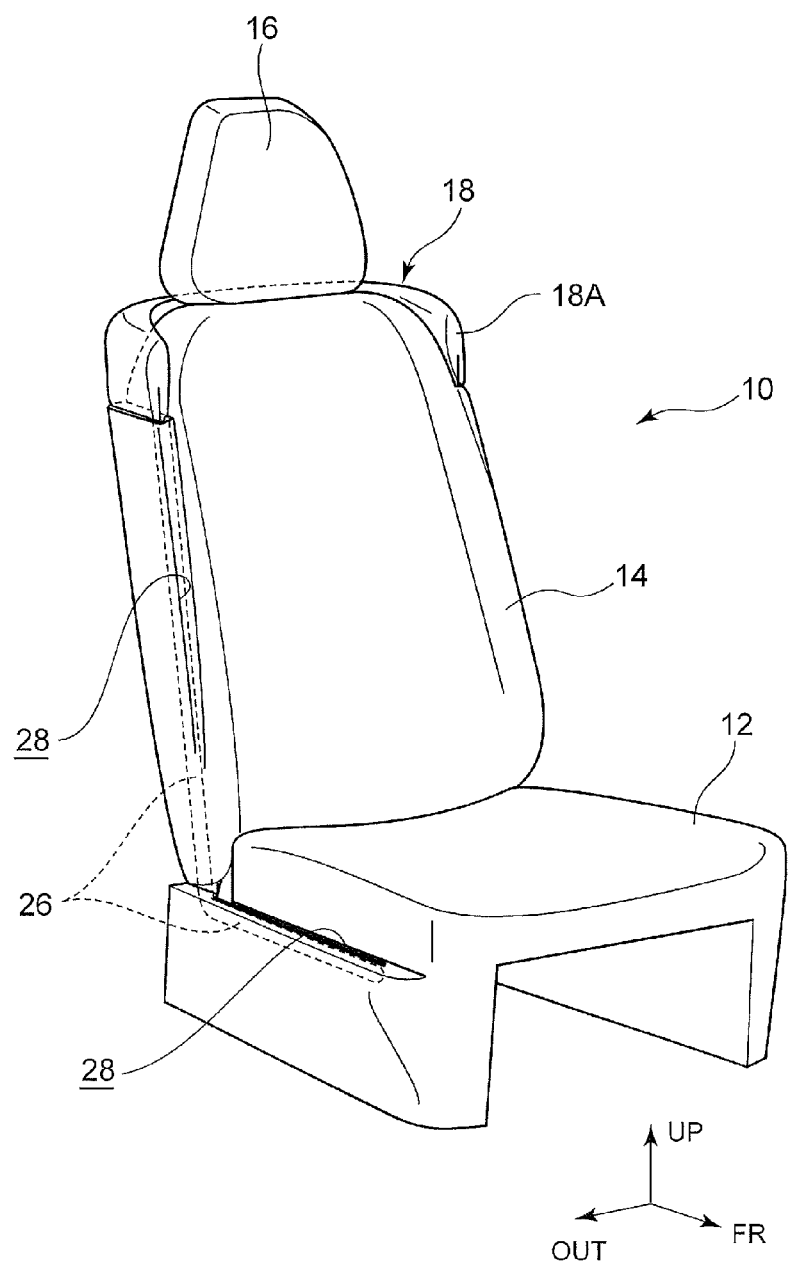
FIG. 2 is a perspective view as viewed from the diagonally front area, showing a normal state in the vehicle seat according to the first embodiment of the invention.

Each of FIGS. 1 and 2 is a perspective view showing the vehicle seat 10 to which a later-described vehicle passenger restraint system 11 is applied. The vehicle seat 10 is provided such that a passenger is seated therein facing forward. More specifically, the vehicle seat 10 is mainly constituted of a seat cushion 12 that constitutes a seat portion, a seat back 14 that is connected at a lower end thereof to a rear end of the seat cushion 12 and constitutes a back rest, and a head rest 16 that is provided at an upper end of the seat back 14. The vehicle seat 10 in this embodiment of the invention is designed as a driver seat or a front passenger seat, but may also designed as a rear seat located in the second row or further behind.

(Configuration of Movable Support Body)

The vehicle seat 10 is equipped with a pop-up bar 18 as a movable support body that constitutes the vehicle passenger restraint system 11. The pop-up bar 18 can move from a stored position shown in FIG. 2 to a popped-up position as a position located above the stored position as shown in FIG. 1, with respect to the seat back 14. A concrete description will be given hereinafter.

The pop-up bar 18 is configured to have a bar main body 18A that extends along a seat width direction, and sliders (rods) 18B as a pair of right and left guided portions that are vertically suspended from both ends of the bar main body 18A in the seat width direction respectively. This pop-up bar 18 is supported, at the right and left sliders 18B, movably from the stored position to the popped-up position, by a seat back frame 14A (see FIGS. 3 and 4) of the seat back 14 via a pair of right and left guide pipes 20 as guiding portions, respectively. That is, each of the sliders 18B is slidably inserted in a corresponding one of the right and left guide pipes 20, and is configured to move from the stored position to the popped-up position by moving upward while being guided along the corresponding one of the guide pipes 20.

Figure 4:
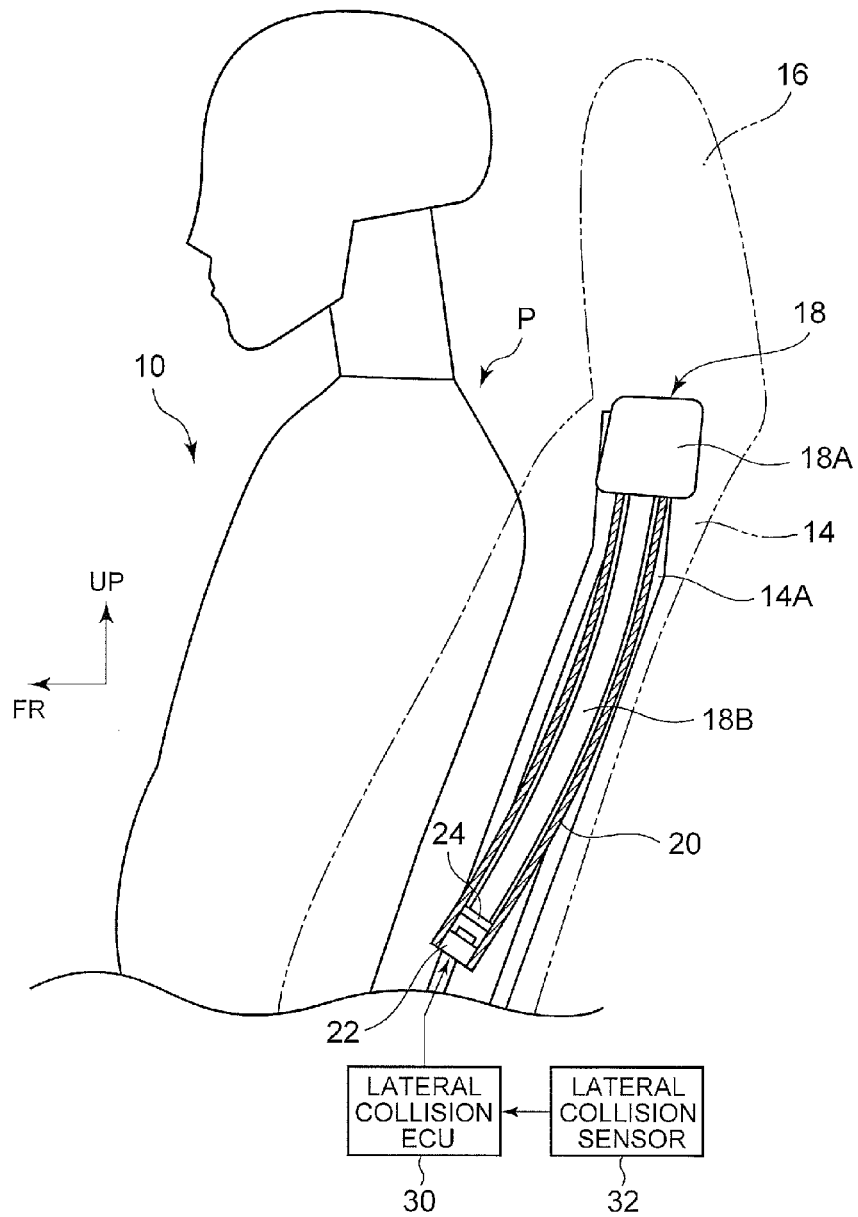
FIG. 4 is a lateral sectional view of the normal state, showing on an enlarged scale a pop-up bar and a guide pipe that constitute the vehicle seat according to the first embodiment of the invention.
Figure 5:
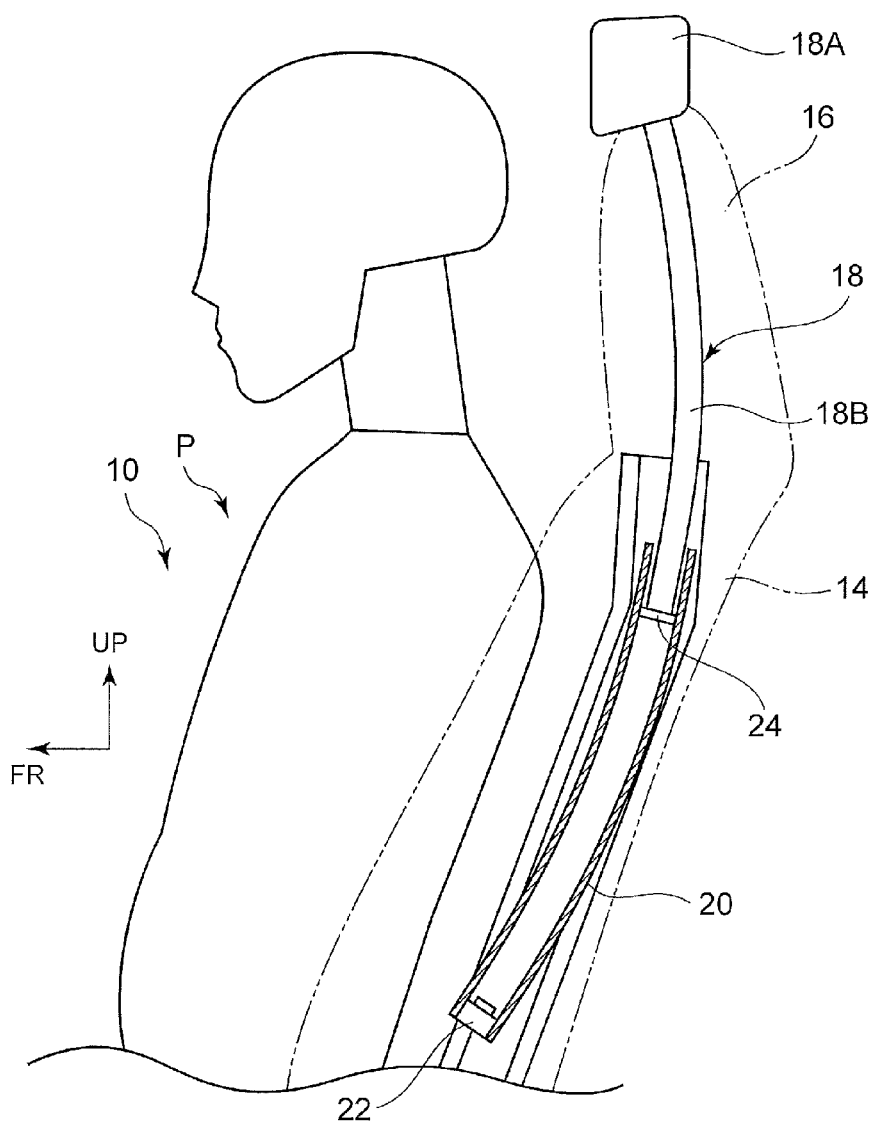
FIG. 5 is a lateral sectional view of a popped-up state, showing on an enlarged scale the pop-up bar and the guide pipe that constitute the vehicle seat according to the first embodiment of the invention.

As shown in FIGS. 4 and 5, each of the sliders 18B and a corresponding one of the guide pipes 20 have a substantially equal radius of curvature at axial center portions thereof in a lateral view, and are formed in such a manner as to assume the shape of a circular arc that is convex backward. Thus, the pop-up bar 18, namely, the bar main body 18A is configured to be displaced forward while being displaced upward in the course of its movement from the stored position to the popped-up position. In this embodiment of the invention, the bar main body 18A is set such that a longitudinal position thereof at the popped-up position is located in front of a longitudinal position thereof at the stored position.

Figure 3:
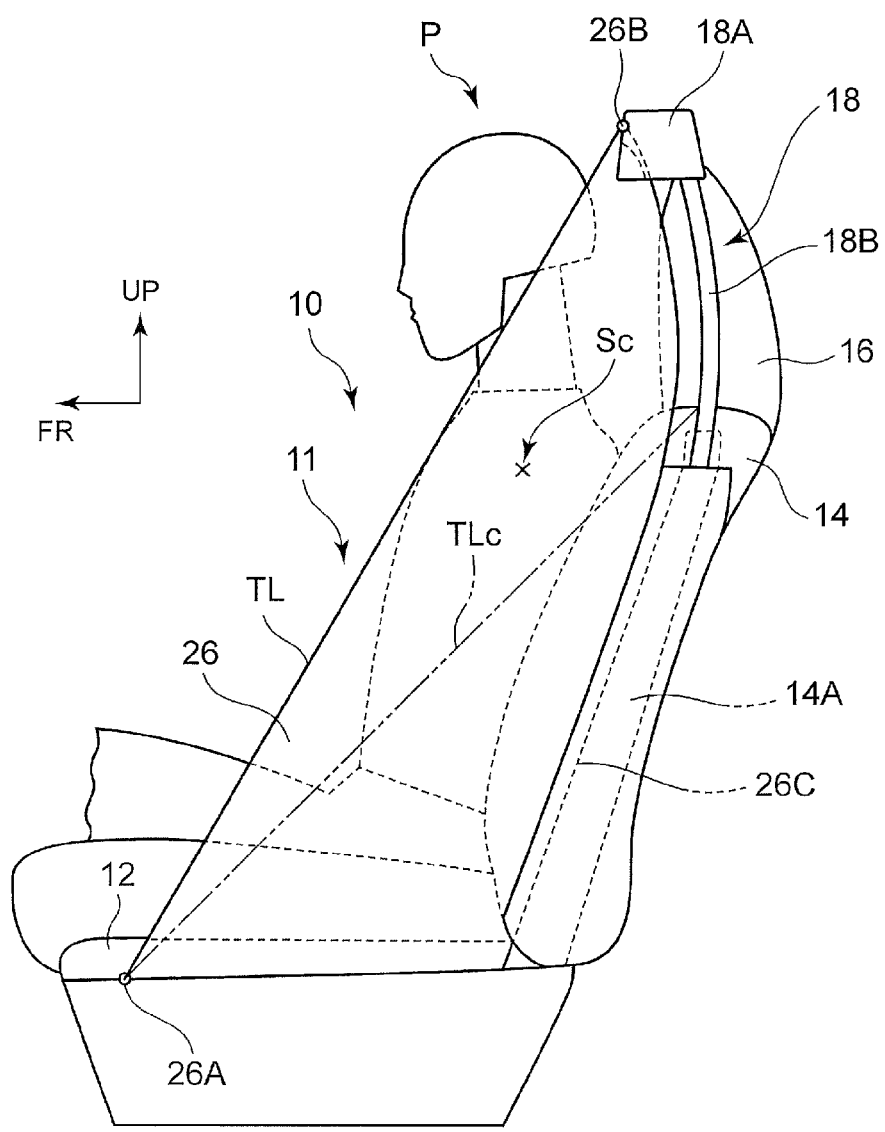
FIG. 3 is a lateral view showing a deployed state of one of the tension cloths in the vehicle seat according to the first embodiment of the invention.

In this embodiment of the invention, as shown in FIG. 3, the longitudinal position of the bar main body 18A (connected positions of upper ends of later-described tension cloths 26) at the popped-up position is located in front of a longitudinal position of an upper end of the seat back frame 14A. Besides, a vertical position of the bar main body 18A at the popped-up position (the connected positions of the upper ends of the later-described tension cloths 26) is located above an uppermost portion of the head rest 16.

In the pop-up bar 18 described above, the bar main body 18A is exposed to the outside at the stored position shown in FIG. 2. That is, each of the guide pipes 20 and a corresponding one of the sliders 18B inserted in each of the guide pipes 20 are configured to be covered with a skin material (and a cushion material) of the seat back 14 without being exposed to the outside. On the other hand, at the popped-up position shown in FIG. 1, the bar main body 18A is exposed to the outside together with the upper portions of the sliders 18B.

In addition, as shown in FIGS. 4 and 5, each of micro gas generators (hereinafter referred to as "MGG's") 22 is provided at a lower end of a corresponding one of the guide pipes 20, in such a manner as to close the lower end. The pop-up bar 18 is configured to move from the stored position to the popped-up position through the operation of the MGG's 22. More specifically, each of pistons 24, which is arranged in a corresponding one of the guide pipes 20 slidably with respect to an inner face of the corresponding one of the guide pipes 20, is fixed to a lower end of a corresponding one of the sliders 18B. Thus, if the MGG's 22 are operated to supply gas into the guide pipes 20, the pop-up bar 18 is moved from the stored position to the popped-up position by the pistons 24 that have received this gas pressure, and is held at the popped-up position. Accordingly, it is appropriate to understand that at least the MGG's 22 are equivalent to the actuator in the invention, and that the actuator is configured to include the guide pipes 20 and the pistons 24. Furthermore, it is appropriate to understand that the bar main body 18A is the movable support body of the invention, and that the sliders 18B are part of the actuator.

(Configuration of Lateral Deployment Member)

As shown in FIG. 1, the vehicle passenger restraint system 11 is equipped with the tension cloths 26 that are deployed laterally of the vehicle seat 10 in the event of a later-described lateral collision and serve as lateral deployment members. As shown in FIG. 3, each of the tension cloths 26 assumes a generally triangular shape in a lateral view in a deployed state. Each of the tension cloths 26 is constituted by a planar cloth material or a mesh material (a net). In this embodiment of the invention, there is shown an example in which the tension cloths 26 are provided on both right and left sides of the vehicle seat 10 respectively. However, it is appropriate to adopt a configuration in which the tension cloth 26 is provided only on the right or left side of the vehicle seat 10. Incidentally, the tension cloth 26 that is provided on an outer side in a vehicle width direction performs a function of preventing a seated passenger P from moving outward in the vehicle width direction in the event of a collision, mainly a lateral collision or the like. On the other hand, the tension cloth 26 that is provided on an inner side in the vehicle width direction performs a function of suppressing an interference with a passenger P seated in an adjacent seat in the event of a collision, mainly a lateral collision or the like.

Each of the tension cloths 26 is connected at a lower end 26A thereof to a seat cushion frame (not shown) or the like on a front end side of the seat cushion 12. On the other hand, each of the tension cloths 26 is connected at an upper end 26B thereof to a corresponding one of ends of the bar main body 18A of the pop-up bar 18 in the seat width direction respectively. Furthermore, each of the tension cloths 26 is connected at a rear edge portion 26C thereof to the seat back frame 14A or a corresponding one of the guide pipes 20.

Each of the tension cloths 26 is folded generally in the shape of "L" along lateral portions of the seat cushion 12 and the seat back 14, and is accommodated in the lateral portions of the seat cushion 12 and the seat back 14 as shown in FIG. 2, in a state where the pop-up bar 18 is located at the stored position. Nicks (slits) 28 for allowing each of the tension cloths 26 to overhang are formed in the lateral portions of the seat cushion 12 and the seat back 14, respectively. For example, the nicks 28 may be formed in the skins of the seat cushion 12 and the seat back 14 respectively. In a configuration in which cover members (a side cover of the seat cushion, a seat back board of the seat back, and the like) are provided, the nicks 28 may be formed at borders between the cover members and the skins respectively.

In addition, each of the tension cloths 26 is pulled out from the seat cushion 12 and the seat back 14 through the nicks 28 to be deployed as shown in FIG. 1, as the pop-up bar 18 makes a transition from the stored position to the popped-up position. In this deployed state, a tensile force is applied to each of the tension cloths 26 along a line (a tension line TL) that links the lower end 26A thereof connected to the seat cushion 12 and the upper end 26B thereof connected to the bar main body 18A with each other. The tension cloths 26 in this deployed state prevent the seated passenger P from moving outward in the seat width direction (inward and outward in the aforementioned vehicle width direction).

(Configuration of Control Device)

As shown in FIG. 4, each of the MGG's 22 is electrically connected to a lateral collision ECU 30 as a control device that constitutes the vehicle passenger restraint system 11. Besides, a lateral collision sensor 32 that detects a lateral collision is electrically connected to the lateral collision ECU 30. The lateral collision ECU 30 operates the MGG's 22 if (the inevitability of) a lateral collision is detected on the basis of a signal from the lateral collision sensor 32.

Next, the operation of the first embodiment of the invention will be described.

In the vehicle seat 10 configured as described above, the lateral collision ECU 30 that has detected a lateral collision operates the MGG's 22 on the basis of a signal from the lateral collision sensor 32. Then, the pop-up bar 18 makes a transition from the stored position to the popped-up position due to a gas pressure from the MGG's 22. As this transition is made, each of the tension cloths 26 is pulled out from the seat cushion 12 and the seat back 14 through the nicks 28, and is deployed as shown in FIGS. 1 and 3.

The seated passenger P is restrained from moving outward in the vehicle width direction through inertia, by the tension cloths 26 in this deployed state. That is, the seated passenger P is restrained by the tension cloths 26.

It should be noted herein that in the vehicle seat 10, the upper end 26B of each of the tension cloths 26 is connected to the bar main body 18A of the pop-up bar 18. Thus, the tension line TL in the deployed state is located more forward than in the case of, for example, a lateral deployment member according to a comparative example that is connected at an upper end thereof to an upper end of the seat back 14. More specifically, in the lateral deployment member according to the aforementioned comparative example, the tension line is denoted by TLc, as indicated by a fictitious line in FIG. 3. In contrast, in the vehicle seat 10, the upper end 26B of each of the tension cloths 26 in the deployed state is located above the upper end of the seat back 14, so that the tension line TL is located more forward than the tension line TLc of the comparative example.

Moreover, each of the sliders 18B and a corresponding one of the guide pipes 20 are circularly curved in a lateral view, so that the bar main body 18A at the popped-up position is located more forward than in the comparative example in which these components are formed in the shape of a backward inclined line along the lateral portion of the seat back 14. In particular, in this embodiment of the invention, since the bar main body 18A at the popped-up position, namely, the upper end 26B of each of the tension cloths 26 is located more forward than the longitudinal position at the stored position, the tension line TL is located further forward. Furthermore, since the upper end 26B of the tension cloth 26 that is connected to the bar main body 18A at the popped-up position is located above the head rest 16, the tension line TL is located further forward due to this as well. Thus, this embodiment of the invention makes it possible to obtain a configuration in which the tension line TL is located in front of a shoulder center Sc (see FIG. 3) of the seated passenger P.

In addition, since each of the tension cloths 26 is a sheet-like member that is connected at the rear edge portion 26C thereof to the seat back frame 14A or a corresponding one of the guide pipes 20, the seated passenger P can be effectively restrained from moving on a wide plane between the rear edge portion 26C and the tension line TL. That is, the effective area contributing to the restraint of the seated passenger P by the tension cloths 26 is wider than in a comparative example in which tension cloths whose upper ends coincide with the upper end of the seat back 14 are provided. Besides, the effective area contributing to the restraint of the seated passenger P by the tension cloths 26 is wider than in a configuration that is equipped with a configuration (which is included in the invention) that deploys a belt member that serves as a bridge between the bar main body 18A and the front end of the seat cushion 12. In this embodiment of the invention, the tension cloths 26 are in contact with a region including the shoulder center Sc of the seated passenger P, so that the seated passenger P can be effectively restrained at the shoulder thereof, which is a high-rigidity region.

In this manner, in the vehicle seat 10 according to the first embodiment of the invention, the passenger can be effectively restrained from moving outward in the vehicle width direction in the event of a lateral collision of the vehicle, by the tension cloth 26 on a collision side. Besides, the passenger can be effectively restrained from moving inward in the vehicle width direction (interfering with the adjacent passenger etc.) in the event of a lateral collision of the vehicle, by the tension cloth 26 on a counter collision side. Furthermore, since the effective area of the tension cloths 26 contributing to the restraint widens forward, the number of collision patterns in which the seated passenger P can be effectively restrained increases. For example, the seated passenger P can be more effectively restrained in response to an oblique collision or the like that causes the seated passenger P to move laterally while moving forward, than in a comparative example in which tension cloths that are connected at upper ends thereof to the upper end of the seat back 14 are provided. More specifically, the seated passenger P can also be protected from an oblique lateral collision with a collision angle of 75°.

Incidentally, it is appropriate to adopt a configuration in which the lateral collision ECU 30 operates the MGG's 22 to deploy the tension cloths 26 respectively upon predicting a lateral collision, in the aforementioned first embodiment of the invention.

Second Embodiment

A vehicle seat 40 according to the second embodiment of the invention will be described on the basis of FIGS. 6 to 12. Incidentally, those components which are basically the same as in the aforementioned first embodiment of the invention are denoted by the same reference symbols as in the aforementioned first embodiment of the invention respectively, and the description and illustration thereof may be omitted.

Figure 6:
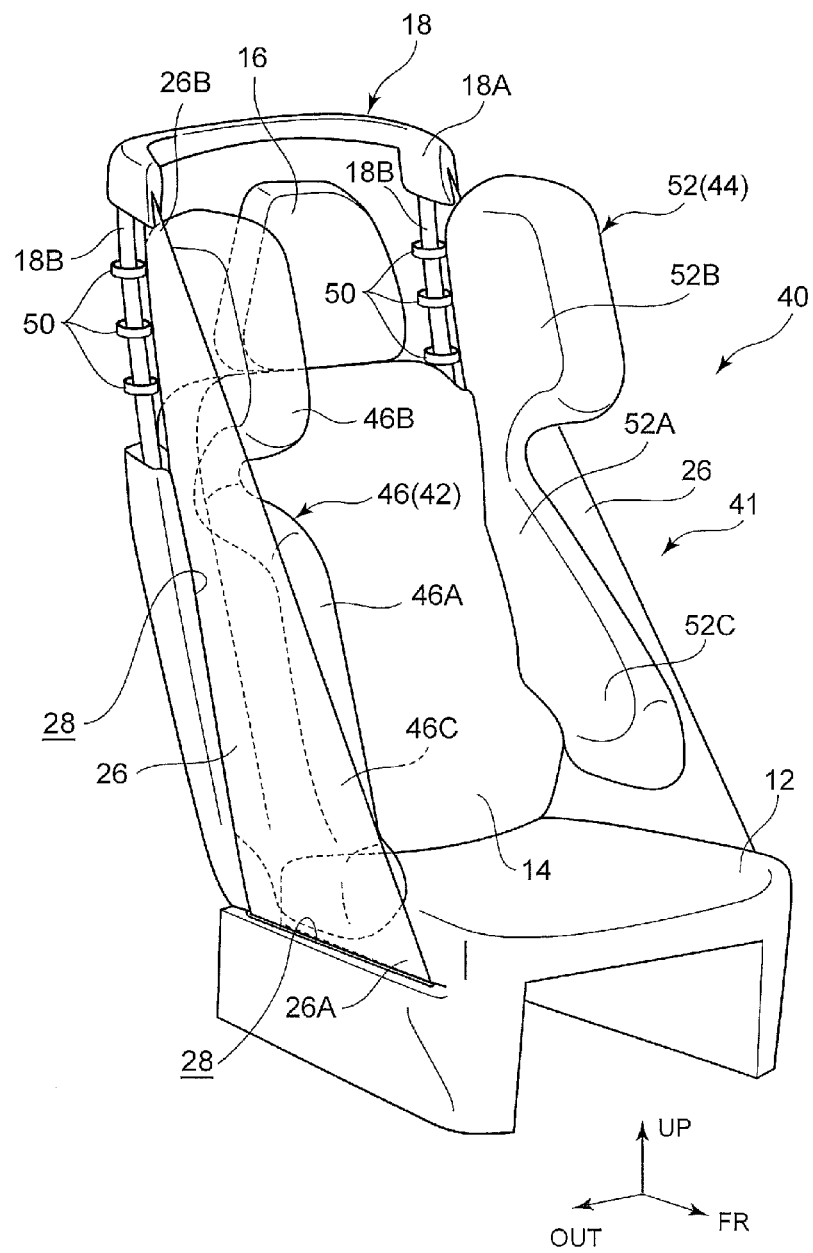
FIG. 6 is a perspective view as viewed from a diagonally front area, showing a deployed state of tension cloths and side airbags in a vehicle seat according to a second embodiment of the invention.

The vehicle seat 40 according to the second embodiment of the invention is shown in FIG. 6. As shown in this drawing, the vehicle seat 40 is different from the vehicle seat 10 according to the first embodiment of the invention in that side airbag devices are provided in addition to the tension cloths 26. In this embodiment of the invention, there is shown an example in which the side airbag devices that constitute a vehicle passenger restraint system 41 are provided on both right and left sides of the vehicle seat 40 respectively.

As shown in FIG. 6, a near side airbag device 42 is provided at the lateral portion of the seat back 14 constituting the vehicle seat 40 on the outer side in the vehicle width direction, and a far side airbag device 44 is provided at the lateral portion of the seat back 14 on the inner side in the vehicle width direction.

(Near Side Airbag Device)

The near side airbag device 42 is mainly constituted of a near side airbag 46 that is expanded and deployed on the outer side in the vehicle width direction with respect to the seated passenger P, and an inflator 48 that supplies gas to the near side airbag 46. The near side airbag device 42 is supported by the seat back frame 14A in the seat back 14, with respective portions of the near side airbag device 42, including the near side airbag 46 and the inflator 48, modularized. The near side airbag 46 is protruded outward of the seat back 14 from the nicks 28 during expansion and deployment, and is expanded and deployed inside the tension cloth 26 (on the seated passenger P side).

Figure 8:
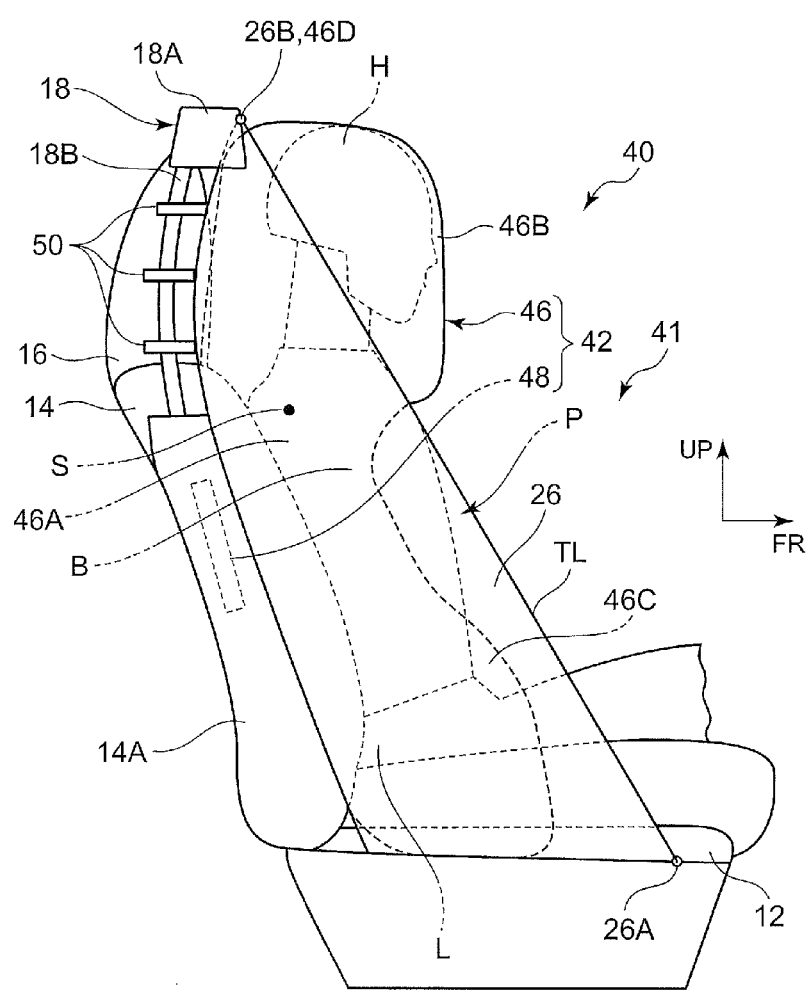
FIG. 8 is a lateral view as viewed from an outer side in the vehicle width direction, showing the deployed state of one of the tension cloths and one of the side airbags in the vehicle seat according to the second embodiment of the invention.

As shown in FIG. 8 as a lateral view, the near side airbag 46 is configured to include a central chamber 46A, a head protection chamber 46B, and a lumbar protection chamber 46C. The central chamber 46A is a chamber for restraining a breast B and a shoulder S of the seated passenger P. The head protection chamber 46B is a chamber for restraining a head H of the seated passenger P. The lumbar protection chamber 46C is a chamber for restraining a lumbar L of the seated passenger P. Incidentally, a recess that is faulted in the central chamber 46A (between the central chamber 46A and the head protection chamber 46B) serves as an escape portion of an arm of the seated passenger P. As shown in FIG. 11, the central chamber 46A and the lumbar protection chamber 46C are supported by a corresponding one of the guide pipes 20 (or the seat back frame 14A) via a bracket 51 and the built-in inflator 48. Besides, the head protection chamber 46B is connected, at a connection portion 46D thereof as an upper rear corner portion in an expanded and deployed state, to the bar main body 18A together with the upper end 26B of the tension cloth 26.

Figure 11A:
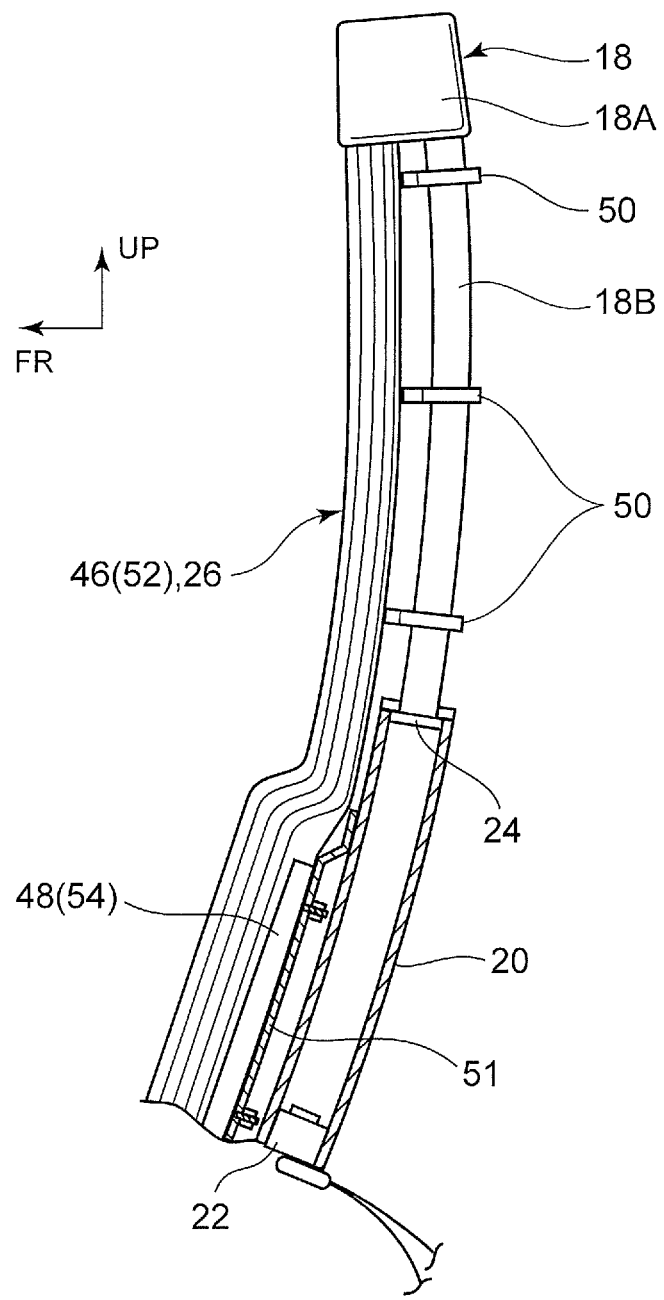
FIG. 11A is a view showing on an enlarged scale the folded state of the upper portions of one of the tension cloths and one of the side airbags in the vehicle seat according to the second embodiment of the invention, and is a lateral view of a state of being unbent in a vertical direction.
Figure 11B:
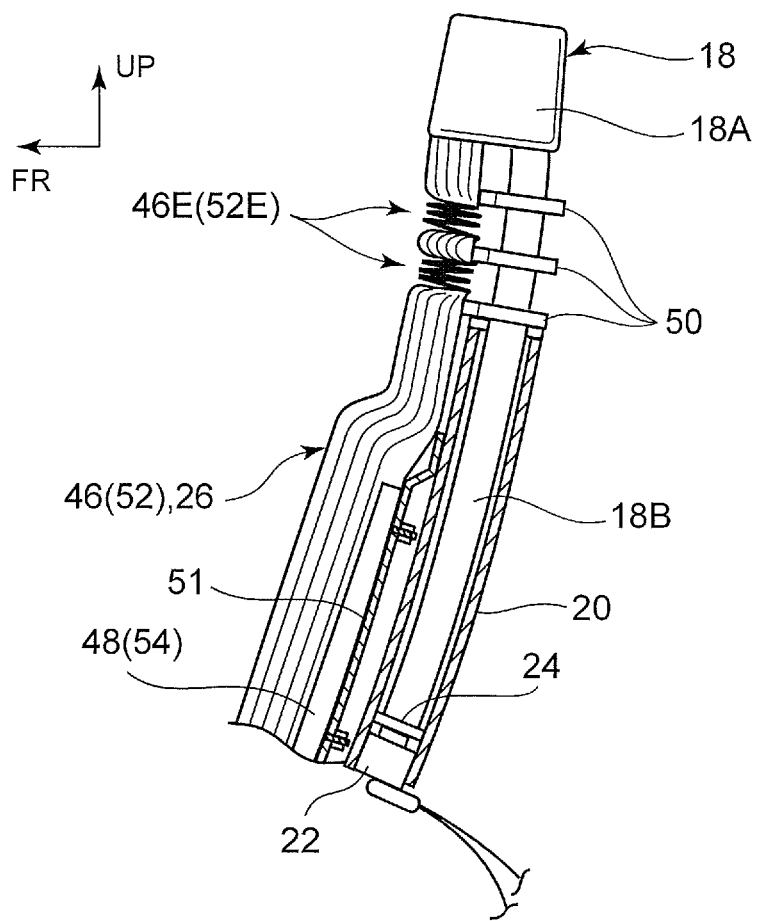
FIG. 11B is a view showing on an enlarged scale the folded state of the upper portions of one of the tension cloths and one of the side airbags in the vehicle seat according to the second embodiment of the invention, and is a lateral view prior to the unbending in the vertical direction.

That is, the near side airbag 46 is configured such that the upper end side thereof is moved upward as the pop-up bar 18 moves to the popped-up position. In order to allow this movement, the near side airbag 46 is folded as shown in FIGS. 10 and 11B. Besides, in this embodiment of the invention, the near side airbag 46 is folded together with the tension cloth 26 (that region of the tension cloth 26 which is accommodated in the seat back 14). More specifically, the tension cloth 26 and the near side airbag 46 are folded in the longitudinal direction in the manner of an accordion fold or the like (see FIG. 11A), and longitudinally folded intermediate portions thereof are folded in the vertical direction in the manner of an accordion fold or the like to create an vertically bent portion 46E (see FIG. 11B). This vertically bent portion 46E is formed between that region of the central chamber 46A which is connected to the guide pipe 20 via the inflator 48 and that region of the head protection chamber 46B which is connected to the bar main body 18A.

In addition, the near side airbag 46 is configured to allow the pop-up bar 18 to move from the stored position to the popped-up position, while unbending this vertically bent portion 46E. Besides, the near side airbag 46 that is located vertically in the vicinity of a backward convex bent portion of the vertically bent portion 46E and the vertically bent portion 46E is provided with ring-shaped members 50. The ring-shaped members 50 are provided by forming a foundation cloth constituting the near side airbag 46 in a loop manner, or connecting separate ring-shaped members, and at least one of the slider 18B and the guide pipe 20 is inserted through the interiors of the ring-shaped members 50. In this embodiment of the invention, a plurality of the ring-shaped members 50 are arranged while being vertically spaced apart from one another. The ring-shaped members 50 allow the pop-up bar 18 to move to the popped-up position while moving upward along with the unbending of the vertically bent portion 46E, and have a function of retaining part of the central chamber 46A and part of the head protection chamber 46B with respect to the guide pipe 20 and the slider 18B.

(Far Side Airbag Device)

The far side airbag device 44 is mainly constituted of a far side airbag 52 that is expanded and deployed on the inner side of the seated passenger P in the vehicle width direction, and an inflator 54 that supplies gas to the far side airbag 52. The far side airbag device 44 is supported by the seat back frame 14A in the seat back 14, with respective portions of the far side airbag device 44, including the far side airbag 52 and the inflator 54, modularized. The far side airbag 52 is protruded into the seat back 14 from the nicks 28 during expansion and deployment, and is expanded and deployed on the inner side (on the seated passenger P side) of the tension cloth 26.

Figure 7:
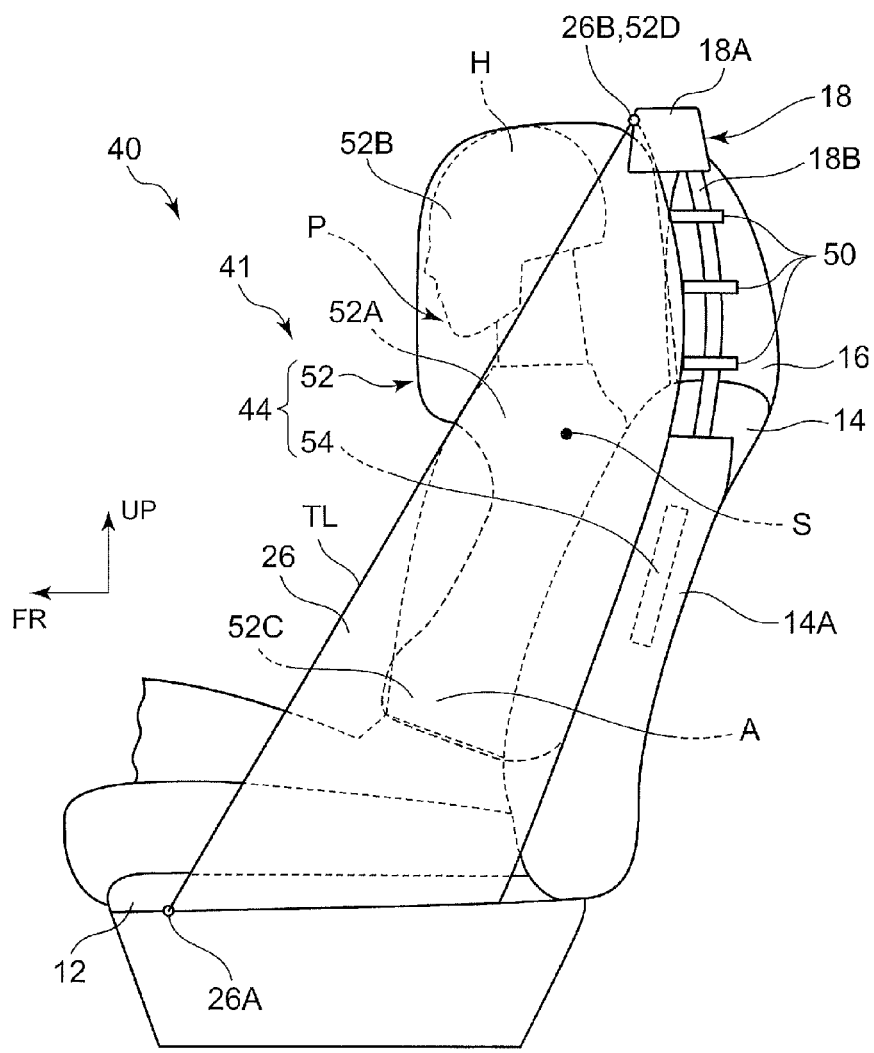
FIG. 7 is a lateral view as viewed from an inner side in a vehicle width direction, showing the deployed state of one of the tension cloths and one of the side airbags in the vehicle seat according to the second embodiment of the invention.

As shown in FIG. 7 as a lateral view, the far side airbag 52 is configured to include a central chamber 52A, a head protection chamber 52B, and an abdomen protection chamber 52C. The central chamber 52A is a chamber for restraining the breast B and the shoulder S of the seated passenger P. The head protection chamber 52B is a chamber for restraining the head H of the seated passenger P. The abdomen protection chamber 52C is a chamber for restraining an abdomen A of the seated passenger P.

Figure 9:
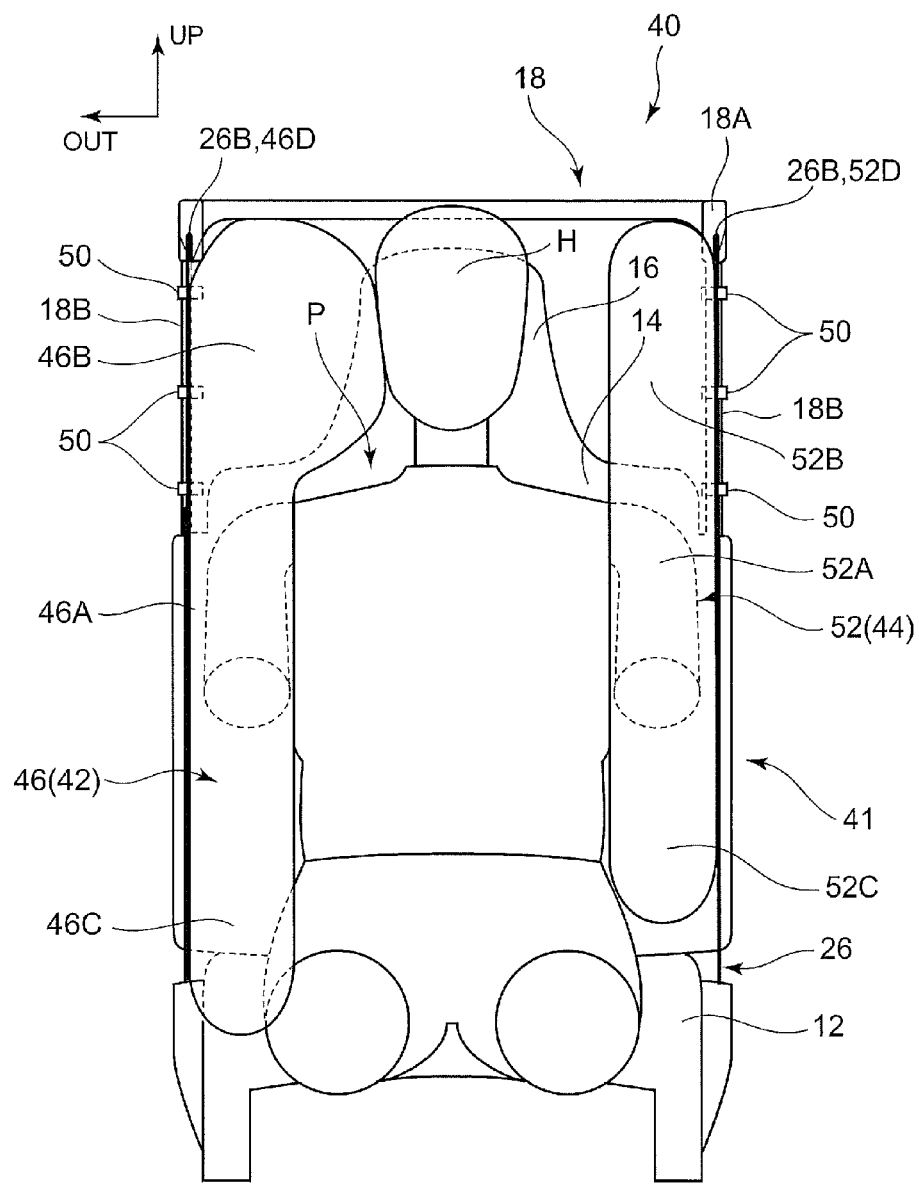
FIG. 9 is a front view showing the deployed state of the tension cloths and the side airbags in the vehicle seat according to the second embodiment of the invention.

Incidentally, a recess that is formed in the central chamber 52A (between the central chamber 52A and the head protection chamber 52B) serves as an escape portion of an arm of the seated passenger P. As shown in FIG. 11A and FIG. 11B, the central chamber 52A and the abdomen protection chamber 52C are supported by the guide pipe 20 (or the seat back frame 14A) via the bracket 51 and the built-in inflator 54. Besides, the head protection chamber 52B is connected, at a connection portion 52D thereof that serves as an upper rear corner portion in an expanded and deployed state, to the bar main body 18A together with the upper end 26B of the tension cloth 26. As shown in FIG. 9, the abdomen protection chamber 52C is expanded and deployed above the lumbar protection chamber 46C of the near side airbag 46.

That is, the far side airbag 52 is configured such that the upper end side thereof is moved upward as the pop-up bar 18 moves to the popped-up position. In order to allow this movement, the far side airbag 52 is folded as shown in FIG. 10 and FIG. 11B. Besides, in this embodiment of the invention, the far side airbag 52 is folded together with the tension cloth 26 (that region of the tension cloth 26 which is accommodated in the seat back 14). More specifically, the tension cloth 26 and the far side airbag 52 are folded in the longitudinal direction in the manner of an accordion fold or the like (see FIG. 11A), and longitudinally folded intermediate portions thereof are folded in the vertical direction in the manner of an accordion fold or the like to create an vertically bent portion 52E (see FIG. 11B). This vertically bent portion 52E is formed between that region of the central chamber 52A which is connected to the guide pipe 20 via the inflator 54 and that region of the head protection chamber 52B which is connected to the bar main body 18A.

In addition, the far side airbag 52 is configured to allow the pop-up bar 18 to move from the stored position to the popped-up position, while unbending this vertically bent portion 52E. Besides, a backward convex bent portion of the vertically bent portion 52E is provided with the ring-shaped members 50. The ring-shaped members 50 are provided by forming a foundation cloth constituting the far side airbag 52 in a loop manner, or connecting separate ring-shaped members, and the guide pipe 20 is inserted through the interiors of the ring-shaped members 50. In this embodiment of the invention, a plurality of the ring-shaped members 50 are arranged while being vertically spaced apart from one another. The ring-shaped members 50 allow the pop-up bar 18 to move to the popped-up position while moving upward along with the unbending of the vertically bent portion 52E, and have a function of retaining part of the central chamber 52A and part of the head protection chamber 52B with respect to the guide pipe 20 and the slider 18B.

(Configuration of Control Device)

Figure 12:
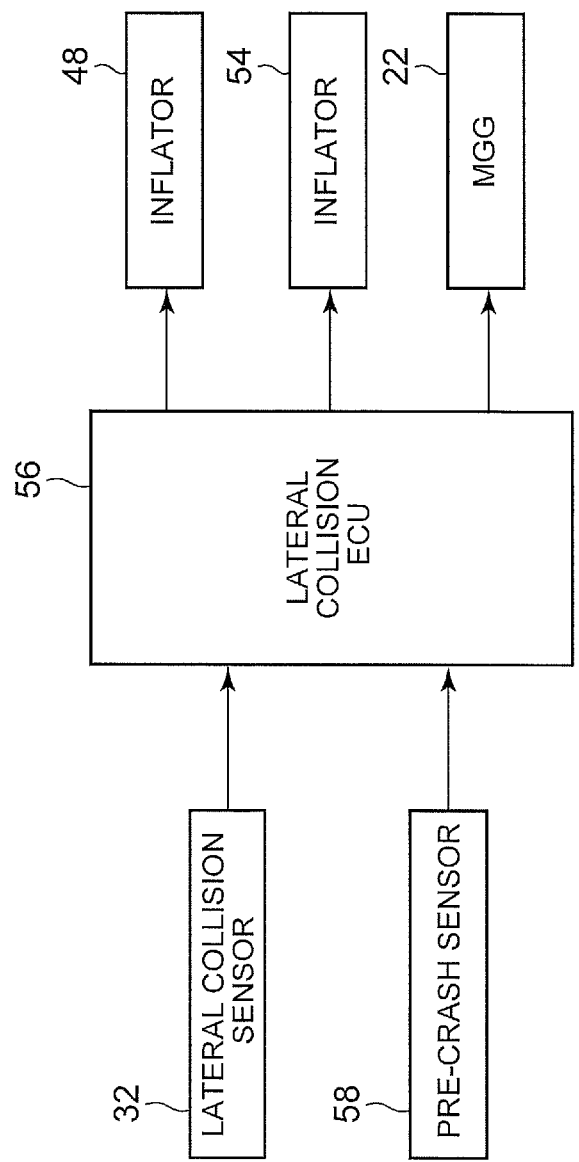
FIG. 12 is a block diagram showing a control system of the vehicle seat according to the second embodiment of the invention.

As shown in FIG. 12, the vehicle passenger restraint system 41 of the vehicle seat 40 is equipped with a lateral collision ECU 56 as a control device that controls the operation of the MGG's 22 and the inflators 48 and 54. The lateral collision ECU 56 is electrically connected to a pre-crash sensor 58 that predicts a lateral collision and the lateral collision sensor 32, as well as the MGG's 22 and the inflators 48 and 54. The lateral collision ECU 56 is configured to operate the MGG's 22 if a lateral collision is predicted on the basis of a signal from the pre-crash sensor 58, and to operate the inflators 48 and 54 if a lateral collision is detected on the basis of a signal from the lateral collision sensor 32. Thus, for example, the lateral collision ECU 56 operates the MGG's 22 about 300 milliseconds prior to the occurrence of a lateral collision to move the bar main body 18A to the popped-up position, and operates the inflators 48 and 54 1 to 10 milliseconds after the start (detection) of the lateral collision.

Other components of the vehicle seat 40, including those which are not shown, are configured in a manner similar to corresponding components of the vehicle seat 10, respectively.

Next, the operation of the second embodiment of the invention will be described.

In the vehicle seat 40 configured as described above, the lateral collision ECU 56 that has predicted a lateral collision on the basis of a signal from the pre-crash sensor 58 operates the MGG's 22. Then, the pop-up bar 18 makes a transition from the stored position to the popped-up position due to a gas pressure from the MGG's 22. Along with this transition, the tension cloths 26 are pulled out from the seat cushion 12 and the seat back 14 through the nicks 28, and are deployed as shown in FIG. 6. Besides, the near side airbag 46 and the far side airbag 52, which are connected at the connection portions 46D and 52D thereof to the bar main body 18A respectively, are at least partially pulled out from the seat back 14 through the nicks 28.

Furthermore, the lateral collision ECU 56 that has detected a lateral collision on the basis of a signal from the lateral collision sensor 32 operates the inflators 48 and 54. Then, the right near side airbag 46 and the left far side airbag 52 are expanded and deployed (FIG. 6 shows a completely deployed state of the tension cloths 26 and the right and left side airbags 46 and 52). These side airbags 46 and 52 are expanded and deployed forward along the already deployed tension cloths 26 respectively, between the tension cloths 26 and the seated passenger P respectively. The passenger P seated in the seat on the collision side is restrained by the tension cloth 26 and the near side airbag 46, and the passenger P seated in the seat on the counter collision side is restrained by the tension cloth 26 and the far side airbag 52. In the event of a swing-over after the collision, each of the passengers P is restrained by the tension cloth 26 and the side airbag that are located on the other side of those used during the collision.

It should be noted herein that the vehicle seat 40 is identical to that of the first embodiment of the invention as to the protection of the seated passenger P by the tension cloths 26.

Besides, the near side airbag 46 and the far side airbag 52 are expanded and deployed along the deployed tension cloths 26 respectively as described above. Therefore, the near side airbag 46 and the far side airbag 52 are prevented from moving away from the seated passenger P in the seat width direction, and the directions of deployment thereof are stabilized. That is, expansion and deployment are suitably completed in a short time from the detection of a lateral collision (the start of expansion and deployment). Furthermore, since the shoulder S as the high-rigidity region of the seated passenger P is restrained by the central chambers 46A and 52A, the head H of the seated passenger P can be effectively restrained from moving in the vehicle width direction. Moreover, the near side airbag 46 and the far side airbag 52 are provided with the head protection chambers 46B and 52B respectively. Thus, the head H can be more effectively restrained from moving in the vehicle width direction.

Furthermore, the head protection chambers 46B and 52B are connected at the connection portions 46D and 52D thereof to the bar main body 18A respectively. Thus, as the pop-up bar 18 moves to the popped-up position, the near side airbag 46 and the far side airbag 52 are at least partially pulled out from the seat back 14 prior to the operation of the inflators 48 and 54 respectively. Thus, the near side airbag 46 and the far side airbag 52 can be suitably expanded and deployed in a shorter time from the detection of a lateral collision.

Besides, the near side airbag 46 has the central chamber 46A, the head protection chamber 46B, and the lumbar protection chamber 46C. Thus, the seated passenger P can be restrained from the head H to the lumbar L on the outer side (on the collision side) in the vehicle width direction, and can be effectively protected from a lateral collision. In particular, due to the provision of the head protection chamber 46B, a head protection airbag such as a curtain airbag or the like, which is deployed along a side window glass, can be made unnecessary or simplified. Furthermore, the far side airbag 52 has the central chamber 52A, the head protection chamber 52B, and the abdomen protection chamber 52C. Thus, the seated passenger P can be restrained from the head H to the abdomen A on the inner side (on the counter collision side) in the vehicle width direction, and can be effectively protected from an interference with a passenger seated in the adjacent seat.

Incidentally, in the second embodiment of the invention, there is shown an example in which the pop-up bar 18 is moved to the popped-up position prior to the operation of the near side airbag device 42 and the far side airbag device 44 on the basis of a signal from the pre-crash sensor 58. However, the invention is not limited to this example. For example, the lateral collision ECU 56 that has detected (the inevitability of) a lateral collision on the basis of a signal from the lateral collision sensor 32 may operate the MGG's 22 prior to the inflators 48 and 54. Besides, the gas capacity of the guide pipes 20 is sufficiently smaller than the gas capacity of the near side airbag 46 and the far side airbag 52. Thus, the movement of the pop-up bar 18 to the popped-up position is completed in a sufficiently shorter time than the expansion and deployment of the near side airbag 46 and the far side airbag 52. In a configuration in which the side airbag 46 and the far side airbag 52 are pulled out from the nicks 28 respectively prior to expansion and deployment with a time difference based on this gas capacity difference, the inflators 48 and 54 and the MGG's 22 may be operated at the same time.

Third Embodiment

A vehicle seat 60 according to the third embodiment of the invention will be described on the basis of FIGS. 13 and 14. Incidentally, those components which are basically the same as in the aforementioned second embodiment of the invention are denoted by the same reference symbols as in the aforementioned second embodiment of the invention respectively, and the description and illustration thereof may be omitted.

Figure 13:
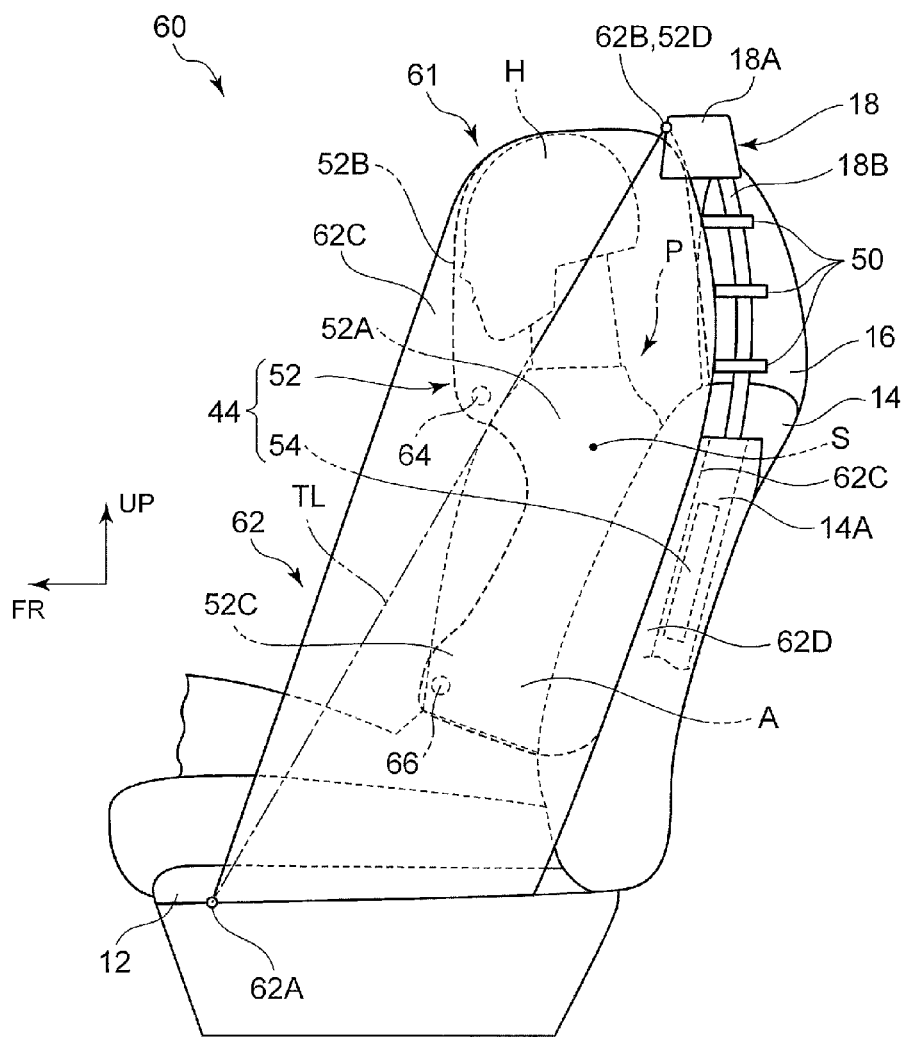
FIG. 13 is a lateral view as viewed from an inner side in a vehicle width direction, showing a deployed state of one tension cloth and one side airbag in a vehicle seat according to a third embodiment of the invention.
Figure 14:
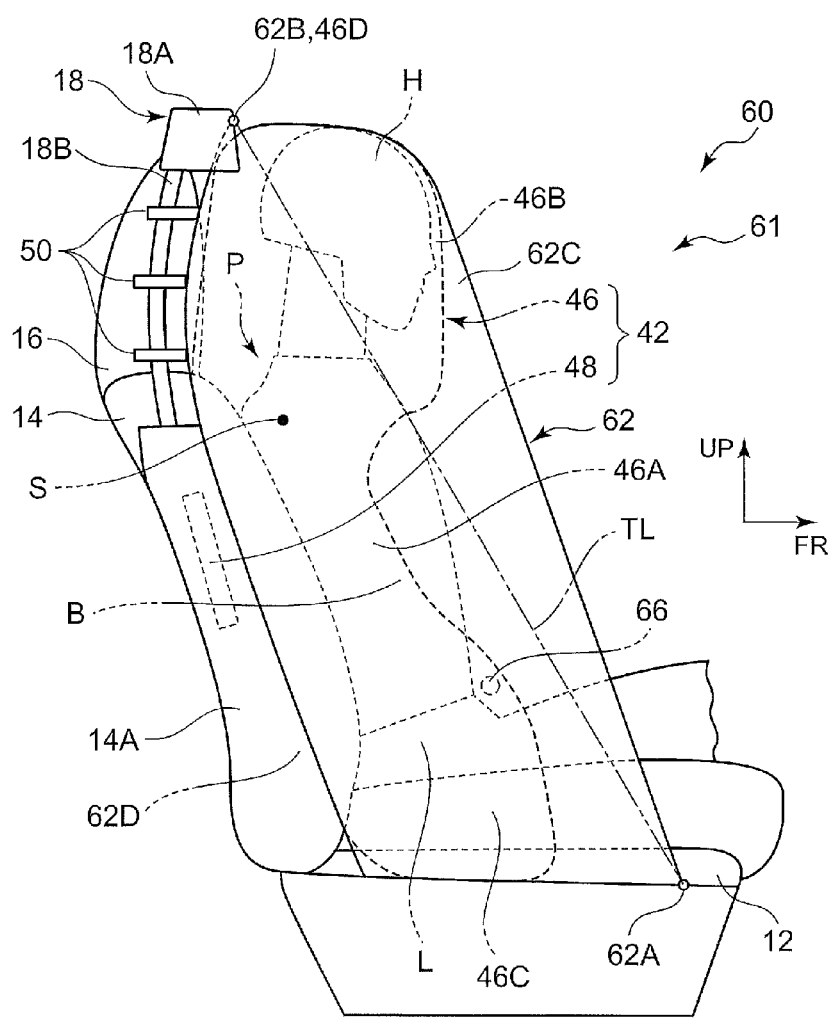
FIG. 14 is a lateral view as viewed from an outer side in the vehicle width direction, showing the deployed state of the other tension cloth and the other side airbag in the vehicle seat according to the third embodiment of the invention.

Each of FIGS. 13 and 14 shows the vehicle seat 60 according to the third embodiment of the invention. As shown in these drawings, a vehicle passenger restraint system 61 of the vehicle seat 60 is equipped with tension cloths 62 as lateral deployment members instead of the tension cloths 26. In addition, the vehicle seat 60 is different from the vehicle seat 40 according to the second embodiment of the invention in that the tension cloths 62 are connected to the near side airbag 46 and the far side airbag 52 respectively.

More specifically, each of the tension cloths 62 has, in its deployed state, an overhang portion 62C that overhangs forward of the tension line TL that links a lower end 62A that is connected to the seat cushion 12 and an upper end 62B that is connected to the bar main body 18A with each other. The overhang portion 62C is set at least above each of the tension cloths 62. Thus, the tension cloths 62 are formed in such a manner as to cover the entire head protection chambers 46B and 52B respectively in a lateral view. Besides, a rear edge portion 62D of each of the tension cloths 62 is connected to the seat back frame 14A or a corresponding one of the guide pipes 20.

In addition, the tension cloth 62 and the near side airbag 46 are joined to each other through the sewing or the like of the head protection chamber 46B and the overhang portion 62C. In this embodiment of the invention, the head protection chamber 46B and the overhang portion 62C are connected to each other by a tear seam (a thread to be ruptured). Upon the completion of the expansion and deployment of the head protection chamber 46B, the tear seam 64 is ruptured to cancel the aforementioned connection. Besides, the tension cloth 62 and the near side airbag 46 are joined to each other through a sewing 66 or the like of a lower portion of the tension cloth 62 and the lumbar protection chamber 46C.

Besides, the tension cloth 62 and the far side airbag 52 are joined to each other through the sewing or the like of the head protection chamber 52B and the overhang portion 62C. In this embodiment of the invention, the head protection chamber 52B and the overhang portion 62C are connected to each other by the tear seam 64 (the thread to be ruptured). Upon the completion of expansion and deployment of the head protection chamber 52B, the tear seam 64 is ruptured to cancel the aforementioned connection. Besides, the tension cloth 62 and the far side airbag 52 are joined to each other through the sewing 66 or the like of the lower portion of the tension cloth 62 and the abdomen protection chamber 52C. Other components of the vehicle seat 60, including those which are not shown, are configured in a manner similar to corresponding components of the vehicle seat 40, respectively.

Accordingly, a similar effect can be obtained by the vehicle seat 60 according to the third embodiment of the invention as well, basically through an operation similar to that of the vehicle seat 40 according to the second embodiment of the invention.

Besides, in the vehicle seat 60, the head protection chamber 46B is connected to the overhang portion 62C of the tension cloth 62 that is first deployed. Thus, the near side airbag 46 that is connected to the bar main body 18A and hence pulled out from the seat back 14 prior to expansion and deployment is further pulled out forward (toward the tension line TL side) as well, as the tension cloth 62 is deployed. Furthermore, the tension cloth 62 and the lumbar protection chamber 46C are connected to each other, and the near side airbag 46 is greatly pulled out forward at the lower portion thereof as well, as the tension cloth 62 is deployed. That is, the unbending of the near side airbag 46 is promoted before the supply of gas. Thus, a contribution toward suitably expanding and deploying the near side airbag 46 in a shorter time is made. That is, the promotion of the pullout (unbending) of the near side airbag 46 from the seat back 14 contributes toward expanding and deploying the near side airbag 46 in a short time.

On the other hand, the overhang portion 62C of the tension cloth 62 is located in front of the tension line TL, but is connected to the head protection chamber 46B and hence can support a load from the seated passenger P in the process of expansion and deployment of the tension cloth 62. Thus, the range in which the passenger is restrained by the tension cloth 62 is widened by a range corresponding to the overhang portion 62C, in comparison with the case of the tension cloth 26. Thus, in the vehicle seat 60, the performance of protecting the seated passenger P from a wider variety of collision patterns can be improved.

Furthermore, the overhang portion 62C and the head protection chamber 46B are sewn to each other by the tear seam 64. Therefore, upon the completion of expansion and deployment of the near side airbag 46, the state of connection (restraint) between the overhang portion 62C and the head protection chamber 46B is canceled. Thus, the tension cloth 62 is restrained from being curved (rippling) in accordance with the shape of expansion and deployment of the head protection chamber 46B, and is deployed almost straight along the tension line TL (the shape of deployment as the tension cloth 62 is maintained).

Besides, by the same token, the head protection chamber 52B is connected to the overhang portion 62C of the tension cloth 62 that is first deployed. Thus, the far side airbag 52 that is connected to the bar main body 18A and hence pulled out from the seat back 14 prior to expansion and deployment is further pulled out forward (toward the tension line TL side) as well, as the tension cloth 62 is deployed. Furthermore, the tension cloth 62 and the abdomen protection chamber 52C are connected to each other, and the far side airbag 52 is greatly pulled out forward at the lower portion thereof as well, as the tension cloth 62 is deployed. That is, the unbending of the far side airbag 52 is promoted before the supply of gas. Thus, a contribution toward suitably expanding and deploying the far side airbag 52 in a shorter time is made. That is, the promotion of the pullout (unbending) of the far side airbag 52 from the seat cushion 12 and the seat back 14 contributes toward expanding and deploying the seat cushion 12 and the seat back 14 of the far side airbag 52 in a short time.

On the other hand, the overhang portion 62C of the tension cloth 62 is located in front of the tension line TL, but is connected to the head protection chamber 52B and hence can support a load from the seated passenger P in the process of expansion and deployment of the tension cloth 62. Thus, the range in which the passenger is restrained by the tension cloth 62 is widened by a range corresponding to the overhang portion 62C, in comparison with the case of the tension cloth 26. Thus, in the vehicle seat 60, the performance of protecting the seated passenger P from a wider variety of collision patterns can be improved. Furthermore, the overhang portion 62C and the head protection chamber 52B are sewn to each other by the tear seam 64. Therefore, upon the completion of expansion and deployment of the far side airbag 52, the state of connection (restraint) between the overhang portion 62C and the head protection chamber 52B is canceled. Thus, the tension cloth 62 is restrained from being curved (rippling) in accordance with the shape of expansion and deployment of the head protection chamber 52B, and is deployed almost straight along the tension line TL (the shape of deployment as the tension cloth 62 is maintained).

Incidentally, in the third embodiment of the invention, there is shown an example in which the overhang portion 62C of each of the tension cloths 62 and a corresponding one of the head protection chamber 46B and the head protection chamber 52B are connected to each other by the tear seam 64. However, the invention is not limited to this example. The overhang portion 62C and one of the head protection chamber 46B and the head protection chamber 52B may be connected to each other such that the state of connection is maintained after expansion and deployment as well. In passing, the shape of expansion and deployment of the head protection chamber 46B of the near side airbag 46 is thicker than the shape of expansion and deployment of the head protection chamber 52B of the far side airbag 52 (see FIG. 9), and the shape of expansion and deployment of the head protection chamber 46B of the near side airbag 46 has a greater influence on the shape of deployment of the tension cloth 62 than the shape of expansion and deployment of the head protection chamber 52B of the far side airbag 52. Thus, it is desirable that the head protection chamber 46B of the near side airbag 46 be connected to the overhang portion 62C of the tension cloth 62 by the tear seam 64.

Besides, in the third embodiment of the invention, there is shown an example in which the lower portion of each of the tension cloths 62 and a corresponding one of the lumbar protection chamber 46C and the abdomen protection chamber 52C are connected to each other through the sewing 66. However, the invention is not limited to this example. For example, it is appropriate to adopt a configuration in which the lower portion of the tension cloth 62 and at least one of the lumbar protection chamber 46C and the abdomen protection chamber 52C are not connected to each other, or a configuration in which the lower portion of the tension cloth 62 and at least one of the lumbar protection chamber 46C and the abdomen protection chamber 52C are joined to each other by the tear seam 64.

Fourth Embodiment

A vehicle seat 100 according to the fourth embodiment of the invention will be described on the basis of FIGS. 15 to 23. Incidentally, those components which are basically the same as in the aforementioned first to third embodiments of the invention are denoted by the same reference symbols as in the aforementioned first to third embodiments of the invention respectively, and the description and illustration thereof may be omitted.

Figure 15:
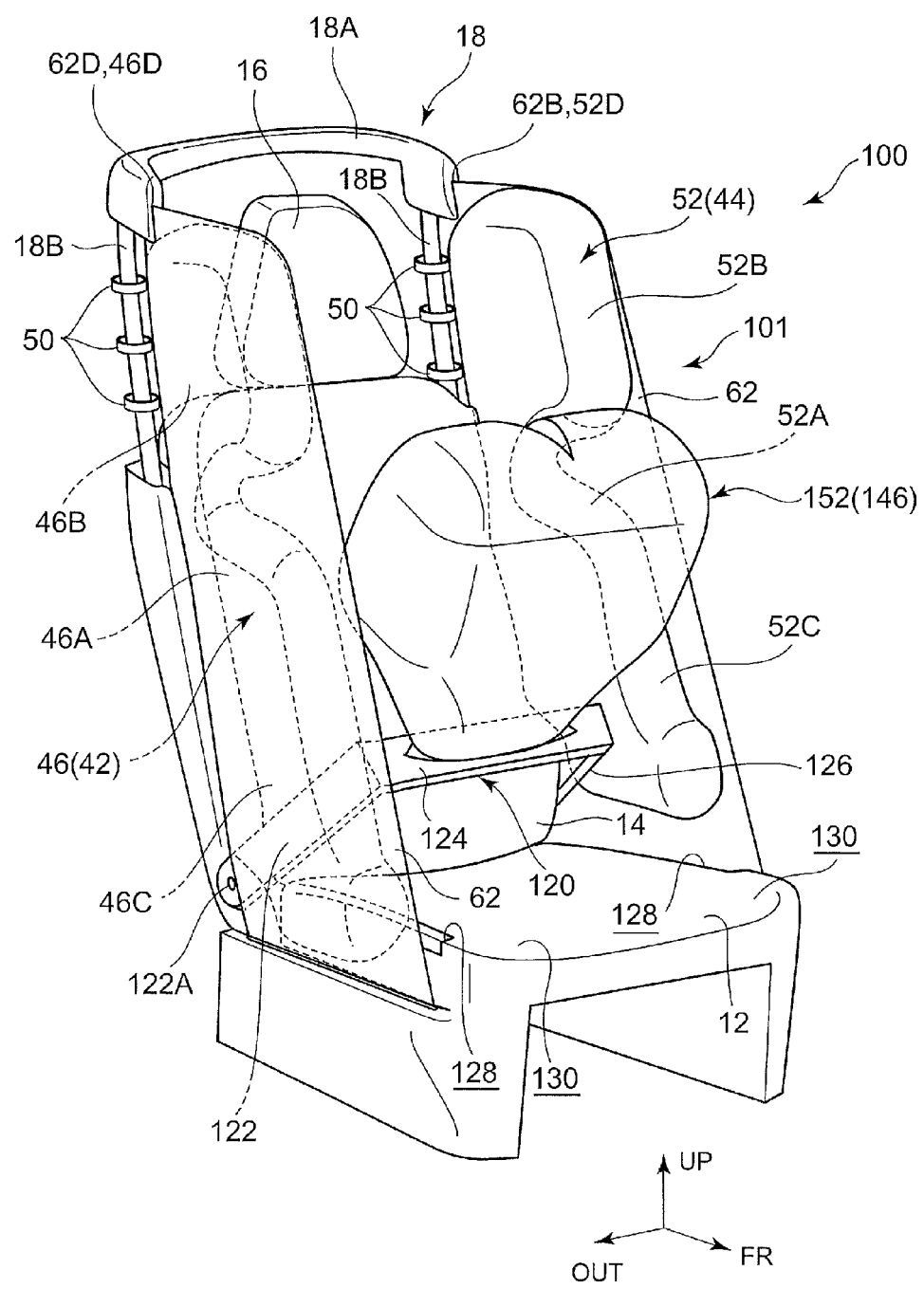
FIG. 15 is a perspective view as viewed from a diagonally front area, showing a deployed state of tension cloths and side airbags in a vehicle seat according to a fourth embodiment of the invention.

The vehicle seat 100 according to the fourth embodiment of the invention is shown in FIG. 15. As shown in this drawing, a vehicle passenger restraint system 101 of the vehicle seat 100 is different from those of the aforementioned respective embodiments of the invention in being equipped with a passenger restraint device for a front collision in addition to the passenger restraint systems 11, 41 and 61 for a lateral collision. The vehicle passenger restraint system 101 of the illustrated example is equipped with a passenger restraint device for a front collision in addition to the passenger restraint system 61. The passenger restraint device for a front collision as part of the vehicle passenger restraint system 101 will be concretely described hereinafter. Incidentally, in FIGS. 16 to 23, the illustration of the passenger restraint devices for a lateral collision, including the pop-up bar 18, is omitted.

Figure 16:
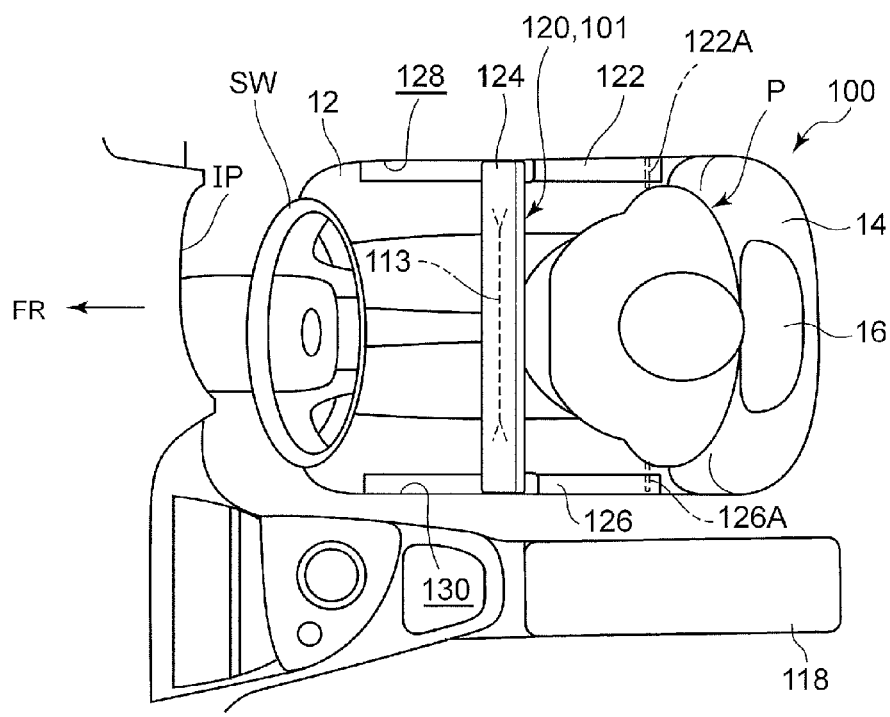
FIG. 16 is a plan view showing an in-use state of a vehicle passenger restraint system according to the fourth embodiment of the invention.

FIG. 16 is a plan view showing the interior of a vehicle interior including the vehicle seat 100 to which the vehicle passenger restraint system 101 is applied. The vehicle seat 100 in this embodiment of the invention is a driver seat, and is arranged on one side in a vehicle width direction of a vehicle body, with respect to a center console 118 that is arranged at a central portion in the vehicle width direction. Incidentally, it goes without saying that the vehicle passenger restraint system 101 can be applied to the vehicle seat 100 as a front passenger seat.

(Configuration of Support Structure)

The vehicle passenger restraint system 101 is equipped with a lap device 120 as a movable body and a support structure that supports a frontal collision airbag device 146 and a seat belt device 155, which will be described later, at a position that allows the seated passenger P to be protected. The lap device 120 is mainly constituted of an outer bar 122 as a first support member, a lap bar 124 as a second support member, and an inner bar 126 as a third support member.

The outer bar 122 is long in the longitudinal direction, and is supported, on a rear end side thereof, rotatably around a shaft 122A along the seat width direction at a rear end of the seat cushion 12. Due to this rotation, the outer bar 122 can move between a stored position shown in FIG. 19A and in-use positions shown in FIGS. 19B to 19D. At the stored position, the outer bar 122 is arranged along a lateral edge portion of the seat cushion 12 on the outer side in the vehicle width direction. In this embodiment of the invention, the outer bar 122 is stored in a storage recess 128 that is formed in the lateral edge portion on the outer side. At the in-use positions, the outer bar 122 assumes an inclined posture with a front end thereof located above a rear end thereof (the shaft 122A). In this manner, the outer bar 122 is configured to be able to assume the stored position at which the outer bar 122 extends along the lateral edge portion of the seat cushion 12, and the in-use positions at which the outer bar 122 is in the aforementioned inclined posture, by rotating around the shaft 122A.

The inner bar 126 is long in the longitudinal direction, and is supported, on a rear end side thereof, rotatably around a shaft 126A along the seat width direction at the rear end of the seat cushion 12. Due to this rotation, the inner bar 126 can move between a stored position shown in FIG. 19A and in-use positions shown in FIGS. 19B to 19D. At the stored position, the inner bar 126 is arranged along the lateral edge portion of the seat cushion 12 on the outer side in the vehicle width direction. In this embodiment of the invention, the inner bar 126 is stored in a storage recess 130 that is formed in the lateral edge portion on the inner side. At the in-use positions, the inner bar 126 assumes an inclined posture with a front end thereof located above a rear end thereof (the shaft 126A). In this manner, the inner bar 126 is configured to be able to assume the stored position at which the inner bar 126 extends along the lateral edge portion of the seat cushion 12, and the in-use positions at which the inner bar 126 is in the aforementioned inclined posture, by rotating around the shaft 126A.

In this embodiment of the invention, the shaft 122A and the shaft 126A are coupled to each other via an interlocking mechanism (not shown). The outer bar 122 and the inner bar 126 are configured such that if one of the outer bar 122 and the inner bar 126 is moved between the stored position and the in-use positions, the other follows the movement. Besides, the outer bar 122 and the inner bar 126 are configured to overlap with each other as a whole in a lateral view, at each of their stored and in-use positions. In other words, the outer bar 122 and the inner bar 126 operate in such a manner as to maintain lateral symmetry with respect to the seated passenger P.

Figure 19A:
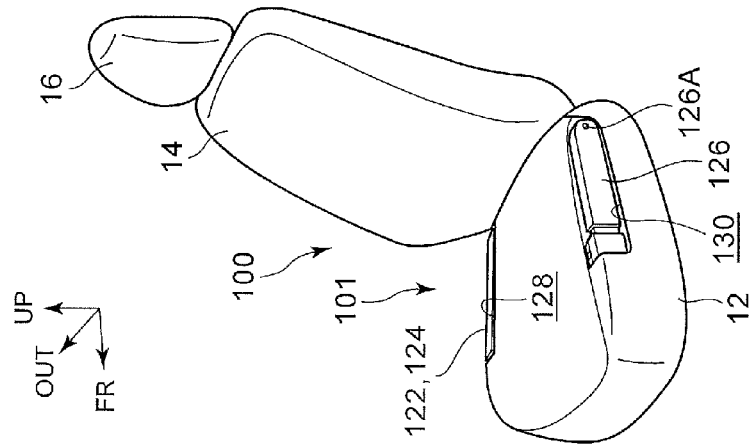
FIG. 19A is a view showing a process of fitting a lap device that constitutes the vehicle passenger restraint system according to the fourth embodiment of the invention with a seated passenger omitted, and is a perspective view as viewed from a diagonally front area, showing a stored state.
Figure 19B:
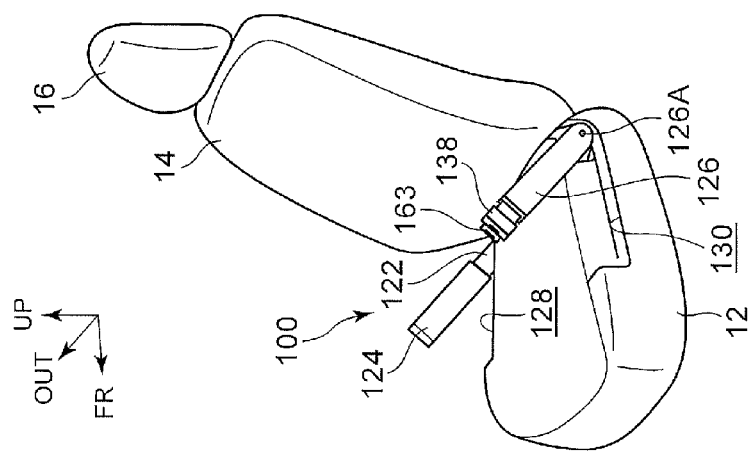
FIG. 19B is a view showing the process of fitting the lap device that constitutes the vehicle passenger restraint system according to the fourth embodiment of the invention with the seated passenger omitted, and is a perspective view as viewed from the diagonally front area, showing a state of transition of the inner bar and an outer bar to their in-use positions.
Figure 19C:
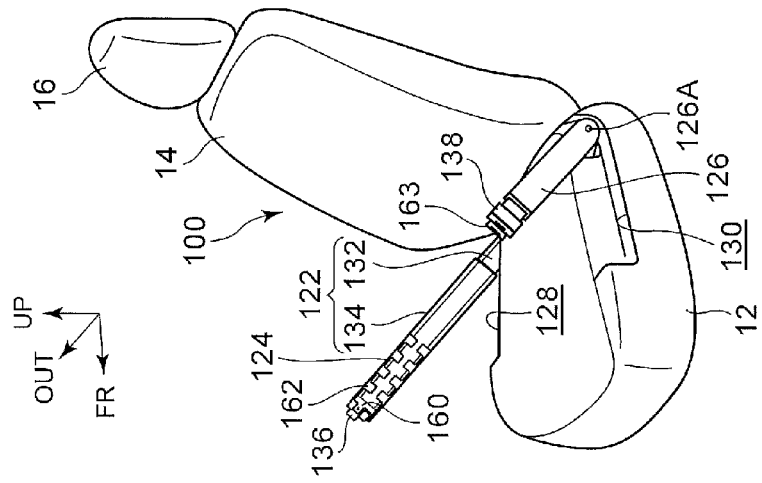
FIG. 19C is a view showing the process of fitting the lap device that constitutes the vehicle passenger restraint system according to the fourth embodiment of the invention with the seated passenger omitted, and is a perspective view as viewed from the diagonally front area, showing a state of transition of the lap bar to its extended posture.
Figure 19D:
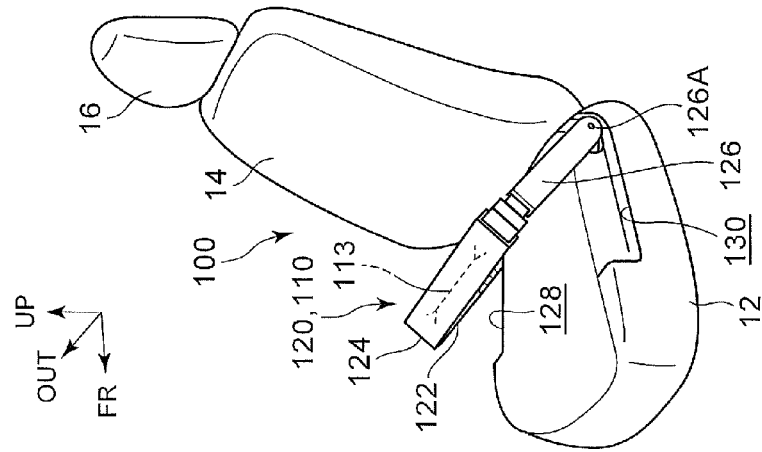
FIG. 19D is a view showing the process of fitting the lap device that constitutes the vehicle passenger restraint system according to the fourth embodiment of the invention with the seated passenger omitted, and is a perspective view as viewed from the diagonally front area, showing an in-use mode.

The lap bar 124 is coupled to the outer bar 122, and is configured to be able to assume a stored posture in which the lap bar 124 is stored in the storage recess 128 together with the outer bar 122 (see FIG. 19A) and an in-use posture in which the lap bar 124 serves as a bridge between the outer bar 122 and the inner bar 126 (see FIG. 19D). A concrete description will be given hereinafter.

Figure 20:
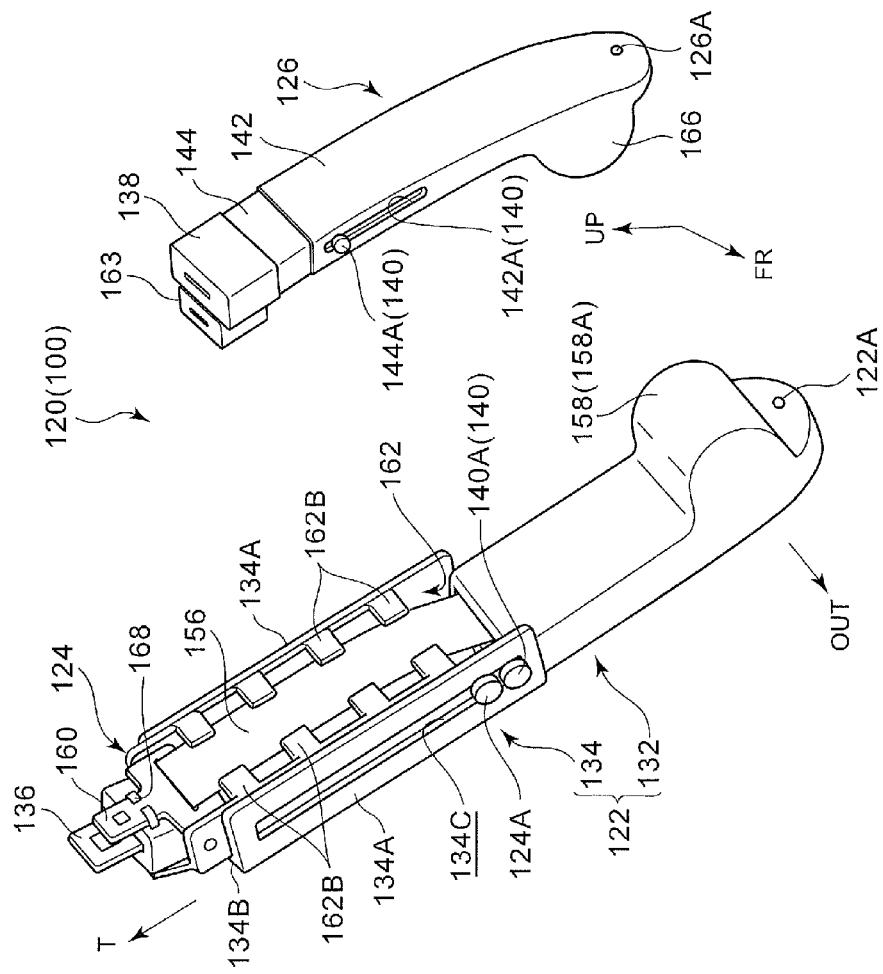
FIG. 20 is a perspective view showing on an enlarged scale a state of transition of the inner bar and the outer bar of the lap device, which constitutes the vehicle passenger restraint system according to the fourth embodiment of the invention, to their in-use positions.
Figure 21:
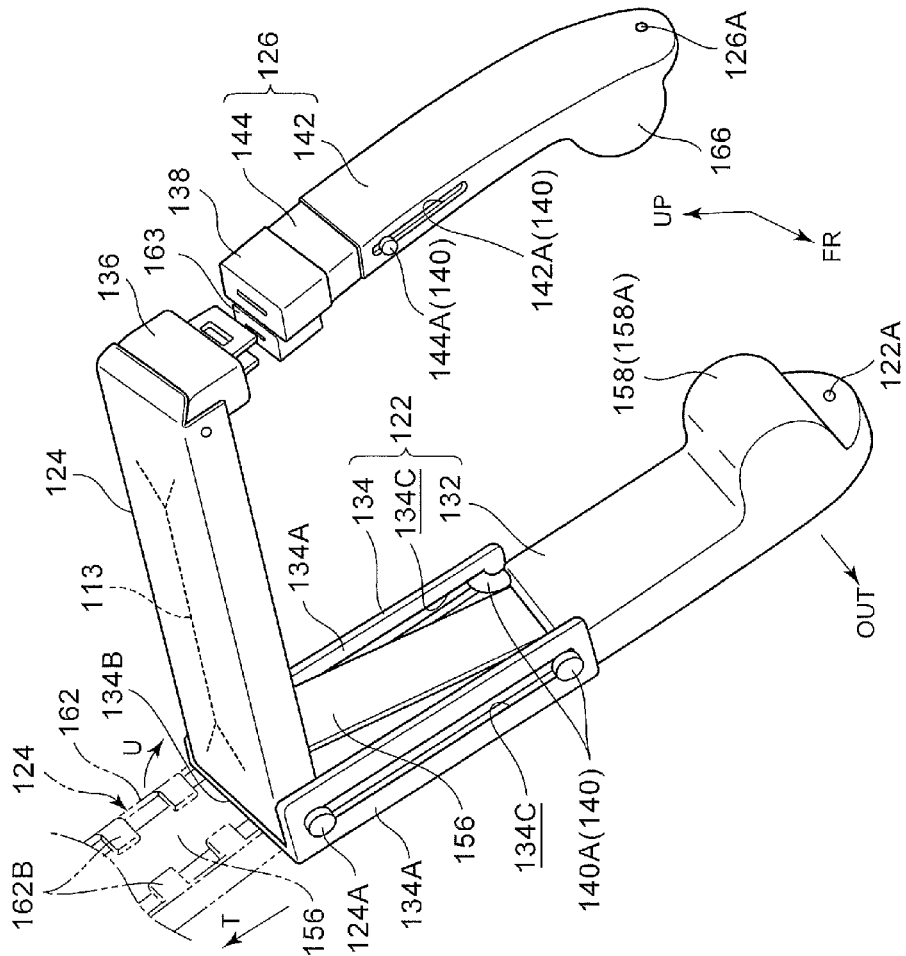
FIG. 21 is a perspective view showing on an enlarged scale a state of transition of the lap bar, which constitutes the vehicle passenger restraint system according to the fourth embodiment of the invention, to an in-use posture.

FIG. 20 is a perspective view showing a state where the outer bar 122 and the inner bar 126 are located at the in-use positions and the lap bar 124 assumes a stored posture. FIG. 21 is a perspective view showing a state where the lap bar 124 makes a transition to an in-use posture from the state of FIG. 20. As shown in these drawings, the outer bar 122 has a base portion 132 on a side supported by the shaft 122A, and a guide portion 134 that is provided at the base portion 132 on the other side of the shaft 122A.

The base portion 132 has a boot structure assuming the shape of a rectangular cylinder, and a later-described lap belt 156 is inserted through (retained by) the base portion 132. The guide portion 134 generally assumes the shape of "U" that opens toward the center in the seat width direction in a view of a cross-section perpendicular to the longitudinal direction in a stored posture, and is mainly constituted of a pair of lateral walls 134A that are opposed to each other, and a coupling wall 134B that links these lateral walls with each other. Slits 134C are formed in the lateral walls 134A of the guide portion 134 respectively along the longitudinal direction of the outer bar 122. On the other hand, the lap bar 124 has, at one end thereof in the longitudinal direction, a pair of coupling pins 124A that are embedded through the slits 134C respectively in a stopped state. Thus, the lap bar 124 is coupled to the outer bar 122 rotatably around the coupling pins 124A and slidably along the slits 134C.

In addition, the lap bar 124 is configured to assume an extended posture indicated by a fictitious line in FIG. 21 upon being pulled out in the longitudinal direction (see an arrow T of FIG. 20) from the state shown in FIG. 20, and to assume an in-use posture indicated by a solid line in FIG. 21 upon further rotating in the direction of an arrow U around the coupling pins 124A. The lap bar 124 is provided, at the other end thereof in the longitudinal direction, with a bar-side tongue plate 136 as a united portion, and the bar-side tongue plate 136 is removably united with a bar-side buckle 138 that is provided on a front end side of the inner bar 126.

In this united state, as shown in FIG. 16 and FIG. 19D, the outer bar 122, the lap bar 124, and the inner bar 126 open backward in a plan view, and generally assume the shape of "U" that opens downward in a front view. This mode is adopted as an in-use mode of the lap device 120 (from the standpoint of the seated passenger P, a pseudo-fitted state, which will be referred to hereinafter simply as "a fitted state" in some cases). In this in-use mode, the lap device 120 is configured to surround the abdomen of the seated passenger P from three sides.

Besides, the outer bar 122 and the inner bar 126 are equipped with adjusters 140 as fitting position adjustment structures capable of moving the lap bar 124 into contact with or away from the abdomen of the seated passenger P. The adjuster 140 on the outer bar 122 side is configured to include a pair of adjust pins 140A that are provided at the base portion 132 and embedded through the slits 134C respectively. On the other hand, the adjuster 140 on the inner bar 126 side is configured to include a base portion 142 and a buckle retention portion 144 that is slidably supported by the base portion 142. In addition, adjust pins 144A that are provided at the buckle retention portion 144 are embedded through a pair of slits 142A that are formed at the base portion 142 along the longitudinal direction of the inner bar 126, respectively.

The adjust pins 140A slide in the slits 134C respectively, and the adjust pins 144A slide in the slits 142A respectively, whereby the adjusters 140 capable of moving the lap bar 124 into contact with and away from the abdomen of the seated passenger P as described above are configured. Incidentally, the lap bar 124 is configured to be stoppable at an arbitrary adjustment position (either continuously or at a limited number of stages) through a lock mechanism (not shown), a frictional stopper structure (not shown), or the like.

(Configuration of Frontal Collision Airbag)

As shown in FIG. 16, a frontal collision airbag device 146 for restraining (protecting) the seated passenger P in response to a front collision (a frontal collision) is disposed on the lap bar 124 of the lap device 120 described above. This frontal collision airbag device 146 is arranged along the longitudinal direction of the lap bar 124.

Figure 23A:
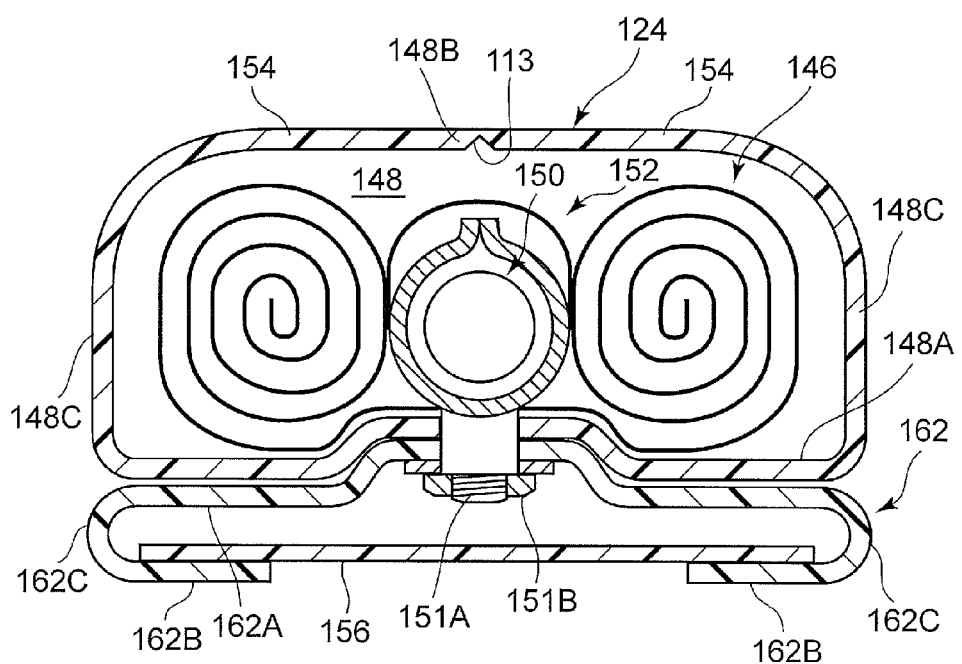
FIG. 23A is a lateral sectional view showing on an enlarged scale a frontal collision airbag device and a belt retention structure that constitute the vehicle passenger restraint system according to the fourth embodiment of the invention.

More specifically, as shown in FIG. 23A, the lap bar 124 has a hollow structure at least in a range of disposition of the frontal collision airbag device 146, and the frontal collision airbag device 146 is arranged in an airbag accommodation portion 148 as an inner space of the lap bar 124. The frontal collision airbag device 146 is mainly constituted of an inflator 150 as gas supply means for generating gas through operation, and a frontal collision airbag 152 as an airbag that is expanded and deployed upon being supplied with gas from the inflator 150.

Figure 17:
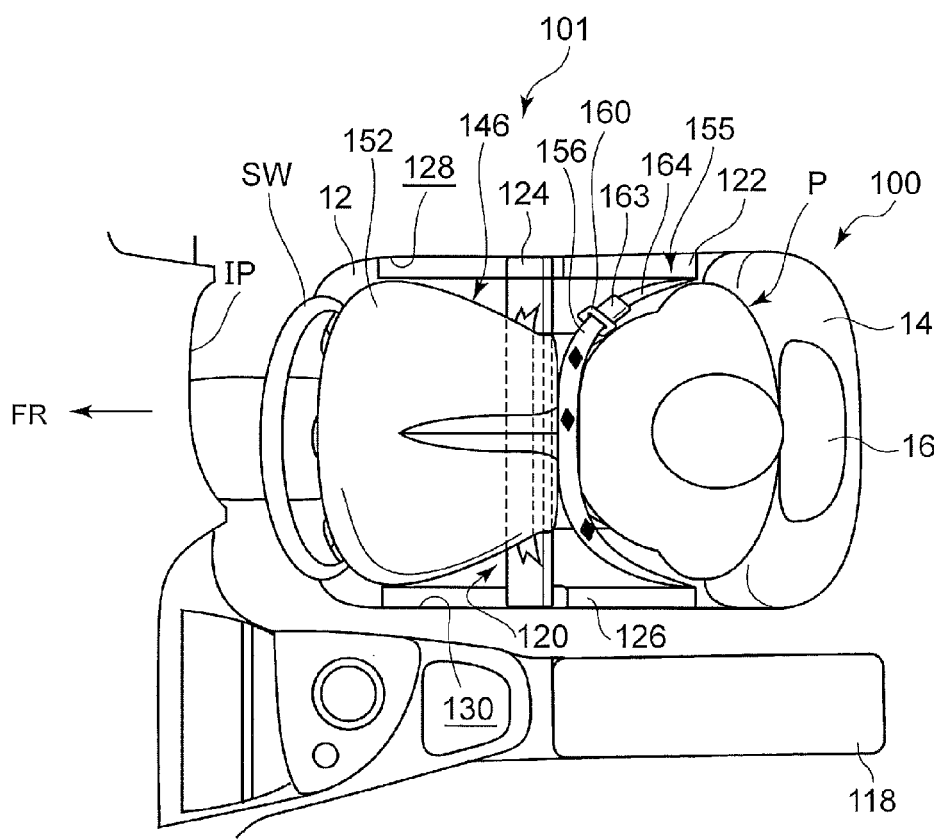
FIG. 17 is a plan view showing a state where a passenger is restrained by the vehicle passenger restraint system according to the fourth embodiment of the invention.

The inflator 150 is fixed to a bottom wall 148A that is directed toward the seated passenger P side, as one of walls surrounding the airbag accommodation portion 148 of the lap bar 124, by a central portion of the lap bar 124 in a width direction thereof. The frontal collision airbag 152 is fixed to the bottom wall 148A via the inflator 150, with the inflator 150 accommodated inside the frontal collision airbag 152. This frontal collision airbag 152 is bent in a rolled manner on both front and rear sides with respect to the inflator 150, and is covered with a protection cloth (not shown) to be kept in a folded state. Upon receiving a bag expansion pressure, this protection cloth is ruptured along nicks in the form of a perforated line (not shown), and is configured to allow the frontal collision airbag 152 to be deployed. As shown in FIG. 15 and FIG. 17, the frontal collision airbag 152 in this embodiment of the invention is designed as a twin chamber-type airbag that is divided into right and left parts on a rear end side thereof. Thus, a reduction in the capacity of the bag, an increase in the area of contact with the seated passenger P, suitable support of both the shoulders of the seated passenger P, and the like are achieved.

Besides, an airbag door 154 that is ruptured to open through a pressure of expansion and deployment of the frontal collision airbag 152 is formed on a top wall 148B that is opposed to the bottom wall 148A in the lap bar 124. The airbag door 154 according to this embodiment of the invention is ruptured to be opened along a groove-like tear line 113 (see FIG. 23A) that is formed in the top wall 148B, and is thereby deployed with corner portions adjacent to lateral walls 148C serving as hinges, thus forming an opening through the top wall 148B. The frontal collision airbag 152 is configured to be allowed to be expanded and deployed outside the lap bar 124 as shown in FIG. 17, through this opening.

Figure 18:
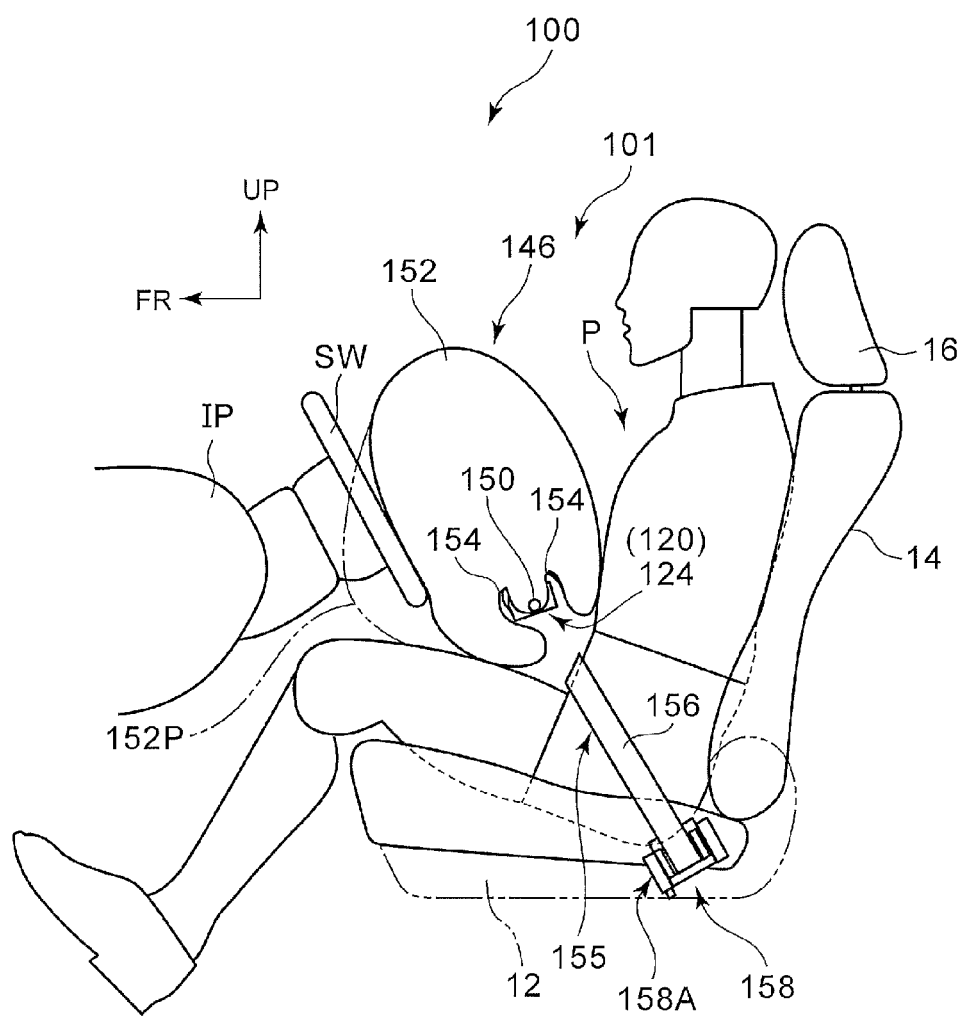
FIG. 18 is a lateral view as viewed from a vehicle inner side with an inner bar and the like omitted, showing a state where a frontal collision airbag is deployed from a lap bar that constitutes the vehicle passenger restraint system according to the fourth embodiment of the invention.

As shown in FIG. 17 and FIG. 18, the frontal collision airbag 152 is configured to be deployed between a vehicle structure that is located in front of the seated passenger P and the upper body of the seated passenger P. In examples of FIG. 17 and FIG. 18, which are applied to a driver seat, the frontal collision airbag 152 is configured to be deployed between a steering wheel SW as the vehicle structure and the upper body of the seated passenger P. Incidentally, the frontal collision airbag 152 (a reference symbol 152P) indicated by a fictitious line in FIG. 18 presents an example of the shape of deployment of a front passenger airbag. In this example, the frontal collision airbag 152 is deployed between an instrument panel IP as the vehicle structure and the upper body of the seated passenger P.

A structure of fixing the inflator 150 to the lap bar 124 will be supplemented. A nut 151B is screwed to a stud bolt 151A that is fixed to the inflator 150 and penetrates the bottom wall 148A. Thus, the inflator 150 is securely fastened to the bottom wall 148A of the lap bar 124. Besides, in this embodiment of the invention, a later-described belt holder 162 is fixed to an outer face side of the bottom wall 148A through the joint of the stud bolt 151A and the nut 151B.

(Configuration of Seat Belt Device)

As shown in FIG. 17, the vehicle passenger restraint system 101 is equipped with a seat belt device 155 for restraining the lumbar of the seated passenger P. The seat belt device 155 is equipped with a lap belt 156 that is fitted to the lumbar of the seated passenger P, and a retractor 158 that supports the lap belt 156 on one end side thereof in the longitudinal direction. In the seat belt device 155 according to this embodiment of the invention, the lap belt 156 is usually retained by the lap device 120 (the outer bar 122 and the lap bar 124) as shown in FIG. 20 and FIG. 21. On the other hand, the lap belt 156 is configured to be fitted to the lumbar of the seated passenger P in the event of a front collision, as shown in FIG. 17 and FIG. 18. A concrete description will be given hereinafter.

Figure 23B:
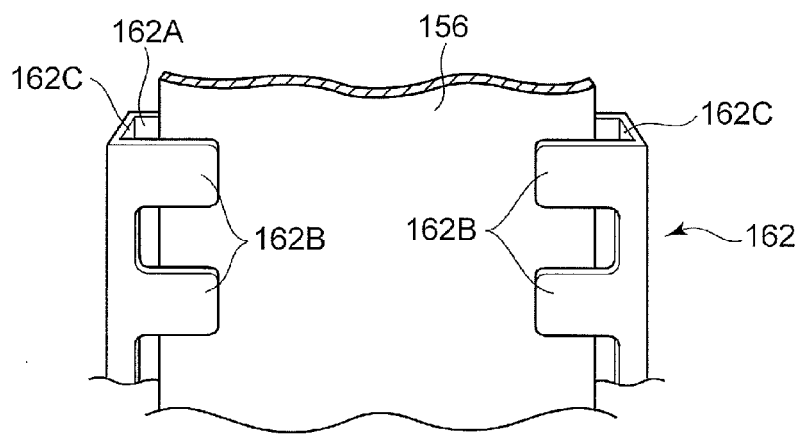
FIG. 23B is a perspective view showing on a partially enlarged scale the frontal collision airbag device and the belt retention structure that constitute the vehicle passenger restraint system according to the fourth embodiment of the invention.

As shown in FIG. 20 and FIG. 23A, the lap belt 156 is inserted through the base portion 132 of the boot structure to be retained by the outer bar 122, and is removably retained by the lap bar 124 via the belt holder 162 as belt retention means. As shown in FIG. 23B, the belt holder 162 is configured to include a base plate portion 162A that is fixed to the bottom wall 148A of the lap bar 124, and a plurality of retention pawls 162B that are spaced apart from one another in the longitudinal direction of the base plate portion 162A on both sides of the base plate portion 162A in the width direction thereof. In this embodiment of the invention, the base plate portion 162A and the respective retention pawls 162B are coupled to each other by a coupling wall 162C. Thus, the belt holder 162 is formed in the shape of flat "C" in a view of a cross-section perpendicular to the longitudinal direction, in regions where the retention pawls 162B are formed. The belt holder 162 is formed of synthetic resin or the like, and the respective retention pawls 162B can be elastically deformed (bent) in such a direction as to move into contact with and away from the base plate portion 162A.

The base plate portion 162A of this belt holder 162 is jointly fixed to the bottom wall 148A of the lap bar 124 by the stud bolt 151A and the nut 151B, together with the aforementioned inflator 150. In this state, the lap belt 156 is embedded, on both end sides thereof in the width direction, between the base plate portion 162A and the respective retention pawls 162B. The respective retention pawls 162B are opposed to the lap belt 156 from the other side (the seated passenger P side) of the lap bar 124 side, and prevent the lap belt 156 from moving toward the seated passenger P side. Thus, the lap belt 156 is configured to be prevented from moving in the thickness direction with respect to the lap bar 124 by the belt holder 162, and to be retained by the lap bar 124 via the belt holder 162.

As shown in FIG. 20, the lap belt 156 is inserted through the base portion 132 of the aforementioned boot structure, and is retractably wound up on one end side thereof by a retractor 158 that is provided between the base portion 132 and the shaft 122A. Thus, the lap belt 156 is taken in and out without slacking during displacement of the lap bar 124 to the extended posture with respect to the outer bar 122 or adjustment of the position of the lap bar 124 by the adjusters 140. This retractor 158 is provided with tensile force application means for forcibly winding up the lap belt 156 through operation, and a pretensioner mechanism 158A as a pretensioner. The pretensioner mechanism 158A is configured in the same manner as that which is provided in a common retractor (e.g., that which forcibly rotates a winding shaft through gas from a gas generator), and hence a detailed description thereof is omitted.

On the other hand, the lap belt 156 is provided at the other end thereof with a belt-side tongue plate 160 that constitutes belt linkage means. The belt-side tongue plate 160 is removably coupled to a belt-side buckle 163 that is provided on the inner bar 126 adjacently to the bar-side buckle 138.

In this embodiment of the invention, the inner-side lap belt 164 is coupled on one end side thereof to the belt-side buckle 163, and is retractably wound up on the other end side thereof by a retractor 166 that is provided between the base portion 142 of the inner bar 126 and the shaft 126A. Thus, the inner-side lap belt 164 is taken in and out without slacking during adjustment of the position of the lap bar 124 by the adjusters

140. Although not shown in the drawings, the retractor 166 is provided with a pretensioner mechanism similar to that of the retractor 158.

In addition, the belt-side buckle 163 is retained in such a manner as to be removed from the bar-side buckle 138 upon receiving a required external force. More specifically, if the pretensioner mechanisms 158A and the like of the retractor 158 and the retractor 166 operate, the belt-side buckle 163 falls off from the bar-side buckle 138. Thus, the belt-side buckle 163 is fitted to the lumbar of the seated passenger P together with the lap belts 156 and 164 and the belt-side tongue plate 160. Accordingly, the seat belt device 155 according to this embodiment of the invention is configured such that the lap belts 156 and 164, which remain linked with each other by the belt-side tongue plate 160 and the belt-side buckle 163, are removed from the lap device 120 and fitted to the seated passenger P. A structure of removing the lap belt 156 will be supplemented. Attempting to shorten while receiving a tensile force, the lap belt 156 elastically deforms the respective pawls 162B of the belt holder 162 toward the seated passenger P side, is released from a state of being retained by the respective retention pawls 162B, and is removed from the belt holder 162, namely, from the lap bar 124. On the other hand, as a structure of retaining the belt-side buckle 163 with respect to the bar-side buckle 138 that is removable through the aforementioned external force, various structures can be adopted. For example, adhesion, an engagement structure that cancels retention through rupture or deformation resulting from the aforementioned external force, a retention structure based on a magnetic force or a planar fastener, and the like can be adopted.

(Buckle Structure)

The bar-side tongue plate 136 and the belt-side tongue plate 160 are linked with the bar-side buckle 138 and the belt-side buckle 163 through a common linkage operation (one action). That is, the belt-side tongue plate 160 that is retained by the bar-side tongue plate 136 is linked with the belt-side buckle 163 that is retained by the bar-side buckle 138 as described above, through a common operation.

Figure 22A:
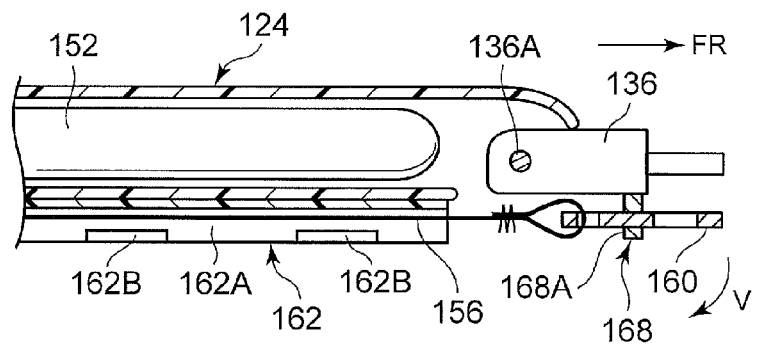
FIG. 22A is a view showing a posture of respective tongue plates, which constitute the vehicle passenger restraint system according to the fourth embodiment of the invention, with respect to the lap bar, and is a sectional view showing on an enlarged scale a posture for storage.

Besides, the bar-side tongue plate 136 and the belt-side tongue plate 160 are configured to be located along the longitudinal direction of the lap bar 124 in the case where the lap bar 124 assumes the stored posture. This bar-side tongue plate 136 and this belt-side tongue plate 160 are configured to be directed toward the bar-side buckle 138 side and the belt-side buckle 163 side as the lap bar 124 makes a transition to the in-use posture. More specifically, the bar-side tongue plate 136 is supported on the lap bar 124 rotatably around the shaft 136A as shown in FIG. 22A. Besides, the belt-side tongue plate 160 is removably retained by the bar-side tongue plate 136 via a plate holder 168. Thus, the belt-side tongue plate 160 is usually rotatable around the shaft 136A together with the bar-side tongue plate 136. The plate holder 168 retains the belt-side tongue plate 160 by a retention strip 168A. Then, if the pretensioners of the retractor 158 and the retractor 166 operate, the retention strip 168A is elastically deformed or plastically deformed, whereby the plate holder 168 is removed from the bar-side tongue plate 136.

Figure 22B:
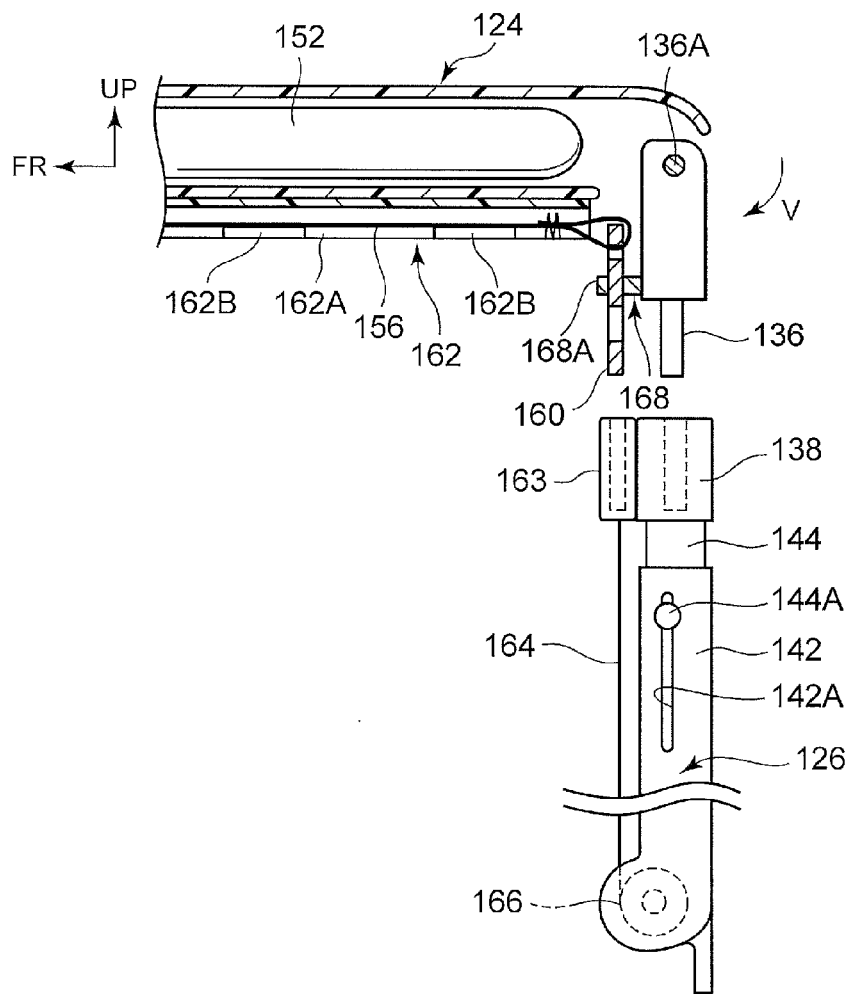
FIG. 22B is a view showing a posture of the respective tongue plates, which constitute the vehicle passenger restraint system according to the fourth embodiment of the invention, with respect to the lap bar, and is a sectional view showing on an enlarged scale a linkage ready posture.

In addition, when the lap bar 124 assumes the stored posture, the bar-side tongue plate 136 is retained in the stored posture, namely, is located along the longitudinal direction of the lap bar 124 as shown in FIG. 22A. On the other hand, if the lap bar 124 is caused to assume the extended posture, the lap belt 156 is pulled out, and the winding force of (a winding spring of) the retractor 158 increases. Therefore, the winding force of the retractor 158 that is applied to the belt-side tongue plate 160 increases. Thus, as shown in FIG. 22B, the bar-side tongue plate 136 and the belt-side tongue plate 160 make a transition to a linkage ready posture in which they tumble toward an arrow V side due to a winding force of the retractor 158.

Thus, the bar-side tongue plate 136 and the belt-side tongue plate 160 are configured to be directed toward the bar-side buckle 138 and the belt-side buckle 163, as the lap bar 124 makes a transition from the stored posture to the in-use posture. Incidentally, the bar-side tongue plate 136 and the belt-side tongue plate 160 can be configured to return to the stored posture through a manual operation by the seated passenger P or an urging force of a return spring (not shown), in returning the lap bar 124 from the in-use posture to the stored posture. In a configuration in which the return spring is employed, the urging force of the return spring is set larger than the winding force of the retractor 158 with the lap bar 124 assuming the stored posture, and smaller than the winding force of the retractor 158 with the lap bar 124 assuming the extended posture. Besides, in a configuration in which a return to the stored posture is manually made, the bar-side tongue plate 136 and the belt-side tongue plate 160 are retained in the stored posture against the winding force of the retractor 158 with the lap bar 124 assuming the stored posture, due to a frictional force or the like.

(Configuration of Passenger Protection ECU)

Although not shown in the drawings, the vehicle passenger restraint system 101 is equipped with a passenger protection ECU (not shown) as a control device. The passenger protection ECU is electrically connected to each of the inflator 150 of the frontal collision airbag device 146, the pretensioner mechanism 158A of the retractor 158, and the pretensioner mechanism of the retractor 166. Besides, the passenger protection ECU is electrically connected to a frontal collision detection sensor that detects a front collision of an automobile to which the vehicle passenger restraint system 101 is applied, and a buckle sensor that detects the linkage between the bar-side tongue plate 136 and the bar-side buckle 138. The buckle sensor may detect the linkage between the belt-side tongue plate 160 and the belt-side buckle 163. If a collision detection signal is input to the passenger protection ECU from the frontal collision detection sensor, the passenger protection ECU operates the inflator 150 of the frontal collision airbag device 146, the respective pretensioner mechanisms 158A of the retractors 158 and 166, and the like. That is, in the case where a front collision is detected, the inflator 150, the respective pretensioner mechanisms 158A, and the like are operated. Thus, as will be described later in the description of the operation of this embodiment of the invention, the frontal collision airbag 152 and the lap belts 156 and 164 are configured to restrain the seated passenger P from moving forward.

Next, the operation of the fourth embodiment of the invention will be described, focusing attention mainly on what is different from the operations of the aforementioned first to third embodiments of the invention.

The 101 of the aforementioned configuration is configured to include a passenger restraint device for a lateral collision (the passenger restraint system 61 (11, 41)) and a passenger restraint device for a front collision. Accordingly, the vehicle seat 100 that is equipped with the vehicle passenger restraint system 101 is configured as an omnidirectional safety seat. In addition, in the vehicle seat 100 that is equipped with the vehicle passenger restraint system 101 configured as described above, when the passenger gets on or off, the lap device 120 is located at the stored position. More specifically, the outer bar 122 and the lap bar 124 are stored in the storage recess 128 on the outer side of the seat cushion 12 in the vehicle width direction, and the inner bar 126 is stored in the storage recess 130 on the inner side of the seat cushion 12 in the vehicle width direction. Thus, the lap device 120 does not hinder the seated passenger P from getting on or off.

The passenger who is seated in the vehicle seat 100 after getting on pulls up the outer bar 122 (and the lap bar 124) the inner bar 126 at the stored position to the in-use position. Then, due to the interlocking mechanism, the non-operated side one of the outer bar 122 and the inner bar 126 also makes a transition to the in-use position together. Subsequently, the seated passenger P slides the lap bar 124 forward with respect to the outer bar 122 to cause the lap bar 124 to assume the extended posture, and further, rotates the lap bar 124 around the coupling pin 124A in a direction indicated by an arrow U to cause the lap bar 124 to assume the in-use posture. Along with this operation, the bar-side tongue plate 136 and the belt-side tongue plate 160 make a transition from the stored posture (see FIG. 22A) to the linkage ready posture (see FIG. 22B). If this bar-side tongue plate 136 and this belt-side tongue plate 160 are linked with the bar-side buckle 138 and the belt-side buckle 163 respectively, the seated passenger P has the abdomen surrounded from ahead on three sides by the lap device 120.

Furthermore, the seated passenger P adjusts the longitudinal position of the lap bar 124 according to preference. In the case where the feeling of tightness by the lap device 120 is avoided, a gap is maintained between the lap bar 124 and the abdomen. On the other hand, in the case where high priority is given to the feeling of fitting (the feeling of closeness) and the feeling of restraint (the feeling of safety), the lap bar 124 is brought close to the abdomen, and if necessary, into contact with the abdomen. If the bar-side tongue plate 136 is linked with the bar-side buckle 138 as described above, the passenger protection ECU recognizes that the lap device 120 is located at the in-use position.

From this state, upon detecting a front collision on the basis of a signal from the frontal collision detection sensor, the passenger protection ECU operates the inflator 150 of the frontal collision airbag device 146, the respective pretensioner mechanisms 158A of the retractors 158 and 166, and the like. Then, the lap belt 156 and the lap belt 164 are pulled in by the retractors 158 and 166 respectively at a tensile force equal to or larger than a predetermined value. Thus, the belt-side buckle 163 is removed from the bar-side buckle 138, and the lap belt 156 is removed from the belt holder 162. Then, the lap belts 156 and 164 that are coupled to each other by the belt-side tongue plate 160 and the belt-side buckle 163 are fitted to the lumbar of the seated passenger P. The seated passenger P to which a forward inertial force is applied is restrained from moving forward by the lap belts 156 and 164 (is restrained in the vehicle seat 100).

Besides, the frontal collision airbag 152 ruptures the protection cloth due to a pressure of expansion and deployment thereof, and breaks the tear line 113 open, thus deploying the airbag door 154. Thus, the frontal collision airbag 152 is expanded on the outer side of the lap bar 124. While the reactive force of the frontal collision airbag 152 is supported by the inflator 150 (the lap device 120), the frontal collision airbag 152 is deployed between the steering wheel SW (the instrument panel IP) and the upper body of the seated passenger P. Thus, the upper body of the seated passenger P is restrained from moving forward by the deployed frontal collision airbag 152.

On the other hand, in the case where the seated passenger P gets off with the automobile not colliding, the bar-side tongue plate 136 and the belt-side tongue plate 160 are removed from the bar-side buckle 138 and the belt-side buckle 163 respectively through the operation of a cancellation button (not shown). It is desirable that the cancellation button be used in common, so that the aforementioned two linkages can be cancelled through a common operation. After this cancellation, it is appropriate to return the lap bar 124 to the stored posture from the in-use posture via the extended posture, as opposed to the time of fitting. Along with a return to the stored posture, the bar-side tongue plate 136 and the belt-side tongue plate 160 return or are returned to the posture in which the bar-side tongue plate 136 and the belt-side tongue plate 160 extend along the longitudinal direction of the lap bar 124. If the outer bar 122 or the inner bar 126 is moved to the stored position from this state, the right and left bars interlock with each other to reach the stored position. Accordingly, the outer bar 122 and the lap bar 124 that constitute the lap device 120 are stored in the storage recess 128, and the inner bar 126 is stored in the storage recess 130. The seated passenger P can smoothly get off without being hindered by the lap bar 124 or the like, which is located on a platform side.

It should be noted herein that when the vehicle passenger restraint system 101 is out of use, the outer bar 122 and the lap bar 124 are stored in the storage recess 128 extending along the lateral edge portion of the seat cushion 12, and the inner bar 126 is stored in the storage recess 130 extending along the lateral edge portion of the seat cushion 12. Thus, the lap device 120 is compactly stored, and the storage space of the lap device 120 that retains the airbag when the airbag is out of use can be held small.

In particular, the lap device 120 has a both-end support structure in which the lap bar 124 is supported by the seat cushion 12 via the outer bar 122 and the inner bar 126. Thus, the rigidity and strength required of the lap bar 124 are smaller than in a comparative example in which a movable body of a cantilever structure is adopted. Moreover, the reactive force of the frontal collision airbag 152 of the frontal collision airbag device 146 that is retained by the lap bar 124 is supported by the steering wheel SW (the instrument panel IP). Thus, the lap bar 124 is not required to exhibit a strength or a rigidity for supporting the reactive force of the frontal collision airbag 152. Besides, the lap belt 156 is directly fitted to the seated passenger P in the event of a frontal collision, and there is no need to cause the lap bar 124 to support the load for restraining the passenger. Thus, the lap bar 124 can be more compactly formed than in the aforementioned comparative example. Furthermore, the frontal collision airbag device 146 and the lap belt 156 are retained by the lap bar 124. Therefore, the lap bar 124 can be more compactly configured than in a comparative example that adopts a movable body that retains two airbag devices that are deployed on both sides in the longitudinal direction. The lap bar 124 that is compactly configured as described above contributes toward reducing the size of the storage space of the lap device 120 including the lap bar 124.

Besides, it should be noted herein that the vehicle passenger restraint system 101 is usually designed, as described above, such that the lap belt 156 for restraining the lumbar of the seated passenger P is retained by the lap bar 124 of the lap device 120. Thus, the lap device 120 and the lap belt 156 do not usually impart a direct (physical) feeling of tightness (restraint) to the seated passenger P. Besides, the lap device 120 can adjust the position (the distance) of the lap bar 124 with respect to the abdomen of the seated passenger P by the adjusters 140. Thus, according to preference, the seated passenger P can choose to keep the lap bar 124 out of contact as a result of giving priority to the avoidance of a feeling of tightness created by the lap device 120, or to hold the lap bar 124 in contact with the abdomen as a result of giving priority to a feeling of fitting or a feeling of restraint created by the lap device 120.

Furthermore, the bar-side tongue plate 136 and the belt-side tongue plate 160 are located along the longitudinal direction of the lap bar 124 with respect to the lap bar 124 in the stored posture. Thus, the lap bar 124 and the outer bar 122 can be compactly stored in the straight storage recess 128. Besides, the bar-side tongue plate 136 and the belt-side tongue plate 160 reach the linkage ready posture as the lap bar 124 makes a transition from the stored posture to the in-use posture. Therefore, the operation of linking the lap bar 124 with the inner bar 126 is easy to perform.

Still further, the inner bar 126 that is equivalent to a buckle of a common three-point seat belt device is arranged on the inner side in the vehicle width direction in the same manner as the buckle. Thus, the seated passenger P can fit the lap bar 124 to the inner bar 126 by operating the lap bar 124 or the like without feeling a sense of discomfort. In addition, the arrangement of the aforementioned inner bar 126 was obtained due to a configuration in which the lap bar 124 as a component larger in size than the inner bar 126 is compactly stored in the storage recess 128 together with the outer bar 122, in other words, a configuration in which the lap bar 124 does not hinder the passenger from getting on or off.

Furthermore, it should be noted herein that the vehicle passenger restraint system 101 is configured such that the lumbar of the seated passenger P is restrained by the lap belt 156 that is fitted to the lumbar of the seated passenger P through the operation of the retractors 158 and 166. Thus, the state of fitting to the passenger can be realized in a shorter time from detection of a front collision than in a comparative example in which the lumbar of the seated passenger P is restrained by, for example, an airbag that is deployed from the lap bar 124 toward the lumbar. Thus, in the vehicle passenger restraint system 101, in a configuration that makes it possible to suppress a feeling of tightness that is usually imparted to the seated passenger P, the performance of initial restraint in the event of a front collision can be improved.

Besides, the frontal collision airbag 152 is configured to be deployed from the lap bar 124 to a space between the steering wheel SW (the instrument panel IP) and the passenger P. Therefore, there is no need to adopt a configuration in which the reactive force is supported by a windshield glass. Thus, the capacity of the frontal collision airbag 152 can be made small. In particular, in a configuration in which the frontal collision airbag is disposed in the instrument panel in the case of an automobile that adopts a thin instrument panel that is flat in the vertical direction, the capacity of the airbag is larger than in the case of an automobile that adopts a common instrument panel.

In contrast, in the vehicle passenger restraint system 101, the frontal collision airbag 152 is not required to support the reactive force by the windshield glass as described above. Therefore, the capacity of the frontal collision airbag can be held small in a configuration that adopts a thin instrument panel as well. Besides, both the direction of the moving of the seated passenger P in the event of a frontal collision and the direction of deployment of the frontal collision airbag 152 are the forward direction with regard to the vehicle. Therefore, the load that is applied to the seated passenger P by the frontal collision airbag 152 is small.

Besides, in the vehicle passenger restraint system 101, the lap belt 156 is pulled in with a tensile force equal to or larger than a predetermined value, whereby the lap belt 156 is removed from the belt holder 162, and the belt-side buckle 163 is removed from the bar-side buckle 138. That is, the seat belt device 155 is removed from the lap device 120, and the lap belts 156 and 164 are directly fitted to the lumbar of the seated passenger P.

Incidentally, in the aforementioned fourth embodiment of the invention, there is shown an example in which the lap bar 124 is stored in the storage recess 128 together with the outer bar 122 that is arranged on the side where the passenger gets on or off. However, the invention is not limited to this example. For example, it is appropriate to adopt a configuration in which the lap bar 124 is stored in the storage recess 130 together with the inner bar 126 that is arranged on the inner side in the vehicle width direction.

Besides, in the aforementioned fourth embodiment of the invention, there is shown an example in which the lap belt 164 and the retractor 166 are provided on the inner bar 126 side. However, the invention is not limited to this example. For example, it is appropriate to adopt a configuration that is provided with an elastic stay that is coupled at one end thereof to the belt-side buckle 163 and is fixed at the other end thereof to the seat cushion 12 by an anchor. In this configuration, if the belt-side buckle 163 is removed from the belt-side tongue plate 160 due to a tensile force from the pretensioner mechanism 158A of the retractor 158, the aforementioned stay is fitted to the lumbar of the seated passenger P together with the lap belt 156.

Furthermore, in the aforementioned fourth embodiment of the invention, there is shown an example in which the belt holder 162 removably retains the lap belt 156 on the lap bar 124. However, the invention is not limited to this example. It is sufficient that the belt retention means removably retain the lap belt 156 on the lap bar 124. For example, it is possible to adopt other configurations such as a magnet, a planar fastener and the like. Besides, by adopting a magnet, a planar fastener or the like, the lap belt 156 can be retained again by the lap bar 124 in a case where a predicted collision does not occur.

Still further, in the aforementioned fourth embodiment of the invention, there is shown an example in which the bar-side tongue plate 136 and the belt-side tongue plate 160 make a transition from the stored posture to the linkage ready posture due to a winding force of the retractor 158. However, the invention is not limited to this example. For example, it is appropriate to adopt a configuration in which the bar-side tongue plate 136 and the belt-side tongue plate 160 make a transition from the stored posture to the linkage ready posture through the use of a link mechanism or the like that interlocks with a change in posture (rotation or slide) of the lap bar 124 with respect to the guide portion 134. Besides, it is appropriate to adopt a configuration in which the bar-side tongue plate 136 and the belt-side tongue plate 160 make a transition from the stored posture to the linkage ready posture due to a motive power of an actuator. Furthermore, it is appropriate to adopt a configuration that does not have a structure for causing the bar-side tongue plate 136 and the belt-side tongue plate 160 to make a transition from the stored posture to the linkage ready posture.

Besides, in the aforementioned fourth embodiment of the invention, there is shown an example in which the vehicle passenger restraint system 101 is applied to a driver seat or a front passenger seat. However, the invention is not limited to this example. For example, it is appropriate to apply the vehicle passenger restraint system 101 to a seat in a second row or further behind in a vehicle having seats in a plurality of rows.

Furthermore, in the aforementioned fourth embodiment of the invention, there is shown an example in which the outer bar 122 (and the lap bar 124) or the inner bar 126 at the stored position is pulled up to the in-use position by the passenger.

However, the invention is not limited to this example. For example, it is appropriate to adopt a configuration in which an electric motor is operated upon detection of the sitting of a passenger so as to automatically move the outer bar 122 and the inner bar 126 from the stored position to the in-use position.

Fifth Embodiment

A vehicle seat 200 according to the fifth embodiment of the invention will be described on the basis of FIGS. 24 to 26. Incidentally, those components which are basically the same as in the aforementioned fourth embodiment of the invention are denoted by the same reference symbols as in the aforementioned fourth embodiment of the invention respectively, and the description and illustration thereof may be omitted.

Although not shown in the drawings, the vehicle seat 200 is mechanically configured in the same manner as the vehicle seat 100. That is, the vehicle passenger restraint system 101 that constitutes the vehicle seat 200 is equipped with a restraint device 202 as a passenger restraint device for a front collision, in addition to one of the passenger restraint systems 41 and 61 for a lateral collision. The restraint device 202 in this embodiment of the invention is mainly constituted of the lap device 120, the frontal collision airbag device 146, and the seat belt device 155.

Figure 24:
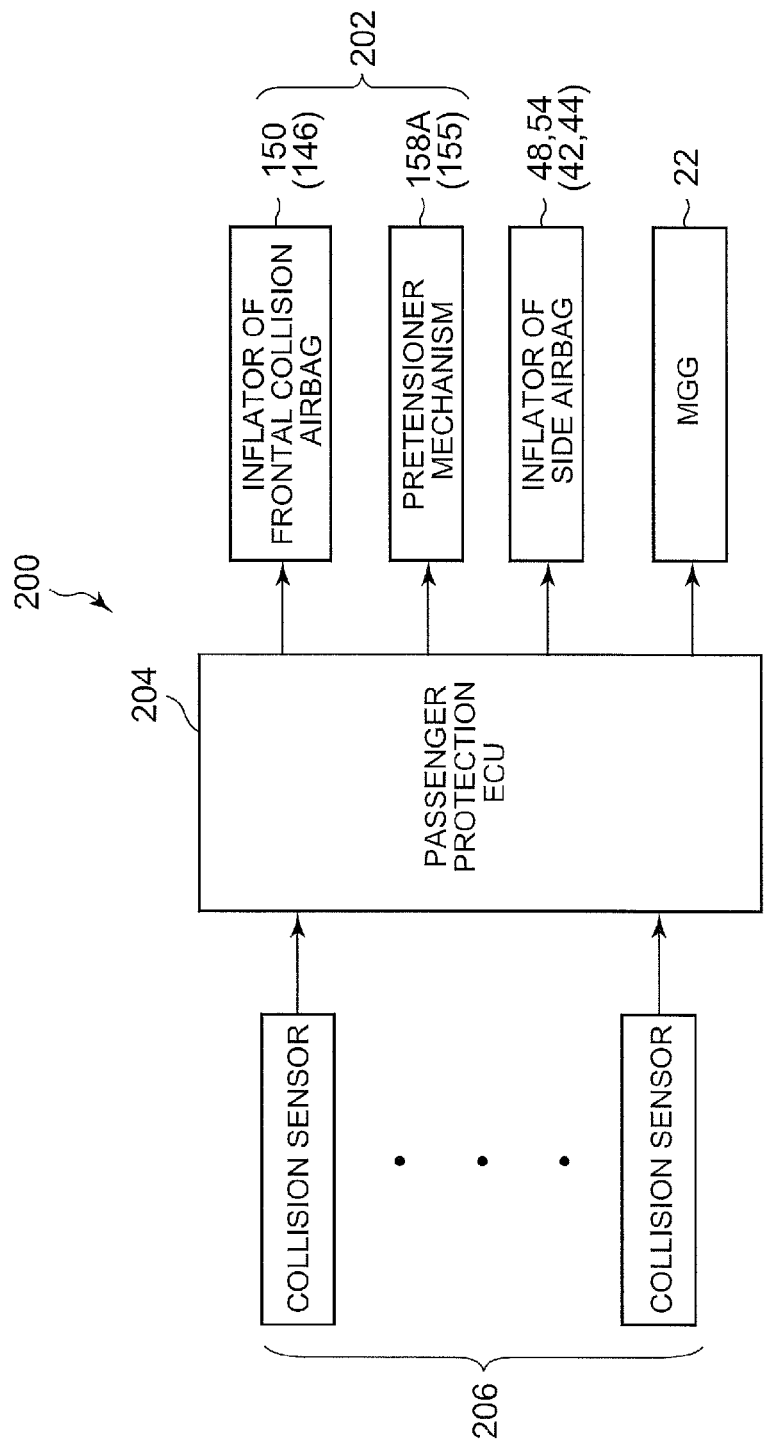
FIG. 24 is a block diagram showing a control system of a vehicle seat according to a fifth embodiment of the invention.
Figure 25:
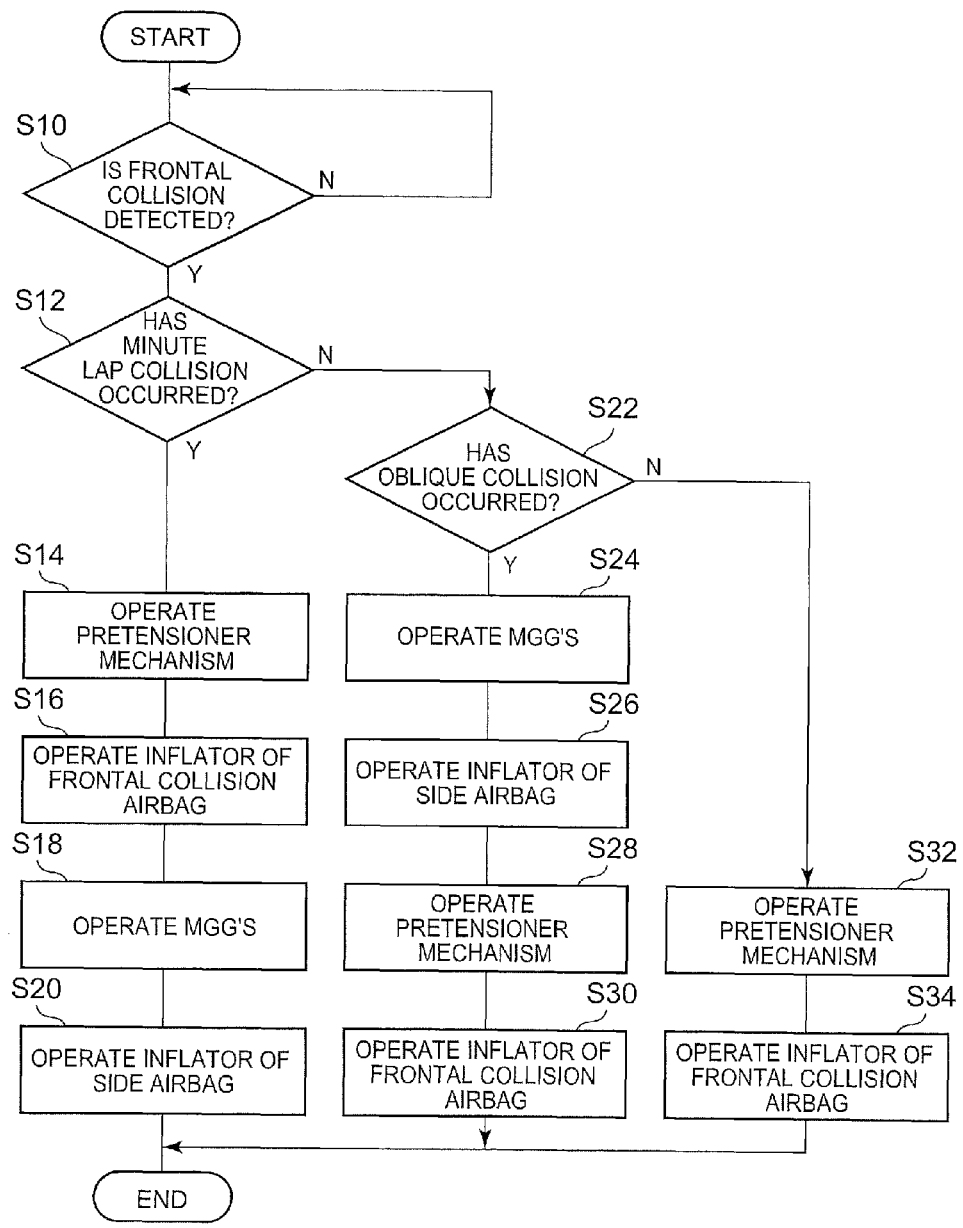
FIG. 25 is a flowchart showing the control flow of the vehicle seat according to the fifth embodiment of the invention.

In addition, as shown in FIG. 24, the vehicle seat 200 is equipped with a passenger protection ECU 204 as a control device. The passenger protection ECU 204 is electrically connected to a plurality of collision sensors (acceleration sensors) 206, and can detect a minute lap collision, an oblique collision, and a front collision of an automobile to which the vehicle seat 200 is applied, on the basis of information from the plurality of the collision sensors 206.

It should be noted herein that the minute lap collision means a front collision of an automobile 500 in which an amount of lap with a collision counterpart 502 (see FIG. 26A) in the vehicle width direction as prescribed by, for example, IIHS is equal to or smaller than 25%. For example, a collision outward in the vehicle width direction with a front side member falls under the minute lap collision. In this embodiment of the invention, as an example, a minute lap collision at a relative speed of 64 kilometers per hour is assumed. Besides, the oblique collision occurs diagonally forward as prescribed by, for example, NHSTA (as an example, a collision in which the relative angle with the collision counterpart 502 is 15° and the amount of lap in the vehicle width direction is about 35%) (see FIG. 26B). In this embodiment of the invention, as an example, an oblique collision at a relative speed of 90 kilometers per hour is assumed. The front collision includes a full-lap front collision, and an offset collision (an OBD) in which the collision range in the vehicle width direction with respect to a counterpart vehicle (a barrier) or a wall is equal to or larger than a predetermined range. As an example of the mode of this front collision, in this embodiment of the invention, a full-lap front collision at a relative speed of 55 kilometers per hour is assumed.

Besides, as shown in FIG. 24, the passenger protection ECU 204 is electrically connected to each of the MGG's 22, the inflators 48 and 54, the pretensioner mechanism 158A as the pretensioner, and the inflator 150. In addition, the passenger protection ECU 204 controls the timings for operating (the sequence of operation of) controlled elements in accordance with a detection result of a collision pattern based on information from the plurality of the collision sensors 206. The controlled elements in this embodiment of the invention are the MGG's 22, the inflators 48 and 54, the pretensioner mechanism 158A as the pretensioner, and the inflator 150.

The control performed by this passenger protection ECU 204 will be described in conjunction with the operation of the fifth embodiment of the invention, with reference to a flowchart shown in FIG. 25. In the following description, it is assumed that the lap device 120 is located at the in-use position with respect to the passenger P seated in the vehicle seat 200.

In the vehicle seat 200 configured as described above, the passenger protection ECU 204 determines in step S10 whether or not there is a collision from ahead of the automobile 500 to which the vehicle seat 200 is applied (a collision according to a pattern other than a lateral collision and the like), on the basis of signals from the respective collision sensors 206. If the result of the determination is negative, a return is made. On the other hand, if the result of the determination in step S10 is positive, a transition to step S12 is made, and it is determined, on the basis of the signals from the respective collision sensors 206, whether or not the collision pattern is a minute lap collision. If the result of the determination is positive, a transition to step S14 is made. If the result of the determination is negative, a transition to step S22 is made.

Control corresponding to a minute lap collision as will be described later is performed in steps S14 to S20. Besides, in step S22, the passenger protection ECU 204 determines, on the basis of the signals from the respective collision sensors 206, whether or not the collision pattern is an oblique collision. If the result of the determination is positive, a transition to step S24 is made. If the result of the determination is negative, a transition to step S32 is made. Control corresponding to an oblique collision as will be described later is performed in steps S24 to S30. Besides, control corresponding to a front collision as will be described later is performed in steps S32 and S34.

[Minute Lap Collision]

In step S14, the passenger protection ECU 204 operates the pretensioner mechanism 158A. Then, the lap belts 156 and 164 are fitted to the lumbar of the seated passenger P, and the seated passenger P is restrained in the vehicle seat 200 by the lap belts 156 and 164. Subsequently, the passenger protection ECU 204 proceeds to step S16 to operate the inflator 150. Then, the frontal collision airbag 152 that is accommodated in the lap bar 124 is deployed between the steering wheel SW (the instrument panel IP) and the upper body of the seated passenger P.

Subsequently, the passenger protection ECU 204 proceeds to step S18 to operate the MGG's 22. Then, the pop-up bar 18 makes a transition from the stored position to the popped-up position, and the tension cloths 26 are deployed beside the seated passenger P. Furthermore, the passenger protection ECU 204 proceeds to step S20 to operate the inflators 48 and 54. Incidentally, that one of the inflators 48 and 54 which is located on a side (the right side or the left side) where a minute lap collision has occurred in the vehicle width direction may be selectively operated. Due to the operation of this inflator, at least that one of the side airbags 46 and 52 which is located on the side where the minute lap collision has occurred is expanded and deployed beside the seated passenger P. In this case, the necessity to deploy the side airbag on the counter collision side, and the timing for deploying the side airbag on the counter collision side can be arbitrarily set. In the following description (including the description of other collision patterns), the inflators 48 and 54 will be mentioned without considering whether or not they are located on the collision side, unless otherwise specified.

Figure 26A:
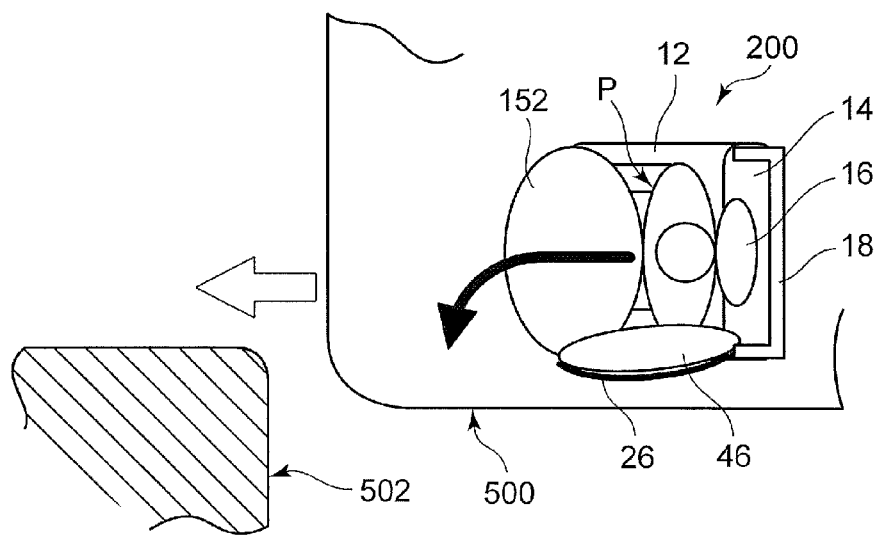
FIG. 26A is a plan view schematically showing the behavior of a passenger in the event of a minute lap collision of the vehicle seat according to the fifth embodiment of the invention.

It should be noted herein that the seated passenger P behaves in the event of a minute lap collision in such a manner as to move mainly forward with regard to the vehicle in the early phase of the collision, and to move mainly to the collision side in the vehicle width direction in and after the intermediate phase of the collision, as indicated by an arrow in FIG. 26A. In this vehicle seat 200, the control of restraining the seated passenger P in the early phase of a collision from moving forward with regard to the vehicle is performed in accordance with the behavior of the seated passenger P. That is, the passenger protection ECU 204 operates the pretensioner mechanism 158A and the inflator 150 prior to the tension cloths 26 and the inflators 48 and 54.

More specifically, the pretensioner mechanism 158A is first operated, and the lumbar of the seated passenger P is restrained from moving forward with regard to the vehicle by the lap belts 156 and 164. Subsequently, the frontal collision airbag 152 is expanded and deployed by being supplied with gas from the inflator 150, and the upper body of the seated passenger P is restrained from moving with regard to the vehicle.

Then, after the MGG's 22 are operated to deploy the tension cloths 26 in the intermediate phase of the collision, the inflators 48 and 54 are operated. Thus, the side airbag on the collision side is expanded and deployed along the corresponding one of the tension cloths 26, and the seated passenger P is restrained from moving toward the collision side in the vehicle width direction in and after the intermediate phase of the minute lap collision by the side airbags 46 and 52 and the tension cloths 26.

[Oblique Collision]

In step S24, the passenger protection ECU 204 operates the MGG's 22. Then, the pop-up bar 18 makes a transition from the stored position to the popped-up position, and the tension cloths 26 are deployed beside the seated passenger P. Furthermore, the passenger protection ECU 204 proceeds to step S26 to operate the inflators 48 and 54. Due to the operation of these inflators 48 and 54, the side airbags 46 and 52 are expanded and deployed beside the seated passenger P respectively.

Subsequently, the passenger protection ECU 204 proceeds to step S28 to operate the pretensioner mechanism 158A. Then, the lap belts 156 and 164 are fitted to the lumbar of the seated passenger P, and the seated passenger P is restrained in the vehicle seat 100 by the lap belts 156 and 164. Subsequently, the passenger protection ECU 204 proceeds to step S30 to operate the inflator 150. Then, the frontal collision airbag 152 that is accommodated in the lap bar 124 is deployed between the steering wheel W (the instrument panel IP) and the upper body of the seated passenger P.

Figure 26B:
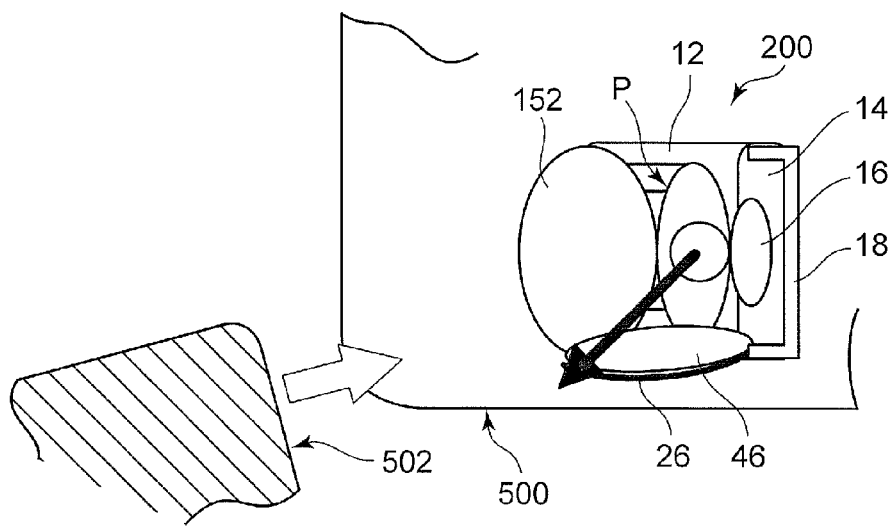
FIG. 26B is a plan view schematically showing the behavior of the passenger in the event of an oblique collision of the vehicle seat according to the fifth embodiment of the invention.

It should be noted herein that the seated passenger P behaves in the event of an oblique collision in such a manner as to rectilinearly move forward with regard to the vehicle and toward the collision side in the vehicle width direction from the early phase of the collision, as shown in FIG. 26B. In this vehicle seat 200, the control of restraining the seated passenger P from being displaced in position in the vehicle width direction with respect to the frontal collision airbag 152 in the early phase of the collision is performed, in accordance with the behavior of the seated passenger P. That is, the passenger protection ECU 204 operates the tension cloths 26 and the inflators 48 and 54 prior to the pretensioner mechanism 158A and the inflator 150.

More specifically, the MGG's 22 are first operated to deploy the tension cloths 26 respectively, and then the inflators 48 and 54 are operated to expand and deploy the side airbags 46 and 52 on the collision side along the tension cloths 26 respectively. Thus, the seated passenger P is restrained from moving toward the collision side in the vehicle width direction. In particular, since the lateral space (to a side door) for the passenger P seated in the vehicle seat 200 that is located on the collision side with respect to the center of the automobile 500 in the vehicle width direction is small, the prior deployment of the tension cloth 26 and the side airbag 46 on the outer side in the vehicle width direction is effective.

After that, the pretensioner mechanism 158A and the inflator 150 are operated in this sequence. Thus, the lumbar of the seated passenger P is restrained from moving toward the collision side in the vehicle width direction by the lap belts 156 and 164, and the upper body of the seated passenger P is restrained from moving forward with regard to the vehicle by the frontal collision airbag 152, at an appropriate position of restraint toward the collision side in the vehicle width direction.

[Front Collision]

In step S32, the passenger protection ECU 204 operates the pretensioner mechanism 158A. Then, the lap belts 156 and 164 are fitted to the lumbar of the seated passenger P, and the seated passenger P is restrained in the vehicle seat 200 by the lap belts 156 and 164. Subsequently, the passenger protection ECU 204 proceeds to step S34 to operate the inflator 150. Then, the frontal collision airbag 152 that is accommodated in the lap bar 124 is deployed between the steering wheel SW (the instrument panel IP) and the upper body of the seated passenger P.

In this manner, in the event of a front collision during which the seated passenger P behaves in such a manner as to mainly move forward with regard to the vehicle, the seated passenger P is restrained from moving forward with regard to the vehicle by the restraint device 202, without operating the MGG's 22 and the inflators 48 and 54 for the side airbags.

[Summary]

As described above, in the vehicle seat 200, the timings for operating (the sequence of operation of) the MGG's 22, the inflators 48 and 54, the pretensioner mechanism 158A, and the inflator 150 are controlled in accordance with the collision pattern of the automobile 500 to which the vehicle seat 200 is applied. Thus, the seated passenger P can be appropriately protected from various collision patterns.

Sixth Embodiment

Figure 27:
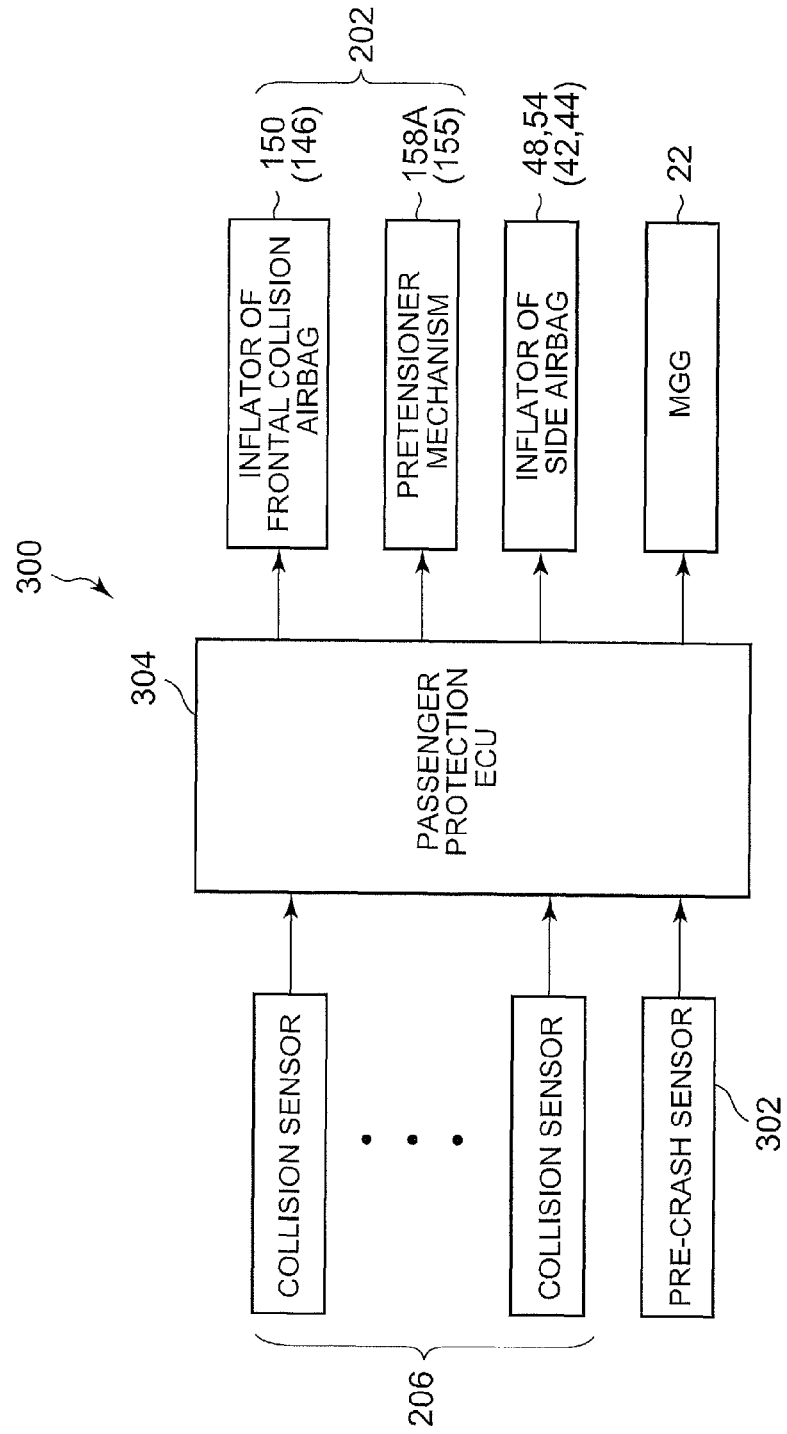
FIG. 27 is a block diagram showing a control system of a vehicle seat according to a sixth embodiment of the invention.
Figure 28:
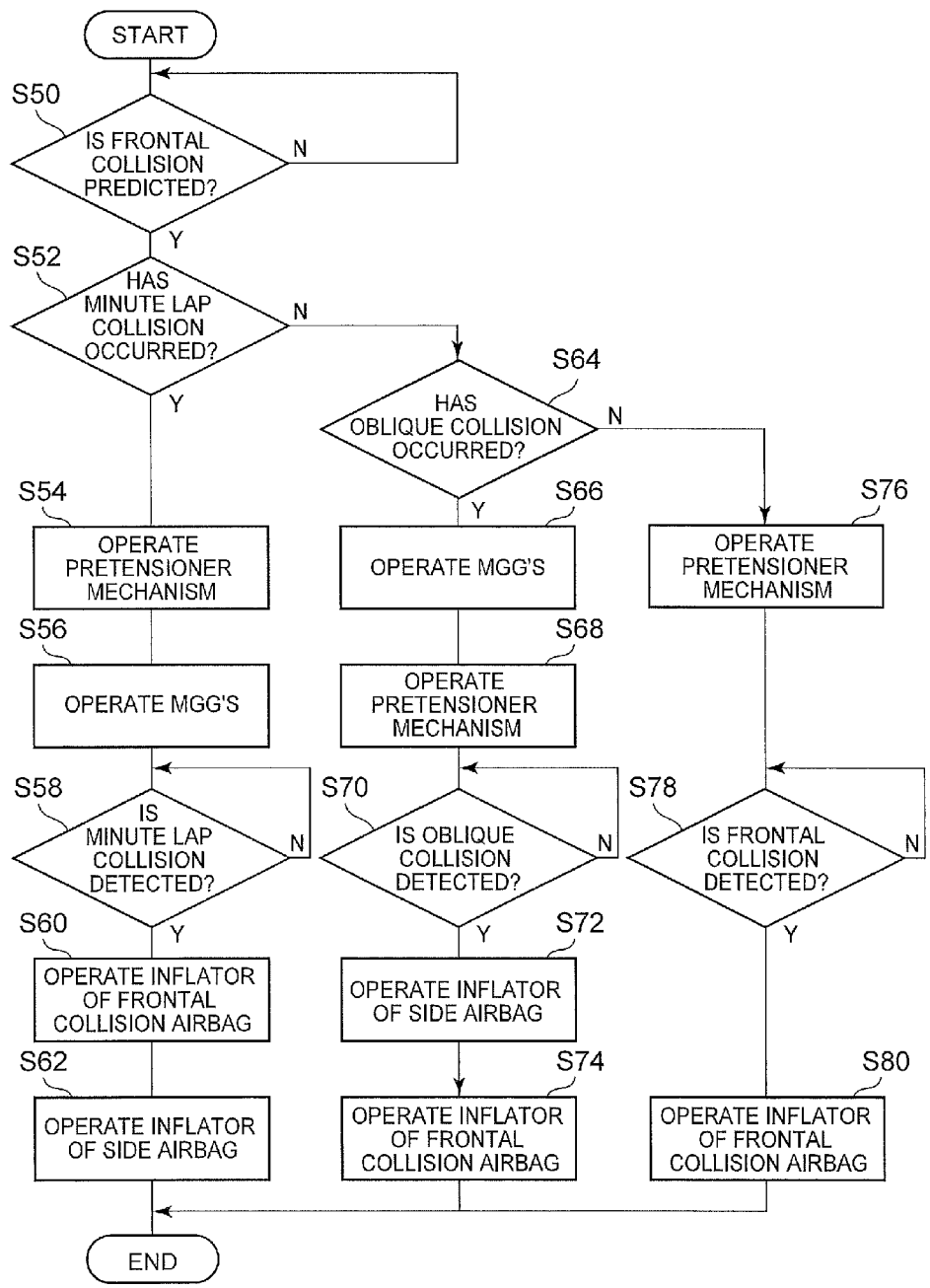
FIG. 28 is a flowchart showing the control flow of the vehicle seat according to the sixth embodiment of the invention.

A vehicle seat 300 according to the sixth embodiment of the invention will be described on the basis of FIGS. 27 and 28. Incidentally, those components which are basically the same as in the aforementioned fifth embodiment of the invention are denoted by the same reference symbols as in the aforementioned fifth embodiment of the invention respectively, and the description and illustration thereof may be omitted.

Although not shown in the drawings, the vehicle seat 300 is mechanically configured in the same manner as the vehicle seat 100, as is the case with the vehicle seat 200. In addition, the vehicle seat 300 is equipped with a passenger protection ECU 304 as a control device. As shown in FIG. 27, the passenger protection ECU 304 is electrically connected to the plurality of the collision sensors (the acceleration sensors) 206, and can detect a minute lap collision, an oblique collision, and a front collision with the automobile 500 to which the vehicle seat 300 is applied, on the basis of information from the plurality of the collision sensors 206. Besides, the ECU 304 is electrically connected to one or a plurality of pre-crash sensors 302, and can predict a minute lap collision, an oblique collision, and a front collision with the automobile 500 to which the vehicle seat 300 is applied, on the basis of information from the pre-crash sensor 302 or the pre-crash sensors 302.

The control performed by this passenger protection ECU 304 will be described in conjunction with the operation of the sixth embodiment of the invention, with reference to a flowchart shown in FIG. 28. In the following description, it is assumed that the lap device 120 is located at the in-use position with respect to the passenger P seated in the vehicle seat 300.

In the vehicle seat 300 configured as described above, in step S50, the passenger protection ECU 304 determines, on the basis of a signal from the pre-crash sensor 302 or signals from the pre-crash sensors 302, whether or not a collision from ahead of the automobile 500 to which the vehicle seat 300 is applied (a collision according to a pattern other than a lateral collision or the like) is predicted. If the result of the determination is negative, a return is made. On the other hand, if the result of the determination in step S50 is positive, a transition to S52 is made to determine, on the basis of the signal from the pre-crash sensor 302 or the signals from the pre-crash sensors 302, whether or not the collision pattern is a minute lap collision. If the result of the determination is positive, a transition to step S54 is made. If the result of the determination is negative, a transition to step S64 is made.

In steps S54 to S62, the control corresponding to a minute lap collision as will be described later is performed. Besides, in step S64, the passenger protection ECU 304 determines, on the basis of the signal from the pre-crash sensor 302 or the signals from the pre-crash sensors 302, whether or not the collision pattern is an oblique collision. If the result of the determination is positive, a transition to step S66 is made. If the result of the determination is negative, a transition to step S76 is made. In steps S66 to S74, the control corresponding to an oblique collision as will be described later is performed. Besides, in steps S76 to S80, the control corresponding to a front collision as will be described later is performed.

[Minute Lap Collision]

In step S54, the passenger protection ECU 304 operates the pretensioner mechanism 158A. Then, the lap belts 156 and 164 are fitted to the lumbar of the seated passenger P, and the seated passenger P is restrained in the vehicle seat 300 by the lap belts 156 and 164. Subsequently, the passenger protection ECU 304 proceeds to step S56 to operate the MGG's 22. Then, the pop-up bar 18 makes a transition from the stored position to the popped-up position, and the tension cloths 26 are deployed beside the seated passenger P.

Subsequently, the passenger protection ECU 304 proceeds to step S58 to determine, on the basis of signals from the respective collision sensors 206, whether or not a minute lap collision has occurred. If the result of the determination is negative, a return is made. If the result of the determination is positive, a transition to step S60 is made. Incidentally, if the result of the determination in step S58 does not become positive even after the lapse of a predetermined time from the prediction of the minute lap collision in step S52, the control may be ended (a transition to another control may be made) on the assumption that the collision has been avoided.

In step S60, the passenger protection ECU 304 operates the inflator 150. Then, the frontal collision airbag 152 that is accommodated in the lap bar 124 is deployed between the steering wheel SW (the instrument panel IP) and the upper body of the seated passenger P. Subsequently, the passenger protection ECU 304 proceeds to step S62 to operate the inflators 48 and 54. Incidentally, that one of the inflators 48 and 54 which is located on a side (the right side or the left side) where a minute lap collision has occurred in the vehicle width direction may be selectively operated. In this case, the necessity to deploy the side airbag on the counter collision side, and the timing for deploying the side airbag on the counter collision side can be arbitrarily set. Due to the operation of this inflator, at least that one of the side airbags 46 and 52 which is located on the side where the minute lap collision has occurred is expanded and deployed beside the seated passenger P. In the following description (including the description of other collision patterns), the inflators 48 and 54 will be mentioned without considering whether or not they are located on the collision side, unless otherwise specified.

As described above, in this vehicle seat 300, prior to the occurrence of a minute lap collision, the lap belts 156 and 164 are fitted to the seated passenger, and the tension cloths 26 are deployed beside the seated passenger P. Then, after the minute lap collision is detected, the seated passenger P is restrained from moving forward with regard to the vehicle in the early phase of the collision by the frontal collision airbag 152, in accordance with the behavior of the seated passenger P in the event of the minute lap collision. Furthermore, the inflators 48 and 54 are operated in the intermediate phase of the collision. As a result, the seated passenger P is restrained from moving toward the collision side in the vehicle width direction by the side airbags 46 and 52 and the tension cloths 26.

[Oblique Collision]

In step S66, the passenger protection ECU 304 operates the MGG's 22. Then, the pop-up bar 18 makes a transition from the stored position to the popped-up position, and the tension cloths 26 are deployed beside the seated passenger P. Subsequently, the passenger protection ECU 304 proceeds to step S68 to operate the pretensioner mechanism 158A. Then, the lap belts 156 and 164 are fitted to the lumbar of the seated passenger P, and the seated passenger P is restrained in the vehicle seat 300 by the lap belts 156 and 164.

Subsequently, the passenger protection ECU 304 proceeds to step S70 to determine, on the basis of the signals from the respective collision sensors 206, whether or not an oblique collision has occurred. If the result of the determination is negative, a return is made. If the result of the determination is positive, a transition to step S72 is made. Incidentally, if the result of the determination in step S70 does not become positive even after the lapse of a predetermined time from the prediction of the oblique collision in step S64, the control may be ended (a transition to another control may be made) on the assumption that the collision has been avoided.

In step S72, the passenger protection ECU 304 operates the inflators 48 and 54. Then, the side airbags 46 and 52 are expanded and deployed beside the seated passenger P. Subsequently, the passenger protection ECU 304 proceeds to step S74 to operate the inflator 150. Then, the frontal collision airbag 152 that is accommodated in the lap bar 124 is deployed between the steering wheel SW (the instrumental panel IP) and the upper body of the seated passenger P.

In this vehicle seat 300, prior to the occurrence of an oblique collision, the tension cloths 26 are deployed beside the seated passenger P, and the lap belts 156 and 164 are fitted to the seated passenger. Then, after the detection of the oblique collision, the side airbags 46 and 52 on the collision side are expanded and deployed along the corresponding one of the tension cloths 26 in accordance with the behavior of the seated passenger P in the event of the oblique collision, and the seated passenger P is restrained from moving toward the collision side in the vehicle width direction. After that, the front-side airbag 152 is expanded and deployed, so that the seated passenger P, who is restrained at a suitable position in the vehicle width direction by one of the side airbags 46 and 52, is retained in the longitudinal direction by the front-side airbag 152.

[Front Collision]

In step S80, the passenger protection ECU 304 operates the inflator 150 to deploy the frontal collision airbag 152 between the steering wheel SW (the instrument panel IP) and the upper body of the seated passenger P. As a result, the seated passenger P is restrained from moving forward with regard to the vehicle.

[Summary]

As described above, in the vehicle seat 300, the timings for operating (the sequence of operation of) the MGG's 22, the inflators 48 and 54, the pretensioner mechanism 158A, and the inflator 150 are controlled in accordance with the collision pattern of the automobile 500 to which the vehicle seat 300 is applied. Thus, the seated passenger P can be appropriately protected from various collision patterns.

Incidentally, in each of the fifth and sixth embodiments of the invention, there is shown an example in which the passenger protection ECU 204 or 304 controls the timings before and after the start of the operation of the controlled elements (the MGG's 22, the inflators 48 and 54, the pretensioner mechanism 158A, and the inflator 150). However, the invention is not limited to this example. For example, it is appropriate to adopt a configuration in which the timings for operating the respective controlled elements are controlled in consideration of the time needed for the deployment, fitting and the like of the tension cloths 26, the side airbags 46 and 52, the lap belts 156 and 164, and the frontal collision airbag 152. That is, the passenger protection ECU 204 may be configured to control the sequence of completion of the deployment of the tension cloths 26, the deployment of the side airbags 46 and 54, the fitting of the lap belts 156 and 164, and the deployment of the frontal collision airbag 152 in the event of a minute lap collision and an oblique collision. More specifically, in the event of a minute lap collision, the control of completion in the sequence of the fitting of the lap belts 156 and 164, the deployment of the frontal collision airbag 152, the deployment of the tension cloths 26, and the deployment of the side airbags 46 and 54 may be performed. Besides, in the event of an oblique collision, the control of completion in the sequence of the deployment of the tension cloths 26, the deployment of the side airbags 46 and 54, the fitting of the lap belts 156 and 164, and the deployment of the frontal collision airbag 152 may be performed. Besides, the passenger protection ECU 204 or 304 may comprehensively control the other passenger restraint devices (the airbag device and the like) of the automobile 500 to which the vehicle seat 200 or 300 is applied. In this case as well, it goes without saying that the passenger protection ECU 204 or 304 has only to maintain the sequence of operation of the aforementioned respective controlled elements corresponding to the collision pattern, and that the timings for operating the other passenger restraint devices can be arbitrarily set.

Besides, in each of the fifth and sixth embodiments of the invention, there is shown an example in which the passenger protection ECU 204 or 304 performs the control corresponding to the case of each of a minute lap collision, an oblique collision, and a front collision. However, the invention is not limited to this example. The passenger protection ECU 204 or 304 may be configured to perform the control corresponding to at least one of a minute lap collision and an oblique collision.

Besides, in each of the fifth and sixth embodiments of the invention, there is shown an example in which the restraint device 202 is mainly constituted of the lap device 120, the frontal collision airbag device 146, and the seat belt device 155, which are provided in the vehicle seat 200 or 300. However, the invention is not limited to this example. For example, it is appropriate to adopt a configuration in which the restraint device 202 is a common three-point seat belt device. Besides, such a configuration may be equipped with a control device that operates a frontal collision airbag device that is provided on the instrument panel IP or the steering wheel SW, and a pretensioner of a three-point seat belt device, at the timings of the fifth or sixth embodiment of the invention. Such a control device, the frontal collision airbag device, the three-point seat belt device, and the vehicle seat 10, 40 or 60 may be regarded as constituting the passenger protection system.

Incidentally, in each of the aforementioned respective embodiments of the invention, there is shown an example in which the vehicle seat 10, 40, 60, 100, 200 or 300 is equipped with the right and left tension cloths 26 or 62. However, the invention is not limited to this example. For example, it is appropriate to adopt a configuration in which the tension cloth 26 or 62 is provided only on the outer side (on the near side) in the vehicle width direction. Besides, for example, it is appropriate to adopt a configuration in which the tension cloth 26 or 62 is provided only on the inner side (on the far side) in the vehicle width direction. For example, in the configuration in which the tension cloth 26 or 62 is not provided on the outer side in the vehicle width direction, the seated passenger P can be protected from a lateral collision by the near side airbag device 42, a side airbag device that is provided on a vehicle body or a door, a curtain airbag device, or the like.

Besides, in each of the aforementioned second and third (and fourth) embodiments of the invention, there is shown an example in which the vehicle seat 40 or 60 (100, 200 or 300) is equipped with both the near side airbag device 42 and the far side airbag device 44. However, the invention is not limited to this example. For example, it is appropriate to adopt a configuration that is equipped with only one of the near side airbag device 42 and the far side airbag device 44. For example, in a configuration that does not have the near side airbag device 42, the seated passenger P can be protected from a lateral collision by a side airbag device that is provided on a vehicle body or a door, a curtain airbag device, or the like.

Furthermore, as an example that is not included in the invention, it is appropriate to adopt a configuration that is not equipped with the tension cloths 26 or 62 but with the near side airbag device 42 that is realized by connecting the head protection chamber 46B to the bar main body 18A. By the same token, it is appropriate to adopt a configuration that is not equipped with the tension cloths 26 or 62 but with the far side airbag device 44 that is realized by connecting the head protection chamber 52B to the bar main body 18A. Each of these configurations also makes it possible to pull out the side airbag 46 or 52 from the seat back 14 through the movement of the pop-up bar 18 to the popped-up position prior to the expansion and deployment of the side airbag 46 or 52, and contributes toward suitable deployment in a short time.

Moreover, it goes without saying that the invention can be carried out after being altered in various manners without departing from the gist thereof.

DESCRIPTION OF REFERENCE SYMBOLS

10 VEHICLE SEAT
11 VEHICLE PASSENGER RESTRAINT SYSTEM
12 SEAT CUSHION
14 SEAT BACK
14A SEAT BACK FRAME

39

16 HEAD REST
18 POP-UP BAR (MOVABLE SUPPORT MEMBER)
18B SLIDER (GUIDED PORTION)
20 GUIDE PIPE (GUIDING PORTION)
22 MGG (ACTUATOR)
26 TENSION CLOTH (LATERAL DEPLOYMENT MEMBER)
30 LATERAL COLLISION ECU (CONTROL DEVICE)
40, 60, 100, 200, 300 VEHICLE SEAT
41, 61, 101 VEHICLE PASSENGER RESTRAINT SYSTEM
42 NEAR SIDE AIRBAG DEVICE (SIDE AIRBAG DEVICE)
44 FAR SIDE AIRBAG DEVICE (SIDE AIRBAG DEVICE)
46 NEAR SIDE AIRBAG
46B HEAD PROTECTION CHAMBER
46C LUMBAR PROTECTION CHAMBER
50 RING-SHAPED MEMBER
52 FAR SIDE AIRBAG
52B HEAD PROTECTION CHAMBER
52C ABDOMEN PROTECTION CHAMBER
56 LATERAL COLLISION ECU (CONTROL DEVICE)
62 TENSION CLOTH (LATERAL DEPLOYMENT MEMBER)
62C OVERHANG PORTION
64 TEAR SEAM
120 LAP DEVICE (RESTRAINT DEVICE)
146 FRONTAL COLLISION AIRBAG DEVICE (RESTRAINT DEVICE)
155 SEAT BELT DEVICE (RESTRAINT DEVICE)
156, 164 LAP BELT
158A PRETENSIONER MECHANISM (PRETENSIONER)
202 RESTRAINT DEVICE
204, 304 PASSENGER PROTECTION ECU (CONTROL DEVICE)

The invention claimed is:

1. A vehicle seat comprising:
a movable support body that displaces upwardly to a popped-up position with respect to a seat back, the popped-up position being a position such that the movable support body is spaced apart from the seat back;
an actuator that is configured to shift the movable support body upward with respect to the seat back;
a lateral deployment member that is: (1) connected to the movable support body at an upper end side of the lateral deployment member and connected to a front end side of a seat cushion at a lower end side of the lateral deployment member, (2) accommodated from a lateral portion of the seat cushion to a lateral portion of the seat back, and (3) deployed such that a tensile force is applied between a first connection portion of the lateral deployment member to the movable support body and a second connection portion of the lateral deployment member to the seat cushion when the movable support body is displaced upwardly with respect to the seat back; and
a control device that operates the actuator in a case where a collision of the vehicle is detected or predicted.

2. The vehicle seat according to claim 1, wherein
the lateral deployment member a is planar cloth material or a mesh material that is connected at a vehicle rear end side of the lateral deployment member to a frame of the seat back.

3. The vehicle seat according to claim 2, further comprising
a side airbag device that includes a side airbag that is accommodated in the seat back and is expanded and deployed between the lateral deployment member and at least a breast and a shoulder of a seated passenger in a case where the collision of the vehicle is detected or predicted.

4. The vehicle seat according to claim 3, wherein
the side airbag has a head protection chamber that restrains a head of the seated passenger.

5. The vehicle seat according to claim 4, wherein
the head protection chamber is connected to the movable support body in a state of being accommodated in the seat back.

6. The vehicle seat according to claim 5, wherein
the side airbag has a lower portion that is connected to the frame of the seat back, and an upper portion that includes that region of the head protection chamber which is connected to the movable support body, the lower portion and the upper portion being folded in a longitudinal direction with regard to the vehicle, and a region between the upper portion and the lower portion being folded in a vertical direction with regard to the vehicle, and
that region of the side airbag which is folded in the vertical direction with regard to the vehicle is provided with a ring-shaped member through which at least one of the frame and the movable support body is inserted and which prevents the frame and the movable support body from being displaced relatively to each other in the longitudinal direction while allowing the frame and the movable support body to be displaced relatively to each other in the vertical direction.

7. The vehicle seat according to claim 4, wherein
the lateral deployment member has an overhang portion that overhangs forward with regard to the vehicle from a line that links the first connection portion to the movable support body and the second connection portion to the seat cushion with each other, in a deployed state, and
that region of the head protection chamber which is located on a front end side in an expanded and deployed state is connected to the overhang portion.

8. The vehicle seat according to claim 7, wherein
that region of the head protection chamber which is located on the front end side in the expanded and deployed state and the overhang portion are connected to each other in such a manner as to be separated from each other upon completion of expansion and deployment of the head protection chamber.

9. The vehicle seat according to claim 8, wherein
that region of the head protection chamber which is located on the front end side in the expanded and deployed state and the overhang portion are connected to each other by a tear seam.

10. The vehicle seat according to claim 4, wherein
lateral deployment members and side airbags are provided on both sides in a vehicle width direction respectively,
the side airbag that is arranged on an outer side in the vehicle width direction has a lumbar protection chamber that restrains a lumbar of the seated passenger, and
the side airbag that is arranged on an inner side in the vehicle width direction has an abdomen protection chamber that restrains an abdomen of the seated passenger.

11. The vehicle seat according to claim 10, wherein
at least one of the lumbar protection chamber and the abdomen protection chamber is connected to a lower portion of the lateral deployment member that is arranged on a same side as at least one of the lumbar protection chamber and the abdomen protection chamber in the vehicle width direction, in a vertical direction with regard to the vehicle.

12. The vehicle seat according to claim 3, further comprising
a restraint device that is operated to restrain the seated passenger in such a manner as to restrain the seated passenger from moving forward with regard to the vehicle, and
a control unit that operates the restraint device, the actuator on a collision side, and the side airbag device on the collision side, in a sequence of the restraint device, the actuator on the collision side, and the side airbag device on the collision side, in a case where a minute lap collision of the vehicle is detected.

13. The vehicle seat according to claim 3, further comprising
a restraint device that is operated to restrain the seated passenger in such a manner as to restrain the seated passenger from moving forward with regard to the vehicle, and
a control unit that operates the restraint device, the actuator on a collision side, and the side airbag device on the collision side, in a sequence of the actuator on the collision side, the side airbag device on the collision side, and the restraint device in a case where an oblique collision of the vehicle is detected.

14. The vehicle seat according to claim 12, wherein
the restraint device is configured to include
a movable body that can assume a stored position at which the movable body is stored along a lateral edge portion of the seat cushion or the seat back, and an in-use position at which the movable body is arranged along a vehicle width direction while being spaced apart from an abdomen of the seated passenger forward with regard to the vehicle,
a frontal collision airbag device that is provided on the movable body and deploys a frontal collision airbag between an upper body of the seated passenger and a vehicle structure located in front of the seated passenger upon being supplied with gas,
a lap belt that is retained by the movable body, and is removed from the movable body toward a lumbar side of the seated passenger in an event of reception of a tensile force equal to or larger than a predetermined value, and
a pretensioner that pulls the lap belt in while applying the tensile force equal to or larger than the predetermined value to the lap belt, and
the control unit operates the pretensioner and the frontal collision airbag device in a sequence of the pretensioner and the frontal collision airbag device, in a state where the movable body is located at the in-use position, in operating the restraint device.

15. The vehicle seat according to claim 3, further comprising
a movable body that can assume a stored position at which the movable body is stored along a lateral edge portion of the seat cushion or the seat back, and an in-use position at which the movable body is arranged along a vehicle width direction while being spaced apart from an abdomen of the seated passenger forward with regard to the vehicle,
a frontal collision airbag device that is provided on the movable body and deploys a frontal collision airbag between an upper body of the seated passenger and a vehicle structure located in front of the seated passenger upon being supplied with gas,
a lap belt that is retained by the movable body, and is removed from the movable body toward a lumbar side of the seated passenger in an event of reception of a tensile force equal to or larger than a predetermined value,
a pretensioner that pulls the lap belt in while applying the tensile force equal to or larger than the predetermined value to the lap belt, and
a control unit that operates the pretensioner and the actuator on a collision side in a case where either a minute lap collision or an oblique collision of the vehicle is predicted,
and operates the frontal collision airbag device and the side airbag device on the collision side in a case where either a minute lap collision or an oblique collision of the vehicle is detected.

16. The vehicle seat according to claim 1, wherein
the actuator displaces the movable support body upward with respect to an upper end of a head rest that is provided on the seat back.

17. The vehicle seat according to claim 1, wherein
the actuator displaces the first connection portion of the movable support body to the lateral deployment member upward with respect to an upper end of a head rest that is provided on the seat back.

18. The vehicle seat according to claim 1, wherein
the movable support body has a guided portion that assumes a shape of a circular arc that is convex backward with regard to the vehicle in a lateral view, and
the seat back is provided with a guiding portion that guides the movable support body in the guided portion.

19. The vehicle seat according to claim 18, wherein
the guiding portion and the guided portion are configured such that the movable support body is located more forward in relation to the vehicle after being displaced upward by the actuator than before being displaced upward by the actuator.

* * * * *